United States Patent

Fehr et al.

[11] Patent Number: 5,190,780
[45] Date of Patent: Mar. 2, 1993

[54] METHOD FOR THE PRODUCTION OF FOOD AND NOVEL FOOD PRODUCT

[76] Inventors: Amos Fehr; Joseph Chong, both of c/o 4572 Erie Avenue, Niagara Falls, Ontario, L2E 3N3, Canada

[21] Appl. No.: 691,690

[22] Filed: Apr. 25, 1991

Related U.S. Application Data

[63] Continuation of Ser. No. 337,638, Apr. 13, 1989.

[30] Foreign Application Priority Data

Jun. 30, 1988 [CA] Canada .................................. 571001
Feb. 21, 1989 [CA] Canada .................................. 591682

[51] Int. Cl.⁵ ...................... A21C 3/02; A23L 1/322; A23P 1/08
[52] U.S. Cl. ..................................... 426/502; 426/94; 426/283
[58] Field of Search .......................... 426/94, 283, 502

[56] References Cited

U.S. PATENT DOCUMENTS

| | | |
|---|---|---|
| 2,351,788 | 6/1944 | Smith . |
| 2,960,045 | 11/1960 | Pentzlin . |
| 3,611,950 | 10/1971 | Battaglia et al. . |
| 3,667,971 | 6/1972 | Brunner . |
| 3,669,007 | 6/1972 | Pulici . |
| 3,800,935 | 4/1974 | Montgomery . |
| 3,812,947 | 5/1974 | Nygaard . |
| 3,850,088 | 11/1974 | Tobey et al. . |
| 3,912,433 | 10/1975 | Ma . |
| 4,014,254 | 3/1977 | Ohkawa . |
| 4,060,027 | 11/1977 | Jenny . |
| 4,073,953 | 2/1978 | Trostmann et al. . |
| 4,084,493 | 4/1978 | Quintana . |
| 4,112,834 | 9/1978 | Thiry . |
| 4,388,059 | 6/1983 | Ma . |
| 4,393,758 | 7/1983 | Anmahian . |
| 4,439,124 | 3/1984 | Watanabe . |
| 4,516,487 | 5/1985 | Madison et al. . |
| 4,537,121 | 8/1985 | Bero et al. . |
| 4,600,595 | 7/1986 | Svengren et al. . |
| 4,640,670 | 2/1987 | Svengren et al. . |
| 4,651,635 | 3/1987 | Ally . |

FOREIGN PATENT DOCUMENTS

| | | |
|---|---|---|
| 586999 | 11/1959 | Canada . |
| 909070 | 9/1972 | Canada . |
| 949375 | 6/1974 | Canada . |
| 961700 | 1/1975 | Canada . |
| 1006050 | 3/1977 | Canada . |
| 1024825 | 1/1978 | Canada . |
| 1142023 | 3/1983 | Canada . |
| 1192435 | 8/1985 | Canada . |
| 1201921 | 3/1986 | Canada . |
| 1209859 | 8/1986 | Canada . |

Primary Examiner—Jeanette Hunter
Assistant Examiner—Mary S. Mims
Attorney, Agent, or Firm—Louis Weinstein

[57] ABSTRACT

A method is provided for the production of a generally-cylindrical overlapped-folded, loaded, rolled dough food product. The method includes the following interrelated steps: a) providing a substantially square sheet of dough at a diamond orientation at a first discrete stationary zone; b) advancing that sheet of dough at its diamond orientation from the first discrete stationary zone to at least one foodstuff dispensing zone downstream thereof, stopping the advancing at the foodstuff dispensing zone, and loading at least one foodstuff thereon in a particular manner as fully described; c) advancing that sheet of dough which is loaded with at least one foodstuff to a loaded dough sheet folding zone downstream thereof, stopping the advancing at the folding zone, and folding opposed transverse corners of the diamond-shaped, loaded sheet of dough inwardly in a particular manner as fully described to form a substantially-hexagonally-shaped sheet of dough; d) advancing that substantially hexagonally-shaped, overlapped-folded, loaded sheet of dough to a loaded, folded dough sheet rolling zone downstream thereof, stopping the advancing at the rolling zone, and rolling the substantially-hexagonally-shaped, overlapped-folded, loaded sheet of dough, in a particular manner as fully described to form a generally-cylindrical dough product; and e) discharging the generally-cylindrical, overlapped-folded, loaded, rolled dough product to a discharge zone.

17 Claims, 32 Drawing Sheets

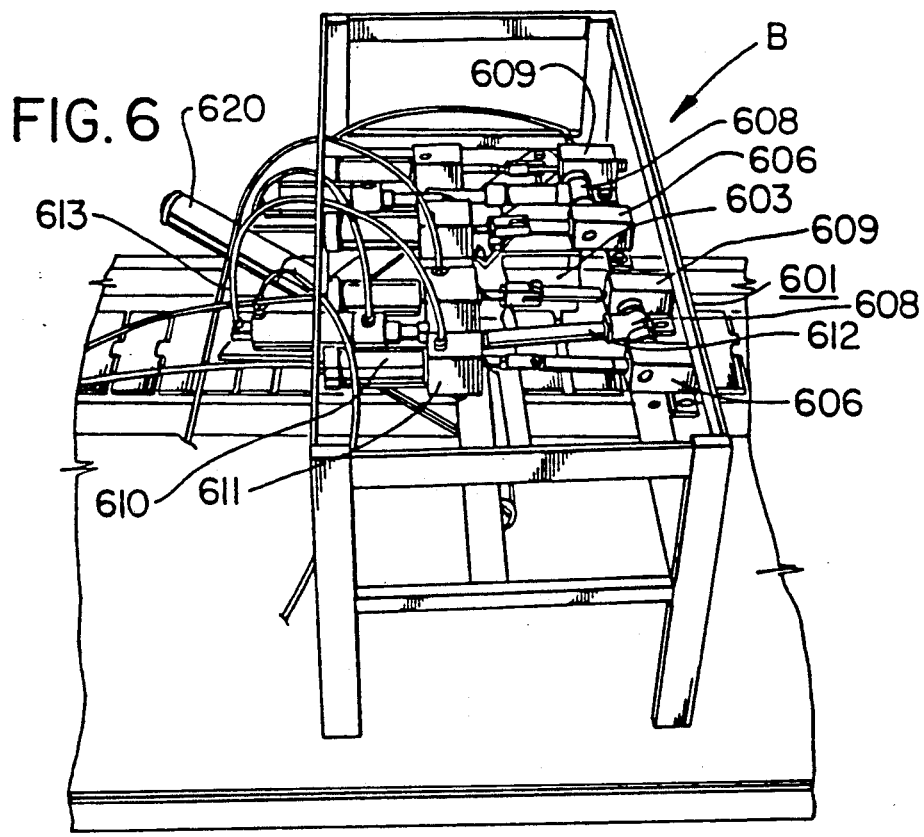
FIG. 6
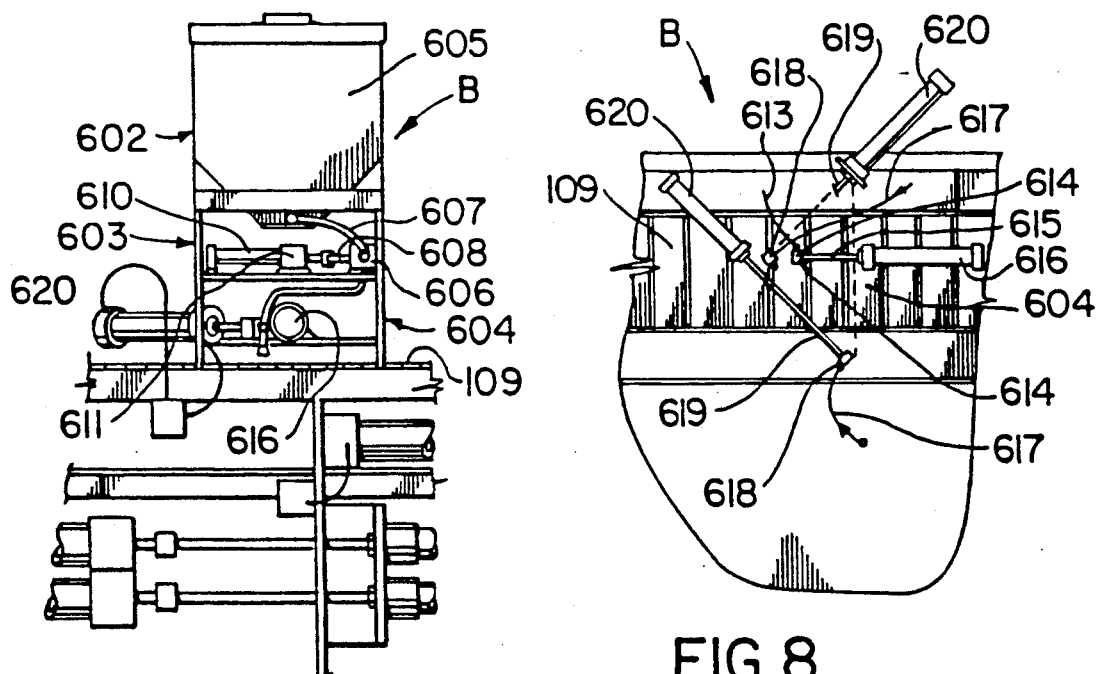
FIG. 7
FIG. 8

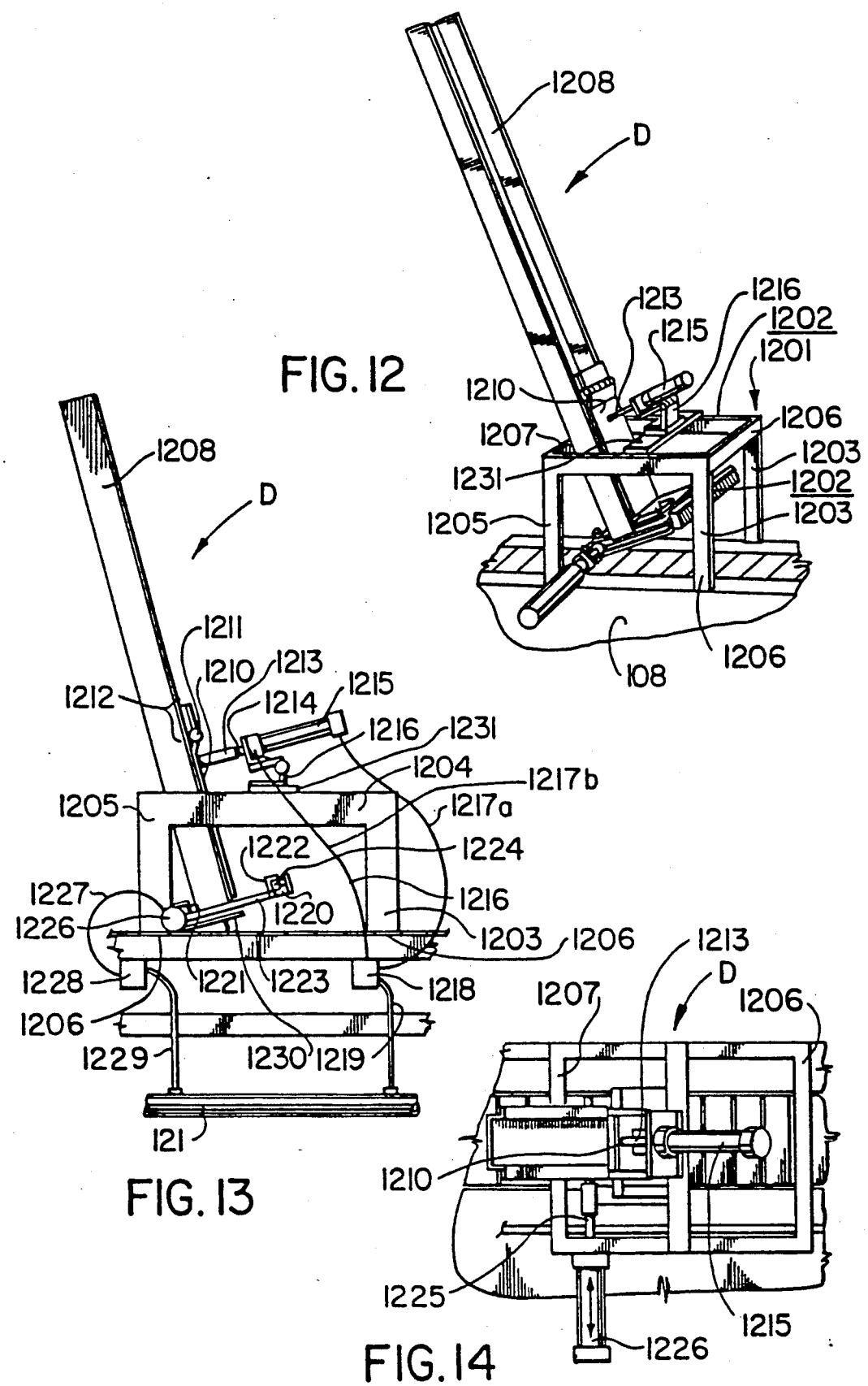

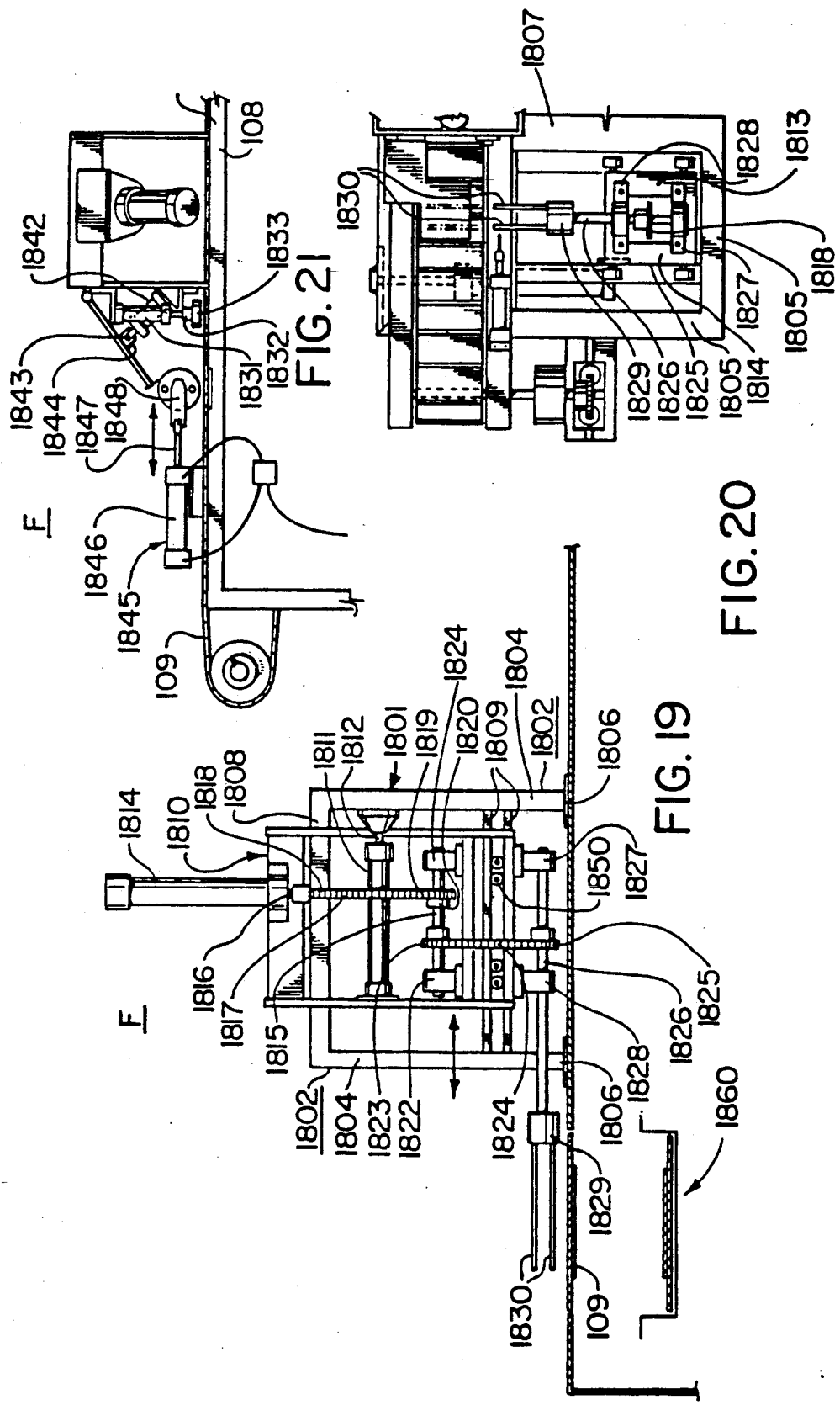

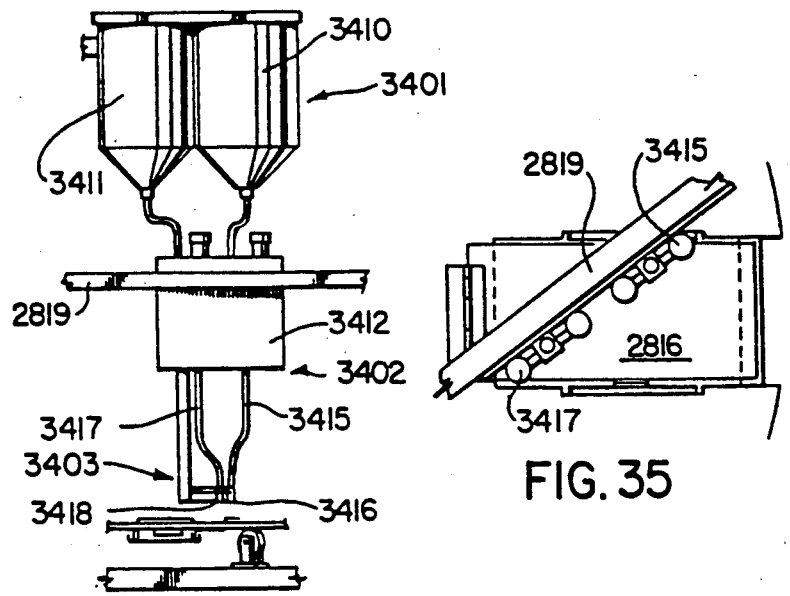
FIG. 34
FIG. 35
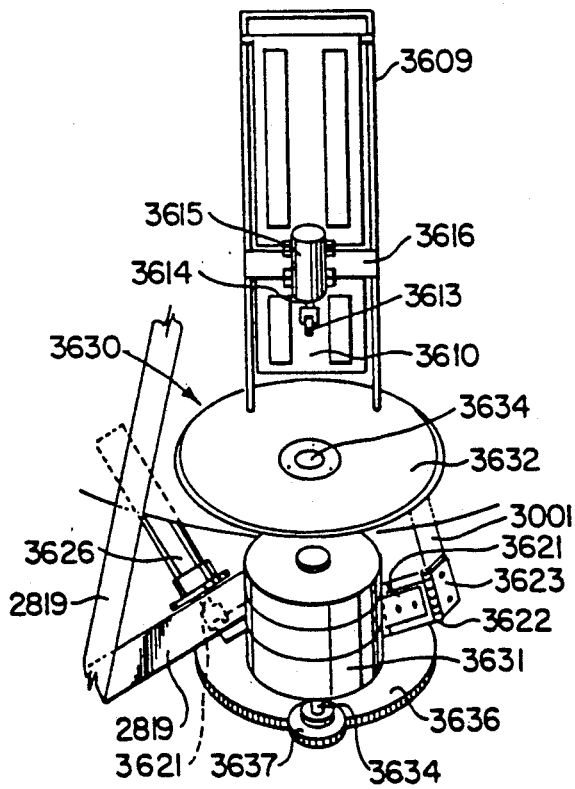
FIG. 36

METHOD FOR THE PRODUCTION OF FOOD AND NOVEL FOOD PRODUCT

This is a continuation of application Ser. No. 337,638, filed Apr. 13, 1989.

BACKGROUND OF THE INVENTION (a) Field of the Invention

This invention relates to an apparatus and method for the making of a novel, over-lapped folded, filled rolled food product and to the novel over-lapped folded, filled rolled food product so produced.

(b) Description of the Prior Art

Many patents are now directed to the manufacture of various rolled food products mechanically rather than by hand.

For example, Canadian Patent 586,999 patented Nov. 17, 1959 by Paul Wolf provided a method and apparatus for the manufacture of filled wafer sandwiches of oblong shape. The patented method included aligning the baked pastry strips in a layer end-to-end, moving the aligned strips, and spreading a filling substance in a layer onto the aligned pastry strips. Then another plurality of baked pastry strips were applied in an offset end-to-end layer over the top of the spread filling substance. The upper baked pastry strips were then pressed into contact with the filling substance.

Canadian Patent No. 1,006,050 patented Mar. 1, 1977 by H. W. H. Hai related to apparatus and method for the making of filled pastry rolls, especially spring rolls. The patented invention provided such apparatus including: a cutter adapted to cut a square of pastry from the leading end of the strip; means for feeding a filling onto the square; a first folding station adapted to fold one corner of the square over the filling; a second folding station to fold the two adjacent corners so that they overlap; a rolling station to form the folded pastry into a roll; and means for conveying the pastry from each station to the next. The folding of the square was performed by movable deflectors, each comprising a group of fingers.

Canadian Patent 1,024,825 patented Jan. 24, 1970 by E. Trostman et al, and its corresponding U.S. Pat. No. 4,073,953 patented Feb. 14, 1978 provided a method and apparatus for the production of rolled food products, e.g. chinese spring rolls. The invention provided an apparatus constructed in such a manner that the front portion of the wrap and the opposite side portions thereof were caught by mechanical devises and were successively folded onto the filler substance. Subsequently, the filler substance and the folded portions of the wrap were mechanically rolled towards the rear edge of the wrap. A support was provided for supporting a flat wrap and a filler substance was placed atop the flat wrap. Means were provided for successively folding the front portion and the opposite side portions of the wrap onto the filler substance. Means for generating a superatmospheric pressure below the portions of the wrap, or for generating a vacuum above those portions of the wrap, or combinations thereof were provided for rolling the folded wrap.

U.S. Pat. No. 3,611,950 patented Oct. 12, 1971 by M. Battaglia provided a manicotti-making machine. The patented manicotti-forming machine included means for forming a continuous sheet of dough from a mass thereof and conveying the dough sheet past a filler dispenser for depositing a controlled quantity of filler material onto the dough sheet. Means were provided for cutting the dough sheet and deposited filler into increments of predetermined dimensions. Means finally were provided for folding the cut dough sheet about the deposited filler to form a completed manicotti unit ready for packing and shipping.

U.S. Pat. No. 4,014,245 patented Mar. 29, 1977 by N. O. B. Kawa provided a device for wrapping sheets around food in rolled form. The essential feature of the invention was embodied in a device having a horizontal and a vertical cylinder with pistons by which a certain amount of the mixture was pushed out on a precut dough sheet which was bent along with the back and both sides of the mixture by a bending arm and by bending vanes, respectively.

U.S. Pat. No. 3,669,007 patented Jun. 13, 1972 by L. Pulici provided a method and apparatus for rolling and tucking filled foodstuffs. Examples of such foodstuffs are Mexican foods, such as burritos and enchiladas, Chinese egg rolls and foods of European origin, such as cabbage rolls, blintzes and canneloni. The method and apparatus involved placing an outer food wrap or envelope upon one of a plurality of continuously moving platens, each of which is provided with a hinged section, upon a conveyor and moving each platen with its wrap beneath an automatic filler tank. The hinged portion of the platen was then folded to make a first transverse fold in the wrap about the filler, and then the filled wrap was rolled upon itself about a line transverse to the conveyor travel. The rolled foodstuff was then sprayed with a binder liquid and was passed between compression belts which compressed the outer wrap edge to the first outer roll layer. Foodstuffs which are tucked as well as rolled may, after the first partial fold is made, be passed between converging guides which ploughed the longitudinal edges of the wrap upwardly and inwardly to form side tucks which then were also rolled with the body of the wrap and filler.

U.S. Pat. No. 3,912,433 patented Oct. 14, 1975 by K. C. Ma provided an automatic egg roll making machine. The patented method and apparatus included a skin feeding device for feeding the egg roll dough skins in individually cut sections on to a conveyor. The conveyor included a plurality of connected plates, each of which provided a semi-cylindrical mold cup that was used to form the egg roll skin in the desired shape around the food stuffing contained therein. Each section of egg roll skin moved on a conveyor plate to a position beneath a rotary turntable. The rotary turntable received the food stuffing material from a food injector which deposited portions of food stuffing on to the egg roll skin as it passed beneath the rotary turntable. Each conveyor plate included a mold cavity formed by the mold cup. As the food stuffing was transferred from the rotary turntable on to the egg roll skin, the food stuffing was pressed by a compactor against the egg roll skin at the location of the mold cavity so as to compress the food stuffing in a compact form in the mold cavity. After the food was pressed into the mold cavity, two side folding plates on the conveyor plate were activated to fold the two opposite corners of the egg roll skin over towards the centre of the skin. Once the side folding plates have been retracted away from the egg roll, the mold cup was activated from its position below the conveyor plate so that it pivoted on to the top of the conveyor plate, leaving the egg roll in a partially formed condition whereby the food stuffing and its surrounding egg roll skin are folded over on top of the conveyor plate. The conveyor oved the semi-formed egg roll to a spraying station where a spray device directed a bonding agent, such as egg yolk or glucose, on to an expose portion of the egg roll skin. The final rolling operation of the egg roll was performed by a rolling device which contacted and rolled the egg roll until the skin formed a cylindrical shape around the food stuffing.

U.S. Pat. No. 4,060,027 patented Nov. 29, 1977 by D. J. Jenny provided an apparatus for applying ingredients to an edible product. That patented apparatus included a stepwise advancing conveyor band, and work stations arranged along the conveyor band where the ingredients were applied. One of the work stations was equipped with a carriage mounted to be displaceable transversely with respect to the conveyor band. The carriage, when in a first terminal position, was adjacent such conveyor band and was over a discharge slide or chute of a receiving container for the ingredients. The carriage was provided with a number of individual suction heads which could be switched-on and switched-off. These suction heads engaged into the chute in the second terminal position of the carriage.

U.S. Pat. No. 4,084,493 patented Apr. 18, 1978 by E. D. Quinlana provided an apparatus for producing foodstuff products, namely a food product known as a "burrito", which comprises a flat sheet of wheat dough (known as a "tortilla") having a generally circular configuration. The patented apparatus comprised a conveyor system arranged to pass the tortilla placed thereon through a series of stations whereby the flour sheet was sequentially wrapped about the foodstuff ingredients to encapsulate the foodstuff therein. The stations included ones for depositing the foodstuff on the flour sheet, folding the side edges of the sheet by a folding chute, folding the leading edge of the sheet back over the food stuffing and folded side edges, rolling the sheet and stuffing back over itself a first time, and again rolling the sheet and stuffing therein a second and final time, after which the stuffed tortilla was discharged from the conveyor as a completed burrito ready for packaging.

U.S. Pat. No. 4,112,834 patented Sep. 12, 1978 by G. A. Thing provided a food processing apparatus. The patented apparatus deposited pepperoni slices and grated cheese on a series of pizza pie shells made of pastry. The apparatus included a main conveyor which was continuously operated sequentially to move pizza pie shells along a path extending through a food processing station. A carriage at the food processing station moved a stick of pepperoni relative to a rotational blade to slice pieces of pepperoni from the stick. A secondary conveyor received the slices of pepperoni and positively moved the slices of pepperoni toward a pastry shell being moved by the main conveyor. The secondary conveyor included surfaces which applied forces to opposite sides of the pepperoni slices to grip the slices and positively to move them toward the main conveyor. At another food processing station, a body of cheese was sliced into elongated pieces by a grater. A second cutter severed the elongated pieces of cheese into relatively short lengths. The short lengths of cheese were deposited on a pizza pie shell being moved by the main conveyor. The bodies of cheese were advantageously gripped between a pair of walls which are movable to release the body of cheese after each slicing operation so that the body of cheese can fall by gravity into correct position for a next succeeding slicing operation.

U.S. Pat. No. 3,780,643 patented December, 1973 by Papai provided an apparatus designed for the automatic assembling of pizza pies. According to the basic concept of that patent, a conveyor was intermittently driven sequentially to index pastry shells to each of a plurality of food processing stations at which an appropriate foodstuff (e.g. tomato sauce, pepperoni, cheese) was associated with the pastry shell. In the associating of pepperoni with the pastry shell, a plurality of bodies of pepperoni and a cutting blade were movable relative to each other in order to sever pieces of the pepperoni from the pepperoni bodies. A chute was provided for receiving the slices of pepperoni, which then slid along the bottom of the chute and were discharged onto the pastry shell.

U.S. Pat. No. 4,388,059 patented Jun. 14, 1987 by K. C. Ma provided an automatic egg roll making apparatus. The patented apparatus included an intermittently moving transmitting device and a plurality of forming assemblies on the transmitting device. Each forming assembly included folding devices for folding three side portions of an egg roll dough and an egg roll stuffing therein. The apparatus further comprised a device for feeding the egg roll dough successively on each forming assembly, a device for supplying the egg roll stuffing on the egg roll dough, a device for actuating the folding means of the forming assembly to fold three side portions of the egg roll dough over the stuffing in the mold device to thereby form a partially folded egg roll, and a device for wrapping the partially folded egg roll to form a cylindrical egg roll product. In the supplying device, the necessary amount of the stuffing to be disposed in one egg roll product was prepared, and the stuffing was put into the mold device to deposit the stuffing and a part of the egg roll dough therein. In the wrapping device, the stuffing portion in the mold device was pushed up therefrom and was turned for wrapping the remaining side portion of the egg roll dough. Thereafter, the wrapped product was transferred.

U.S. Pat. No. 4,393,758 patented Jul. 19, 1983 provided a food processing apparatus for certain rolled food products such as burritos, enchiladas, egg rolls, cabbage rolls, blintzes and the like. The patented apparatus included an endless conveyor upon which the outer food layer, or tortilla, was placed, a dispenser station for controllably dispensing a precise amount of food filler onto the tortilla, a plurality of shaped forming wheels adapted to cooperate with the conveyor to fold the tortilla over and about the filler so as to encapsulate the filler within the tortilla and a mechanism for inverting the product thus formed for automatic packaging and shipment.

U.S. Pat. No. 4,439,124 patented Mar. 27, 1984 by H. Watonabe provided a machine for automatically making rolled food products such as spring rolls, crepes or the like. The patented machine included means for rolling a food stuffing in a generally rectangular edible skin having first and second diagonally opposite corner areas and third and fourth diagonally opposite corner areas. The machine included a filing device for filling the food stuffing in the edible skin at a location on one side of the diagonal line of the shape of the skin adjacent the first corner area while the skin was placed on a support table. The machine also included a folding device effective to fold the first corner area of the skin, which has been filled with the food stuffing, so as to overlay the food stuffing and then turn backwards and also to fold the third and fourth corner area on respective sides of the food stuffing so as to overlay the food stuffing at a location opposite to the portion of the food stuffing where the first corner area had overlaid, and a rolling device for rolling the second corner area of the skin up around the food stuffing to complete the formation of the egg roll, spring roll, crepe or the like.

U.S. Pat. No. 4,640,670 patented Feb. 3, 1987 by A. G. Svengren et al provided an apparatus for the preparation of a rolled pastry product. In the patented apparatus a sheet of pastry material advanced on a conveyor belt and was cut and folded into discrete pieces of a predetermined size and then rolled. The cutting and folding operation was carried out by an oscillating knife positioned above the conveyor belt and having a cutting edge extending laterally across the width of the conveyor belt, which immediately after contacting and cutting through the advancing pastry sheet by means of its cutting edge, ascended and rotated in a direction such that the motional vector of the cutting edge was counter to the conveying direction, thereby causing the forward edge of the pastry sheet to be lifted up and folded over. The knife then descended and rotated in the reverse direction so that the cutting edge contacted and cut through the advancing pastry sheet behind the folded position to separate a folded piece from the remainder of the pastry sheet.

U.S. Pat. No. 4,651,635 patented Mar. 24, 1987 by S. A. Ally provided an apparatus for making pastries such as those known as "samosas". The invention provided a method of producing a multi-layered folded pastry comprising the steps of: forming dough into a thin sheet; cutting a leaf of dough from the end of the formed sheet; depositing the leaf onto a folding table comprising a plurality of movable plate elements disposed adjacent one another; and folding the leaf of dough from one or both ends thereof through pivotal movement of the plate elements to form a multi-layered folded pastry. The invention also provided pastry machinery for forming a multi-layered pastry comprising a dough extruder which formed dough into sheet form, a pre-cooking station for the sheet of dough, a moistening station, a cutting station and means for transporting a cut leaf of dough onto a folding device. The folding device folded the pastry through a series of folds once a charge of filling has been deposited on the leaf of dough.

U.S. Pat. No. 4,691,627 patented Sep. 8, 1987 by G. F. Roberts provided apparatus for making food products, such as burritos, having fillings, wrapped or enrobed in dough sheets, such as tortillas. Dough sheets were conveyed to a first station of the apparatus wherein a rotatably reversing crease-forming roller operated in conjunction with the discharge end of a dough sheet conveyor and its non-reversing end roller to form a downward crease or groove in each dough sheet while simultaneously a predetermined quantity of filling was deposited into the crease or groove. Each dough sheet having a crease or groove with a filing deposited therein was conveyed through a series of stations wherein the dough sheet was folded and formed into a wrapper encasing or enrobing the filing.

U.S. Pat. No. 4,716,821 patented Jan. 5, 1988 provided a line for assembling stuffed proteinaceous patties. All components of the line were mechanically synchronized to maintain a consistent pitch throughout the assembling procedure. Included was a patty forming means that deposited proteinaceous patties, such as ground meat patties, onto a moving conveyor assembly thereby to define the desired pitch. Edible filling materials, such as sauces, condiments and/or cheeses where deposited onto this patty at the given pitch. Another patty was deposited thereover while the product being formed continues to flow on the generally straight-line conveyor assembly. Thereafter, a knitting station impresses projections or pins through the outer periphery of the upper patty and into the lower patty such that, after removal of the pins by the device, the patties were knitted together, and the filing was encapsulated therewithin.

SUMMARY OF THE INVENTION (a) Aims of the Invention

In spite of these many patents there is still a need for an improved simple method for producing folded and rolled food products of uniformly high quality at a high rate of production.

(b) Statements of Invention

The present invention provides a method for the production of a generally-cylindrical overlapped-folded, loaded, rolled dough food product comprising: a) providing a substantially square sheet of dough at a diamond orientation at a first discrete stationary zone; b) advancing the sheet of dough at its diamond orientation from the first discrete stationary zone to at least one foodstuff dispensing zone downstream thereof, stopping the advancing at the food-stuff dispensing zone, and loading at least one foodstuff onto a discrete region of the upper surface of the sheet of dough while the sheet of dough is stationary, whereby the foodstuff appears as a pile only atop the upper surface of the sheet of dough while the lower surface of the sheet of dough remains substantially-flat; c) advancing the sheet of dough which is loaded with at least one food-stuff only on the upper surface thereof to a loaded dough sheet folding zone downstream thereof, stopping the advancing at the folding zone, and folding opposed transverse corners of the diamond-shaped loaded sheet of dough inwardly to cover the pile of foodstuff which is atop only the upper surface of the sheet of dough and to meet and overlap slightly at the centre, thereby providing a substantially-hexagonally-shaped, overlapped-folded, loaded sheet of dough, while the sheet of dough is stationary, whereby the foodstuff appears as a covered pile only atop the upper surface of the sheet of dough while the lower surface of the sheet of dough remains substantially-flat; d) advancing the substantially-hexagonally-shaped, overlapped-folded, loaded sheet of dough where the foodstuff appears as a covered pile atop only the upper surface of the sheet of dough while the lower surface of the sheet of dough remains substantially-flat to a loaded, folded, dough sheet rolling zone downstream thereof, stopping the advancing at the rolling zone, and rolling the substantially-hexagonally-shaped, overlapped-folded, loaded sheet of dough, by gripping and raising one angular point of the hexagonally-shaped sheet of dough and rolling that gripped and raised angular point over the top of the covered pile of foodstuff atop only the upper surface of the sheet of dough as far as the opposed angular point of the hexagonally-shaped sheet of dough so that the gripped and raised angular point is rolled at least 2½ revolutions, thereby providing a generally-cylindrical, overlapped-folded, loaded, rolled dough product, while the sheet of dough is stationary; and e) discharging the generally-cylindrical, overlapped-folded, loaded, rolled dough product to a discharge zone.

The present invention also provides a method for the production of a generally-cylindrical overlapped-folded, loaded, rolled dough food product comprising: a) providing a substantially-square-shaped sheet of dough at a diamond orientation at a first discrete zone on an endless circular path; b) advancing the sheet of dough at its diamond orientation from the first discrete to at least one foodstuff dispensing zone at a second discrete zone on the endless circular path, stopping the advancing at the foodstuff dispensing, second discrete zone, and actuating selected mechanism at the foodstuff dispensing, second discrete zone, thereby to load at least one foodstuff onto a discrete region of the upper surface of the sheet of dough while the sheet of dough is stationary, whereby the foodstuff appears as a pile only atop the upper surface of the sheet of dough while the lower surface of the sheet of dough remains substantially-flat; c) advancing the sheet of dough which is loaded with at least one foodstuff on the upper surface thereof to a folding zone at a folding third discrete zone on the endless circular path, stopping the advancing at the third discrete folding zone and actuating selected folding mechanism at the third discrete folding zone, thereby to fold opposed transverse corners of the diamond-shaped, loaded sheet of dough inwardly to cover the pile of foodstuff atop only the upper surface of the sheet of dough and to meet and overlap slightly at the centre, thereby providing a substantially-hexagonally-shaped, overlapped-folded, loaded sheet of dough, while the sheet of dough is stationary, whereby the foodstuff appears as a covered pile only atop the upper surface of the sheet of dough while the lower surface of the sheet of dough remains substantially-flat; d) advancing the substantially-hexagonally-shaped, overlapped-folded, loaded sheet of dough where the foodstuff appears as a covered pile atop only the upper surface of the sheet of dough while the lower surface of the sheet of dough remains substantially-flat to a rolling zone at a fourth discrete rolling zone on the endless circular path, stopping the advancing at the fourth, discrete rolling zone, and actuating selected rolling mechanism at the fourth, discrete rolling zone, thereby to roll the substantially-hexagonally-shaped, overlapped-folded, loaded sheet of dough, by gripping and raising one angular point of the substantially-hexagonally-shaped folded sheet of dough and rolling that gripped and raised angular point over the top of the covered pile of foodstuff atop the upper surface of the sheet of dough as far as the opposed angular point of the substantially-hexagonally-shaped sheet of dough so that the gripped and raised angular point is rolled at least 2½ revolutions, thereby providing a generally-cylindrical, overlapped-folded, loaded, rolled dough product, while the loaded, substantially-hexagonally-shaped folded sheet of dough is stationary; and e) discharging the generally-cylindrical, overlapped-folded, loaded, rolled dough product to a discharge zone.

The present invention also provides a method for the production an overlapped-folded, filled, rolled food product comprising: a) placing a square-shaped sheet of dough at a diamond-shaped orientation at a first discrete zone on a longitudinal path; b) advancing the square-shaped sheet of dough in its diamond-shaped orientation along the longitudinal path from the first discrete zone to at least one foodstuff dispensing second, discrete zone, stopping the advancing at the foodstuff dispensing second discrete zone, and loading at least one foodstuff onto a discrete region of the upper surface of the diamond-shaped sheet of dough, while the sheet of dough is stationary, whereby the foodstuff appears as a pile only atop the upper surface of the sheet of dough while the lower surface of the sheet of dough remains substantially-flat, thereby providing a loaded, diamond-shaped, sheet of dough; c) advancing the loaded diamond-shaped sheet of dough along the longitudinal path to a folding third discrete zone downstream thereof, stopping the advancing at the folding third discrete zone, and folding opposed lateral corners of the loaded diamond-shaped sheet of dough inwardly until their apices cover the pile of foodstuff only atop the upper surface of the sheet of dough and to meet and overlap, thereby providing a substantially-hexagonally-shaped, overlapped-folded, loaded sheet of dough, while the sheet of dough is stationary, whereby the foodstuff appears as a covered pile only atop the upper surface of the sheet of dough while the lower surface of the sheet of dough remains substantially-flat; d) advancing the substantially-hexagonally-shaped, overlapped-folded, loaded sheet of dough along the longitudinal path to a loaded, folded dough sheet fourth discrete rolling zone downstream thereof, stopping the advancing at the fourth discrete rolling zone and rolling the substantially-hexagonally-shaped, overlapped-folded, loaded sheet of dough, by gripping and raising one angular point of the substantially-hexagonally-shaped folded sheet of dough and rolling the gripped and raised angular point over the top of the covered pile of foodstuff atop only the upper surface of the sheet of dough as far the opposed angular point of the substantially-hexagonally-shaped sheet of dough, so that the gripped and raised angular point is rolled at least 2½ revolutions, thereby providing a generally-cylindrical, overlapped-folded, loaded, rolled dough product, while the substantially-hexagonally-shaped, over-lapped-folded, loaded sheet of dough is stationary; and e) discharging the generally-cylindrical, overlapped-folded, loaded, rolled dough product to a discharge zone.

The present invention also provides a finger roll comprising a diamond-shaped, loaded sheet dough whose transverse corners have been folded inwardly to overlap at the centre to form a substantially-hexagonally-shaped sheet of dough in which a pile of foodstuff only atop the sheet of dough is covered, which is then rolled by gripping and raising one angular point of the substantially-hexagonally-shaped sheet of dough and rolling the gripped and raised angular point over the top of the covered pile of foodstuff only atop the upper surface of the sheet of dough as far as the opposed angular point of the substantially-hexagonally-shaped sheet of dough, so that the gripped and raised angular point is rolled at least 2½ turns from one angular point of the substantially-hexagonally-shaped sheet of dough to the opposed angular point of the substantially-hexagonally-shaped sheet of dough to provide a generally cylindrical, overlapped folded, loaded rolled-up dough product.

(c) Further Features of the Invention

In one embodiment of the method of the invention, step (b) may include applying a band of egg mixture along the two leading edges of the diamond-shaped sheet of dough. In such embodiment, step (b) may also include one or more of the following steps, namely in step (b) a band of tomato paste is applied along a longest transverse dimension of the diamond-shaped sheet of dough; and/or in step (b) pepperoni is sliced and deposited atop the tomato paste which had previously been applied along a longest transverse dimension of the diamond-shaped sheet of dough; and/or in step (b) cheese is sliced and deposited atop the pepperoni which had previously been applied along a longest transverse dimension of the diamond-shaped sheet of dough. In such embodiment, step (b) may alternatively also include the following step, namely, in step (b) a band of minced foodstuff is applied along a longest transverse dimension of the diamond-shaped sheet of dough.

In one preferred embodiment of the method of this invention, in step (b) a band of egg mixture is applied along the two leading edges of the diamond-shaped sheet of dough, a band of tomato paste is applied along a longest transverse dimension of the diamond-shaped sheet of dough, pepperoni is sliced and deposited atop the tomato paste which had previously been applied along a longest transverse dimension of the diamond-shaped sheet of dough, and cheese is sliced and disposed atop the pepperoni which had previously been applied along a longest transverse dimension of the diamond-shaped sheet of dough.

In another preferred embodiment of the method embodiment of this invention, in step (b) a band of egg mixture is applied along the two leading edges of the diamond-shaped sheet of dough and a band of minced foodstuff is applied along a transverse dimension of the diamond-shaped sheet of dough.

In another embodiment of the method of this invention, in step (b), the following alternative steps may be carried out: a band of egg mixture is applied along the two leading edges of the diamond-shaped sheet of dough; a band of tomato paste is applied along a transverse dimension of the diamond-shaped sheet of dough; pepperoni is sliced and pepperoni slices are deposited atop the tomato paste which had previously been applied along a transverse dimension of the diamond-shaped sheet of dough; cheese is sliced and cheese slices are deposited atop the slices of pepperoni which had previously been sliced and deposited atop the tomato paste which had previously been applied along a transverse dimension of the diamond-shaped sheet of dough; a band of minced foodstuff is applied along a transverse dimension of the diamond-shaped sheet of dough; a band of egg mixture is applied along the two leading edges of the diamond-shaped sheet of dough and a band of minced foodstuff is applied along a transverse dimension of the diamond-shaped sheet of dough.

The finger roll of this invention preferably is in deep fried form, and in preferred embodiments, may be filed with tomato paste, pepperoni and cheese or filled with ground beef.

(iv) Generalized Description of the Invention

The present invention in one embodiment comprises a method for producing a foodstuff product known hereinafter as a "finger roll" formed in a manner to be particularly described hereinafter from a thin sheet of flour dough that is used to wrap and encapsulate various selected food ingredients therewithin. This produces a novel form of heretofore conventional edible food products, such as, egg rolls, spring rolls, manicotti, burritos, enchiladas, blintzes and canneloni. The sheet of dough is generally formed as a square-shaped sheet but is oriented as a diamond-shaped sheet of dough, which then has the food ingredients deposited centrally and transversely thereon in an elongated manner so as to allow the opposite corners of the sheet first to be folded towards and overlap slightly with one another and then to be rolled into the finger roll.

In order to produce that novel edible food product automatically, the apparatus used in the method of this invention comprises a supporting elongated frame structure having a continuous conveyor system mounted thereto. Sequentially arranged along the length of the frame structure are a plurality of assemblies or stations the first of which serves to place the square-shaped dough sheet on the conveyor in a particular orientation, i.e., as a diamond-shaped sheet of dough. Subsequent assemblies of stations serve to dispense the required food ingredients onto the dough sheet. Still other assemblies or stations then sequentially serve to fold and overlap the filled dough sheet to an approximate hexagonal shape and then serve to roll the overlapped-folded, filled dough sheet into a substantially-cylindrical roll. All these operations are performed on the dough sheet while it is temporarily stationary, as the dough sheet is intermittently moved from the forward end to the rearward end of the apparatus. The finger roll is then discharged from the apparatus to a further pressing apparatus, preferably a deep fryer.

To simplify the summary of the apparatus used in the method of the present invention the following description relates to various stations wherein a particular action or step takes place.

Station A represents the beginning of the operation and will be known as the forward or front end of the frame structure and station E will represent the rear or back end thereof. Once the apparatus is started, the conveyer moves forward where the thin, square shaped sheet of dough, which is stacked in quantities on the novel stacking and dispensing apparatus (to be described in greater detail hereinafter) at station A is removed from station A and is individually placed on the continuous conveyer in a particular orientation. The conveyer moves forward and stops at station B and a first set of foodstuff ingredients, e.g. egg mixture and tomato paste are dispensed on the dough sheet (in a manner to be described hereinafter), by means of a novel dispensing device (to be described in greater detail hereinafter).

The conveyor again moves forward, passing the dough sheet with the first series of foodstuff ingredients thereon, to stop upon reaching station C. At this station, a second series of foodstuff ingredients, e.g. pepperoni, is sliced and loaded onto the dough sheet by means of a novel pepperoni slicing and loading device (to be described in greater detail hereinafter).

The conveyer moves forward again to stop upon reaching station D. At this station, a third series of foodstuff ingredients, e.g. cheese, is sliced and loaded onto the dough sheet by means of a novel cheese slicing and loading device (to be described in detail hereinafter).

The conveyer moves forward again, to stop at station E. Station E is a dough folding station where the diamond-shaped piece of dough, filled along its longest transverse axis is first held down at its opposed longitudinal corners, and then its two diametrically-opposed exposed transverse corners are folded over (by a dough folding device to be described in greater detail hereinafter) so that their apices overlap slightly at the centre of the dough sheet, and so that the folded-over portions adopt a slightly-tapered, but generally hexagonally-shaped, configuration.

Following this operation, the conveyer is then moved to stop at station E, where the folded-over dough sheet is gripped and rolled by the two fingers or the single finger of novel rolling devices (to be described in greater detail hereinafter).

Then the novel product i.e., the finger roll so formed is discharged, and preferably, is fed to a second conveyor, and then to a deep frying apparatus (which does not form a part of the present invention).

Various synchronizing means are included herein so as to provide the necessary sequence of start-and-stop movement of the conveyer, coordinated with the actuation of each of the devices at each of the processing stations. Such synchronization means can be in the form of limit switches, or, preferably includes various motors controlled by a specially written software program in a microprocessor.

The novel product, i.e. the finger roll, is a dough sheet, originally oriented as a diamond shape, having a core of edible foodstuff ingredients as a filling distributed along its longest width, then having its opposed corners at its longest length folded over to overlap slightly at the centre of the dough sheet, and then being rolled at least 2½ times, to form the over lapped-folded, rolled filled food product. Such product is then preferably deep fried.

BRIEF DESCRIPTION OF THE INVENTION

In the accompanying drawings,

FIG. 6 is a perspective view (with the fluid foodstuff tanks omitted for clarity) of the first foodstuff loading station of the food production apparatus of the embodiment of FIG. 1;

FIG. 7 is a side elevational view of the first foodstuff loading station shown in FIG. 6;

FIG. 8 is a top plan view of the lowermost level of the first foodstuff loading station shown in FIG. 6;

FIG. 12 is a perspective view of a cheese slicing and loading station of the food production apparatus of the embodiment of FIG. 1;

FIG. 13 is a side elevational view of the cheese slicing and loading station shown in FIG. 12;

FIG. 14 is a top plan view of the cheese slicing and loading station shown in FIG. 12;

FIG. 19 is a transverse section through the table and the conveyor of the rolling station shown in FIG. 18;

FIG. 20 is a top plan view of the rolling station shown in FIG. 18 and FIG. 19;

FIG. 21 is a longitudinal elevational view of a product unloading station;

FIG. 34 is a side elevational view of one embodiment of the egg and tomato paste station of the second embodiment of the invention;

FIG. 35 is a top plan view of the egg and tomato paste station shown in FIG. 34;

FIG. 36 is a top plan view of one embodiment of the pepperoni slicing and loading station of the second embodiment of the invention;

Figure 1:
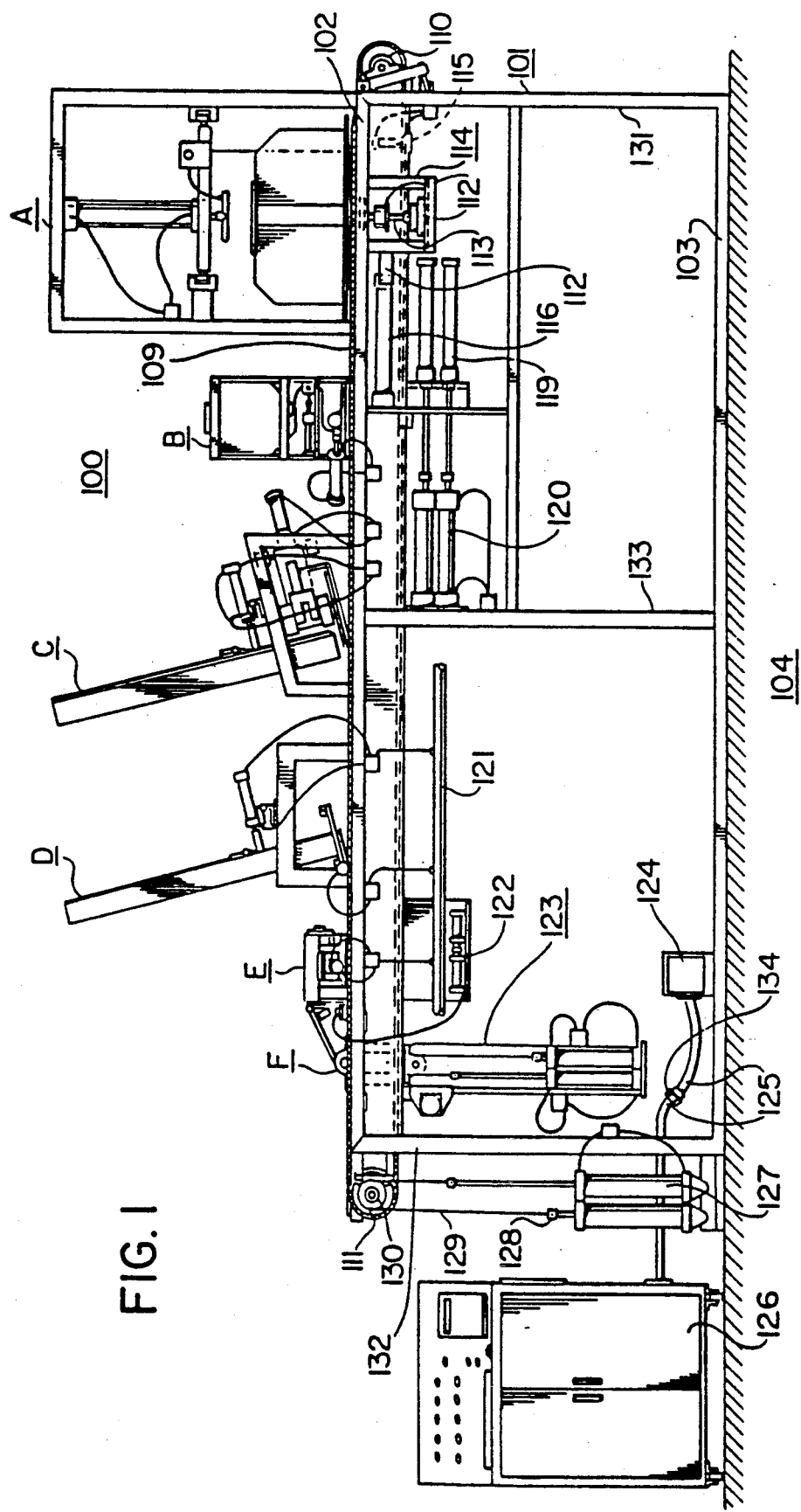
FIG. 1 is a side elevational view of the food production apparatus of one embodiment of this invention.
Figure 2:
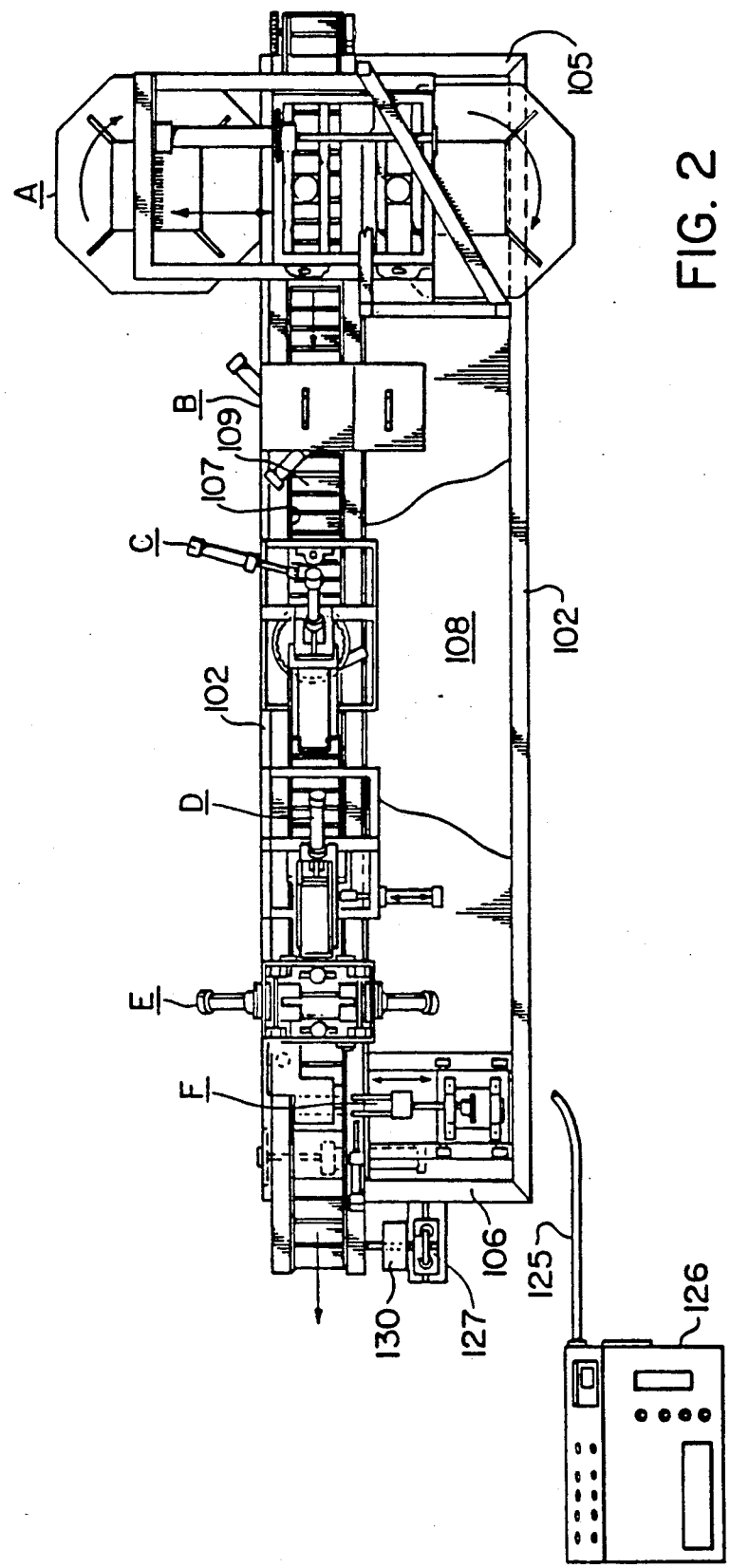
FIG. 2 is a top plan view of the food production apparatus of the embodiment of FIG. 1.

DESCRIPTION OF PREFERRED EMBODIMENTS (i) Description of FIGS. 1 and 2

As seen generally in FIGS. 1 and 2, the apparatus 100 of this invention is built around a main frame 101 including a pair of upper, spaced-apart parallel longitudinal beams 102, a pair of lower, spaced-apart longitudinal bases 103, resting on a floor 104, a front vertical leg 131, a rear vertical leg 132 and an intermediate vertical leg 133, a pair of upper, transverse, spaced-apart connecting fore 105 and aft 106 end transverse beams and a pair of lower, transverse, spaced-apart, connecting fore and aft end transverse beams (not seen). Mounted within a longitudinal slot 107 in the upper table 108 supported on the top of the main frame 101 is a controlled, intermittently driven conveyor 109, entrained around a fore over-ride clutch, chain-driven, drive sprocket 110 and an aft idler and tensioner sprocket 111.

The main frame 101 serves not only to support the conveyor 109, and to provide a base table 108 for the superposed processing stations (to be described in detail hereinafter), but also to provide a site below table 108 for the operating mechanisms.

Thus, the frame provides a site near the fore end to accommodate a pair of over-ride clutch chain-driven sprockets 112, each driving a respective shaft 113 for a respective dough tray to be described later. This drive shaft mechanism is supported within a depending framework 114. It provides a site for the cylinder 115 for indexing the dough trays. It provides a site for the two tandemly-operated, pneumatic cylinders 116 (only one of which is seen), the rod ends 117 of which are tied to a chain 118 (see FIG. 3), so that operation of the cylinders 116 result in rotation of the pair of sprockets 112, one sprocket in a clockwise direction, the other sprocket in a counter clockwise direction, to result in corresponding rotations of the respective dough trays. It provides the site for vacuum cylinders 119, driven by pneumatic cylinders 120, to supply the vacuum to the vacuum pick-up heads (to be described later) of the dough pick-up cylinders (to be described later).

At the aft end, it provides the site for the air supply manifold 121 for the pneumatic cylinders (to be described later) which operate the various processing stations, as well as the vacuum cylinders 122 to supply vacuum to operate the vacuum pick-up pads (to be described later). There is also provision for a depending carriage 123 which moves the operating members at the product rolling station (to be described later). There is also provision for the main junction box 124 and the plugs 134 connected by line 125 to the console 126 for the preferred microprocessor which controls the synchronized operation of the apparatus. At the aft end of the framework 101 are a pair of tandemly operated pneumatic cylinders 127, the rod ends 128 of which are tied to a chain 129 entraining a sprocket 130 controlling the idler and tensioner sprocket 111. For esthetic appearance, the main frame is also enclosed by a skirt (not seen) at the two lateral sides and at the fore and aft ends.

As mentioned before, the main frame 101 provides the base 108 for the frames (to be described later) supporting the various processing stations (to be described later).

The processing stations mounted above the conveyor are:

| | |
|---|---|
| Station A | Dough Sheet Loading, Unloading and Feeding Station; |
| Station B | First (Egg Mixture & Tomato Paste) Foodstuff Ingredient Station; |
| Station C | Second (Pepperoni Loading) Foodstuff Ingredint Station; |
| Station D | Third (Cheese Loading) Foodstuff Ingredient Station; |
| Station E | Filled Dough Sheet Folding Station; |
| and Station F | Filled, Folded Dough Sheet Rolling Station; |

Figure 3:
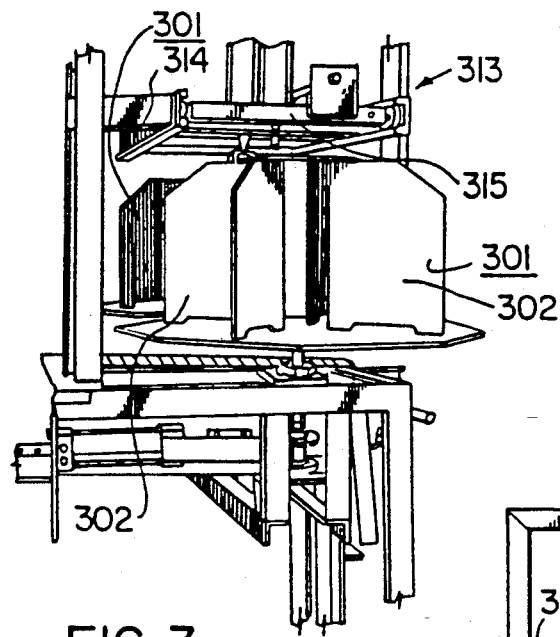
FIG. 3 is a perspective view of the dough sheet loading, unloading and feeding station of the food production apparatus of the embodiment of FIG. 1.
Figure 4:
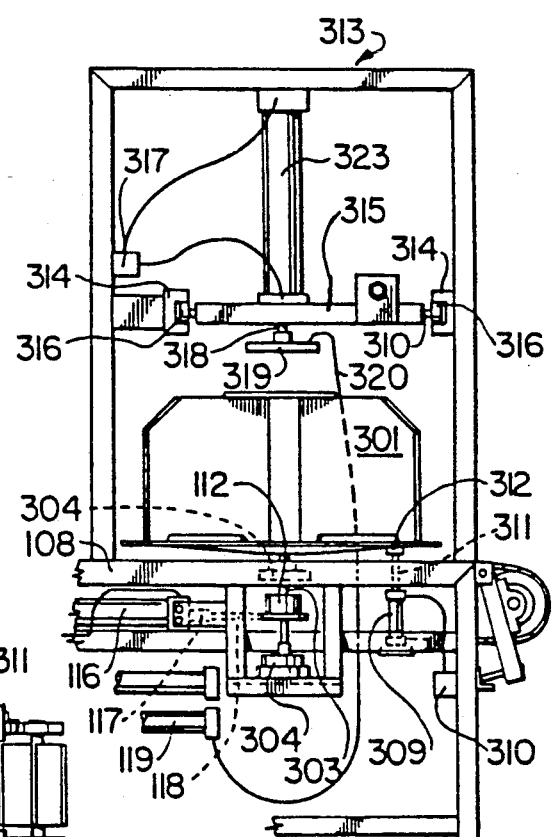
FIG. 4 is a side elevational view of the dough sheet loading, unloading and feeding station shown in FIG. 3.
Figure 5:
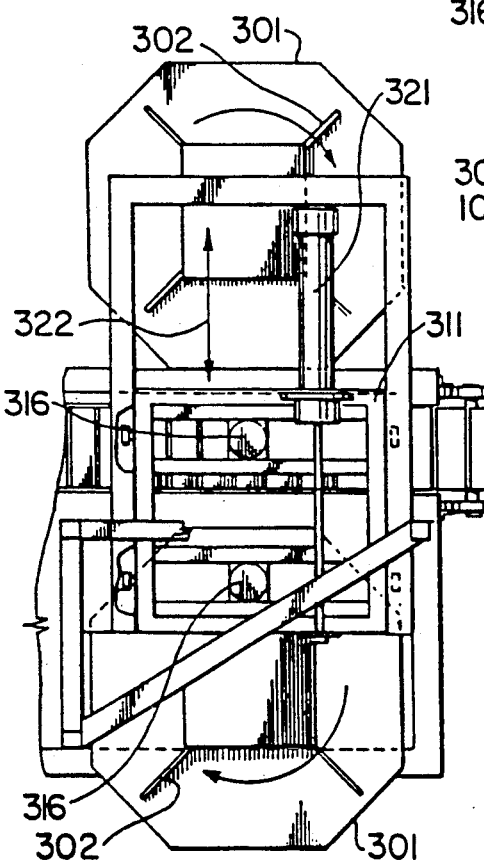
FIG. 5 is a top plan view of the dough sheet loading, unloading and feeding station shown in FIG. 4.

(ii) Description of FIGS. 3, 4 and 5

As seen in FIGS. 3, 4 and 5, the dough sheet loading, unloading and feeding station A includes a pair of identical, rotatable dough trays 301, which each divided into a plurality of equal sections, e.g. in quarters by dividers 302. Each dough tray 301 is supported on a shaft 303 which extends upwardly through the upper table 108. The shaft 303 is rotatably mounted between conventional bearings 304 and is driven by an over-ride clutch, intermittently-rotated chain driven sprocket 112, chain drive by a pneumatic cylinder drive arrangement, which includes a drive chain 118 tied to the rod end 117 of the pneumatic cylinder 116. Each dough tray 301 is provided with an indexing means comprising a pneumatic cylinder 309, controlled by control box 310, the rod end 311 of which is adapted to abut an associated lug 312 (of four equally spaced lugs on the bottom of the dough tray 301), so as to stop the rotation of the dough tray 301 at an exact predetermined position. To continue the rotation of the dough tray 301, the rotation drive arrangement is actuated at the same time the rod end 311 is withdrawn from abutment with the lug 312 during the return stroke of the cylinder 309. As soon as the rotation of the dough tray 301 begins again, the cylinder 309 is actuated to its power stroke to raise the rod end 311 upwardly into contact with the bottom of the dough tray 301. When the rod end 311 abuts the next lug 312, the rotation of the dough tray 301 is braked to a stop as the rotation drive arrangement is deactivated.

Each quarter of each dough tray 301 is loaded, e.g. manually by an operator, with square-shaped sheets of dough, in quantities of, e.g., eighty.

A support frame 313 is disposed completely above one of the pair of dough trays 301. The support frame 313 supports a transverse track 314 extending across the width of the table 108 from one dough tray 301 to the other dough tray 301. A carriage 315 is rollably mounted within the track on rollers 316 to traverse the width of the conveyor 109 and the width of the table 108. The carriage 315 supports a pair of vertically-mounted pneumatic cylinders 323, operated from respective box 317, the rod ends 318 of which are each fitted with a vacuum pick-up head 319, operated through line 320 from vacuum cylinder 119.

The square-shaped sheets of dough are placed on the conveyor in a particular orientation, e.g. they look like a diamond when viewed from above.

(iii) Description of FIGS. 6, 7 and 8

Station B, shown in FIG. 6, FIG. 7 and FIG. 8 includes a main frame 601 supporting an upper sub-station 602, an intermediate sub-station 603 and a lower sub-station 604. The upper sub-station includes a tank 605 for tomato paste or sauce, and a tank (not seen) for a beaten egg mixture. Each tank leads to a premeasuring unit including an entry chamber 606, connected by a line 607 to the tank, e.g., 605 above. Each entry chamber 606 is connected by its associated T-union 608 to an outlet chamber 609 connected to a dispensing plunger mechanism in a dispensing chamber 611 which is operated by a pneumatic cylinder 610. The power stroke of the plunger mechanism is pre-set to dispense the exact amount of the tomato paste sauce or the egg mixture respectively, through its associated dispensing chamber 611. Each of the entry chambers 606 and the outlet chambers 609 is provided with a valve, operated in synchronism by respective valve cylinders 612. When the dispensing mechanism is operating to dispense tomato paste or egg mixture respectively through dispensing chamber 611, the entry valve to the entry chamber 606 operated by the entry cylinders is closed, while the dispensing valve from the outlet chamber 609 operated by the dispensing cylinders is open; and vice versa.

The tomato paste premeasuring station has a feed line 613 from its associated dispensing chamber 611 to a tomato paste spreader 614 which is secured to the rod end 615 of a transversely-mounted pneumatic cylinder 616.

The egg-mixture premeasuring station has an associated feed line 617 from its associated dispensing chamber 611 to each of two egg solution spreaders 618. Each spreader 618 is at the rod end 619 of a respective one of two mutually perpendicularly-oriented pneumatic cylinders 620. The cylinders 620 are oriented along the two leading edges of the diamond-shaped sheet of dough.

The diamond-shaped sheet of dough now has a rectangular area of tomato paste spread across its longest transverse axis, and also has a band of egg mixture solution along its two front or leading edges.

Figure 9:
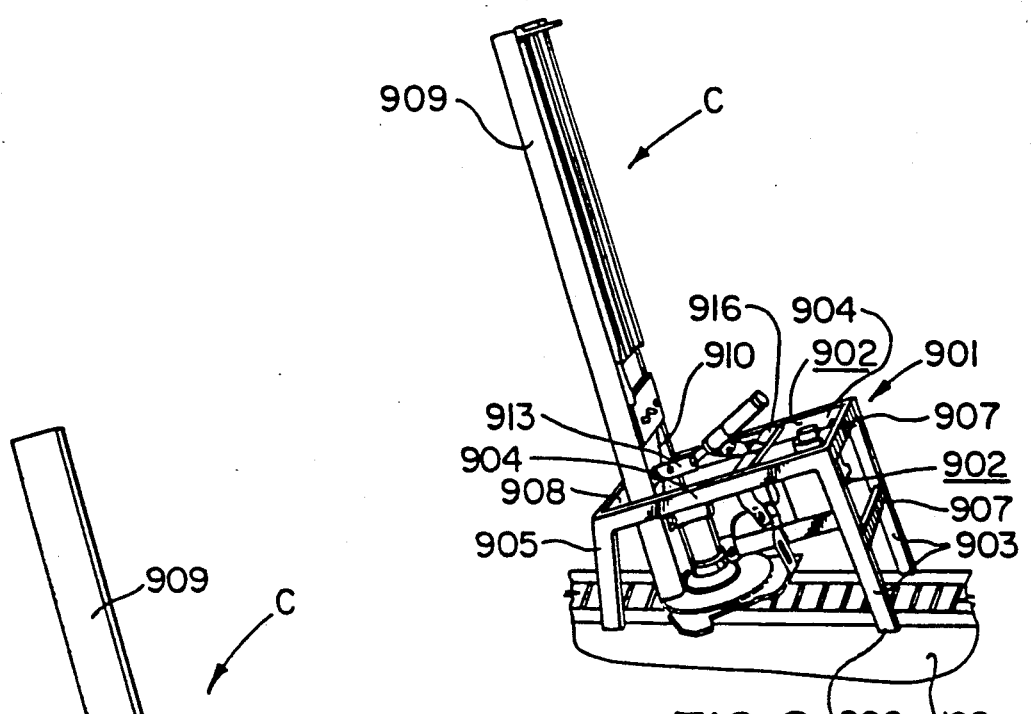
FIG. 9 is a perspective view of a pepperoni slicing and loading station of the food production apparatus of the embodiment of FIG. 1.
Figure 10:
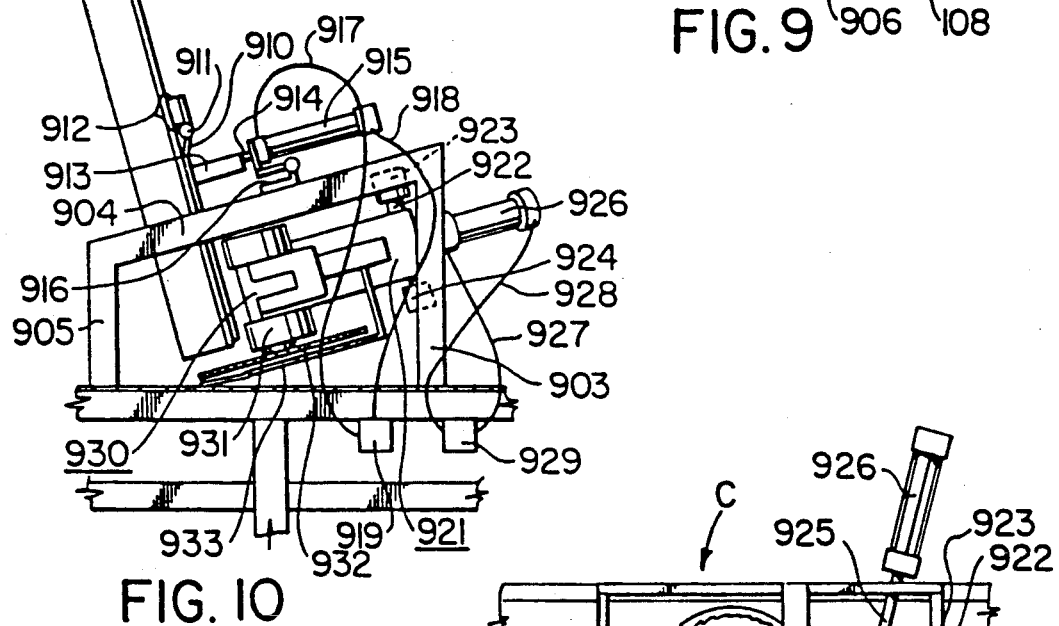
FIG. 10 is a side elevational view of the pepperoni slicing and loading station shown in FIG. 9.
Figure 11:
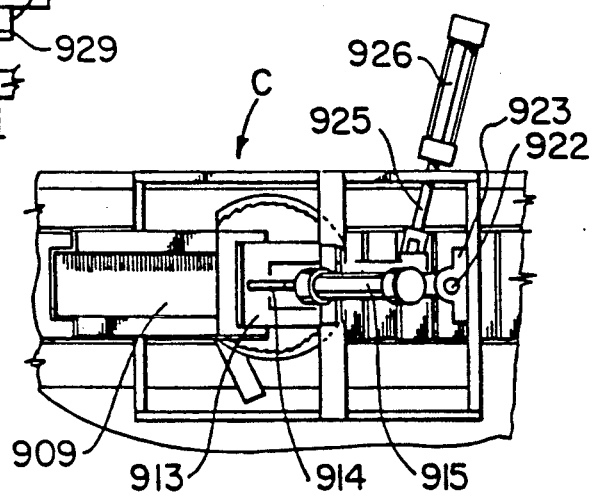
FIG. 11 is a top plan view of the pepperoni slicing and loading station shown in FIG. 9.

(iv) Description of FIGS. 9, 10 and 11

The pepperoni slicing loading station C shown in FIG. 9, FIG. 10 and FIG. 11 includes a three dimensional frame 901 including a pair of side frame members 902 constituted by a fore brace 903, a rearwardly and downwardly sloping longitudinal support member 904 and an aft shorter brace 905, the two side frame members being secured at their lower ends 906 to the table 108, and being interconnected at their fore and aft upper ends by a pair of fore 907 and a single aft 908 cross members, respectively.

An elongated holding tray 909 is secured to the side frame members 904, the holding tray 909 being for the purpose of supporting a plurality, e.g. three pepperoni sticks. A power-operated brake flap 910 is hingedly secured by transverse pivot 911 to a mid portion 912 of the holding tray 909 and is actuated to open (to allow entry of the pepperoni sticks) and to close (to allow gripping of the pepperoni sticks in an upright position) by means of a bar 913 secured to the rod end 914 of a pneumatically-operated cylinder 915 secured to a support member 916 of the frame 901. The cylinder 915 is operated by air lines 917, 918 from box 920.

A swingable carriage 921 is mounted to the force end of the side frame members. Such swingable carriage 921 is secured to a rod 922, which is supported on an upper 923 and lower 924 pair of bearing mounts. The carriage is adapted to be intermittently swivelled by means of connection to the rod end 925 of a pneumatic cylinder 926.

A slicing arrangement 930 is secured to the swingable carriage 921, the slicing arrangement 930 including a pneumatic motor 931 which is activated intermittently to rotate a cutter blade 932. The thickness of the pepperoni sliced by the cutter blade 932 is controlled by a blade depth gauge plate 933. The cylinder is operated by air lines 927, 928, from box 929.

(v) Description of FIGS. 12, 13 and 14

The cheese slicing and loading station D shown in FIG. 12, FIG. 13 and FIG. 14 includes a three dimensional frame 1201 including a pair of side frame members 1202, each constituted by a fore upright leg 1203, a longitudinal support member 1204 and an aft upright leg 1205, the two side frame members being secured at their lower ends 1206 to the table 108, and being interconnected at their fore and aft upper ends by fore 1206 and aft 1207 transverse cross members, respectively.

An elongated holding tray 1208 is secured to the side frame members, the holding tray 1208 being for the purpose of supporting a square-cross section bar of cheese (not seen). A power operated brake flap 1210 is hingedly secured at transverse pivot 1211 to a mid portion 1212 of the holding tray 1208 and is actuatable to open (to allow entry of the cheese) and to close (to allow gripping of the cheese in an upright position) by means of a bar 1213 secured to the rod end 1214 of a pneumatically-operated flap cylinder 1215 secured by brace 1216 to an intermediate transverse cross bar 1231 of the frame 1201. Cylinder 1215 is operated by air lines 1217a, 1217b from box 1218, connected by air line 1219 to air conduit 121.

A pair of spaced-apart transverse tracks, namely a fore, upper track 1220 and a rear, lower track 1221 is secured to the leading and trailing edges respectively of a rearwardly downwardly slopping transverse carriage 1222. A transverse cutter blade 1223 is reciprocally- and rollably-mounted in the tracks 1220, 1221 by means of rollers 1224. The blade 1223 is reciprocated across the transverse width of the conveyor 109 by means of connection to the rod end 1225 of a pneumatical cylinder 1226. Cylinder 1226 is operated from air line 1227, from box 1228 connected by air line 1229 connected to air conduit 121. A manually-adjustable, thickness-adjusting plate 1230 is disposed below the cheese slicing blade.

Figure 15:
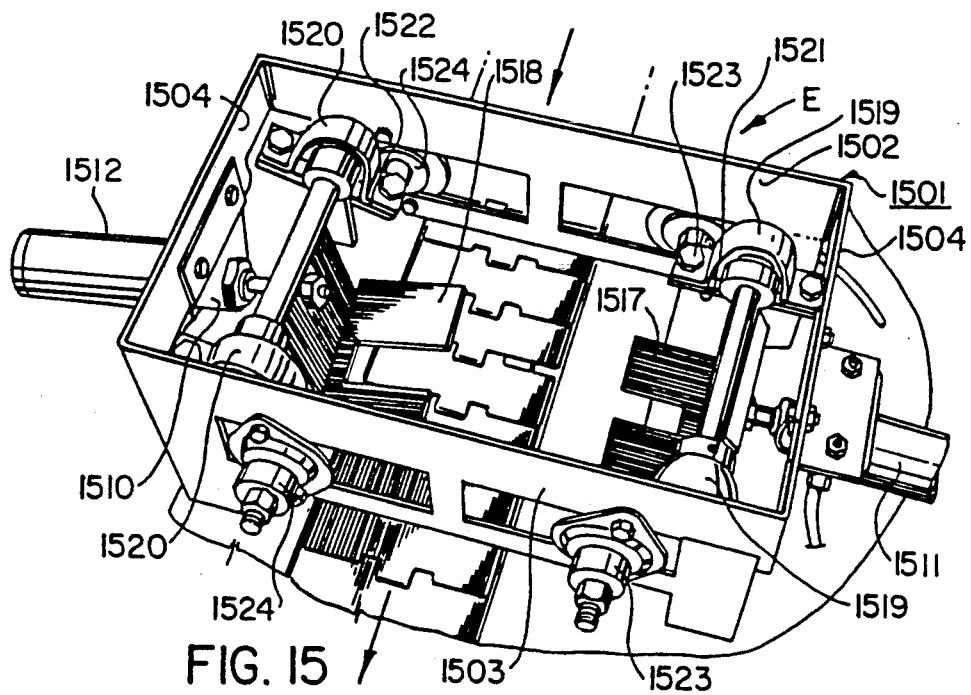
FIG. 15 is a perspective view of a dough folding station of the food production apparatus of the embodiment of FIG. 1.
Figure 16:
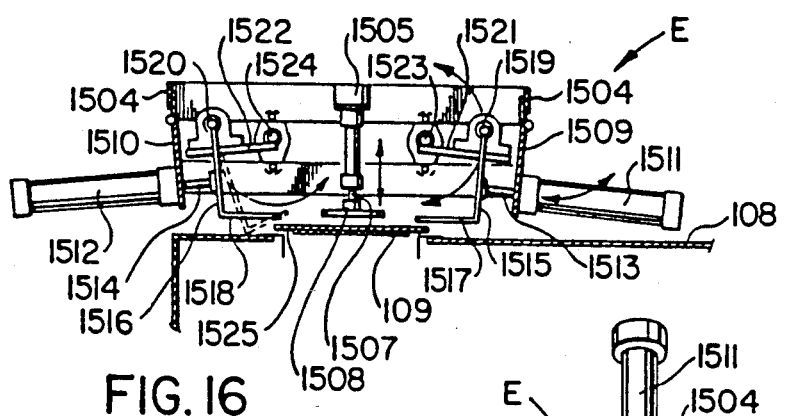
FIG. 16 is a transverse section through the table and the conveyor of the dough folding station shown in FIG. 15.
Figure 17:
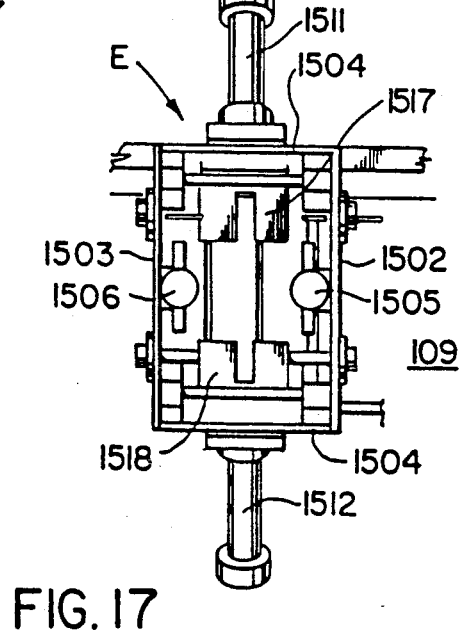
FIG. 17 is a top plan view of the dough folding station shown in FIG. 15.

(vi) Description of FIGS. 15, 16 and 17

The dough folder station E, shown in FIG. 15, FIG. 16 and FIG. 17 includes an open top and open bottom housing 1501 including upstream wall 1502 and downstream wall 1503 as well as two lateral and transverse walls 1504 disposed atop the table 108 and straddling the conveyor 109. Within the housing 1501 are a pair of vertically-disposed pneumatic cylinders 1505, 1506 disposed vertically above the central longitudinal axis of the conveyor. The rod ends 1507 of each cylinder carry a holddown plate 1508 while the aft plate only also carries an impression stamp (not shown).

On each side of the conveyor 109 and at the marginal side edges 1504 of the housing 1501 is a hingedly-mounted plate 1509, 1510 to which the cylinder end of a pneumatic cylinder 1511, 1512 is secured. The rod end 1513, 1514 of the cylinder 1511, 1512 is secured to a downwardly extending folder arm 1515, 1516 to which are attached lower, inwardly-extending spaced-apart folder fingers 1517, 1518. The upper end of the folder arm is pivotally secured to an outboard pivot bearing 1519, 1520 mounted on a mounting plate 1521, 1522, which itself is pivotally secured to an inboard pivot bearing 1523, 1524.

(vii) Description of FIGS. 18, 19, 20 and 21

Figure 18:
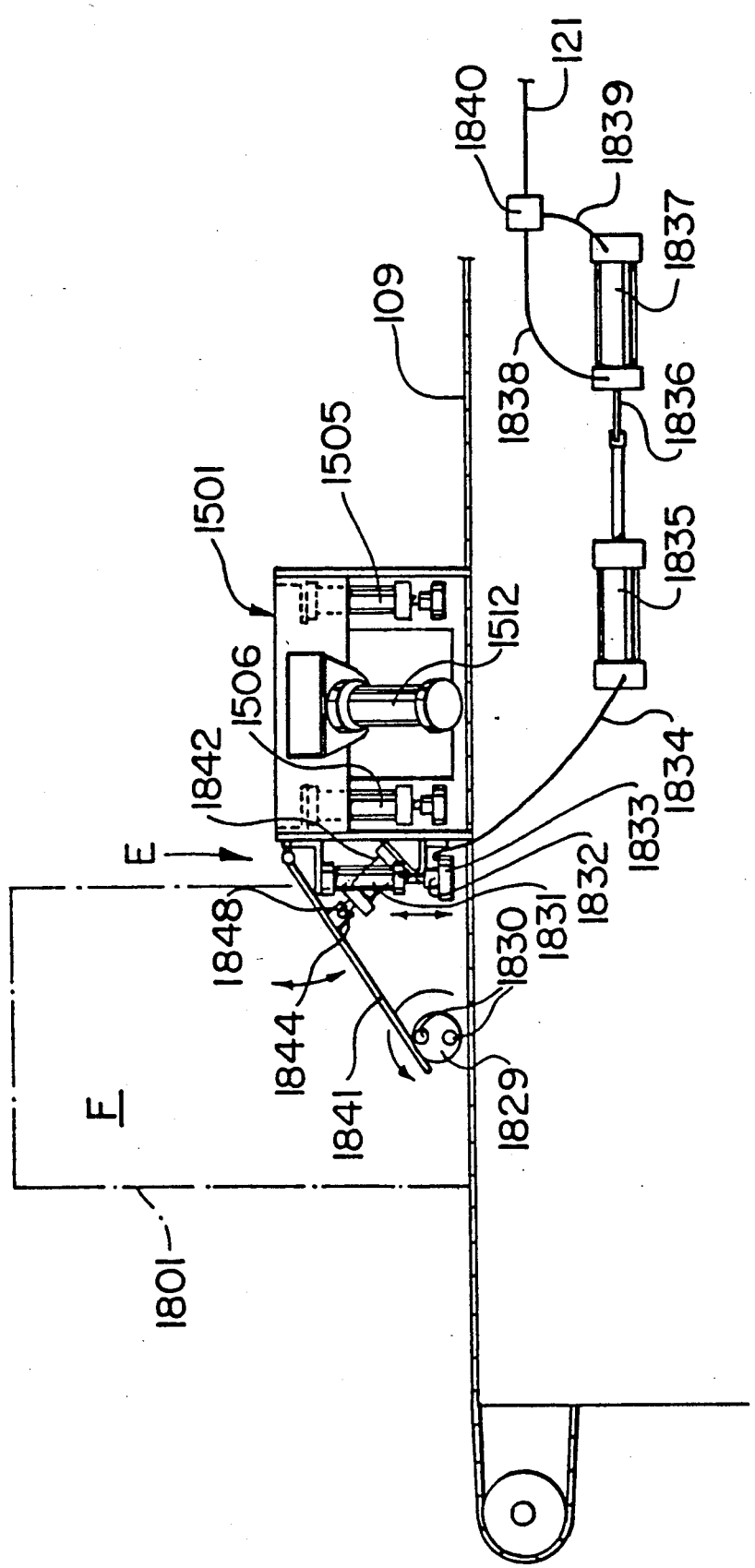
FIG. 18 is a longitudinal section through the table and the conveyor of a dough folding station and a downstream rolling station of the food production apparatus of FIG. 1.

In one alternative of a rolling station F, shown in FIG. 18, FIG. 19 and FIG. 20, an upwardly standing three dimensional frame 1801 is provided including a pair of lateral frameworks 1802, each including a fore (not seen) and aft 1804 upright column and an upper longitudinal cross-piece 1805, the pair of lateral frameworks 1802 being erected on one side of the conveyor with the base 1806 of the upright columns 1804 being secured to the table 108, and with the upper ends of the upright columns 1804 interconnected by fore 1807, and aft 1808 upper transverse bars.

Forward and aft longitudinally-spaced-apart pairs of upper and lower transverse, vertically-spaced-apart rails 1809 extend transversely across the lateral framework 1801 near the bottom thereof. A vertically-upright carriage 1810 is rollably mounted between the rails 1809 by means of rollers 1850 and is reciprocally-movable transversely along the rails 1809 by means of a pneumatic cylinder 1811, the end of the rod end 1812 thereof being secured to the outboard one of the lateral frameworks 1802.

Mounted on the carriage 1810 is a driven mechanism comprising a pair of tandemly-operated, vertically-oriented, pneumatic cylinders 1813, 1814, the rod ends 1816 of which each being tied to a chain 1817 which entrains a sprocket 1818 and also entraining a speed-reduction sprocket 1819, that sprocket 1819 being provided with an over-riding clutch 1820 for indexing the rolling fingers 1830. The speed-reduction sprocket 1819 is keyed into a shaft 1815 which is freely rotatably mounted between a pair of spaced-apart bearings 1821, 1822. Shaft 1815 also has keyed thereon a second sprocket 1823, which, in turn, is entrained by a second drive chain 1824 which entrains a finger-drive sprocket 1825. The finger drive sprocket 1825 is keyed to a shaft 1826 which is freely rotatably mounted between a pair of spaced-apart bearings 1827, 1828. The inboard end of the shaft 1826 (which is adapted to extend over the conveyor 109) is provided with a mounting cylinder 1829 fitted with a pair of rolling fingers 1830 which are adapted to be moved laterally by means of the carriage 1810 to extend over the conveyor 109.

As seen more clearly in FIG. 18, secured to the downstream end of the dough folder housing 1501 but upstream of the rolling station F is a vacuum pad cylinder 1831, the rod end 1832 of which is provided with a vacuum lift-up pad 1832 actuatable by being connected to vacuum line 1834 from vacuum cylinder 1835 operated by the rod end 1836 of a pneumatic cylinder 1837, fed with air through lines 1838, 1939 from box 1840 via air conduit 121. This actuation cause the lift-up pad 1833 to lift the trailing longitudinal edge of the over-lapped-folded, foodstuff-containing dough sheet 1525.

Also connected to the downstream end of the dough folder housing 1501 is downwardly and rearwardly extending pressure plate 1841, biased downwardly by cylinder 1842, the rod end 1848 of which is connected to an ear 1844 on the pressure plate 1841 to hold the overlapped-folded dough sheet while it is being rolled by the rolling fingers 1830.

Also at the downstream end of the rolling station E (as seen in FIG. 21) and secured to the table 108 on one side of the conveyor 109 is an unloading cylinder arrangement 1845 including an unloading cylinder 1846, which is secured to the table 108, with the rod end 1847 thereof being secured to an unloading finger 1848.

Figure 22:
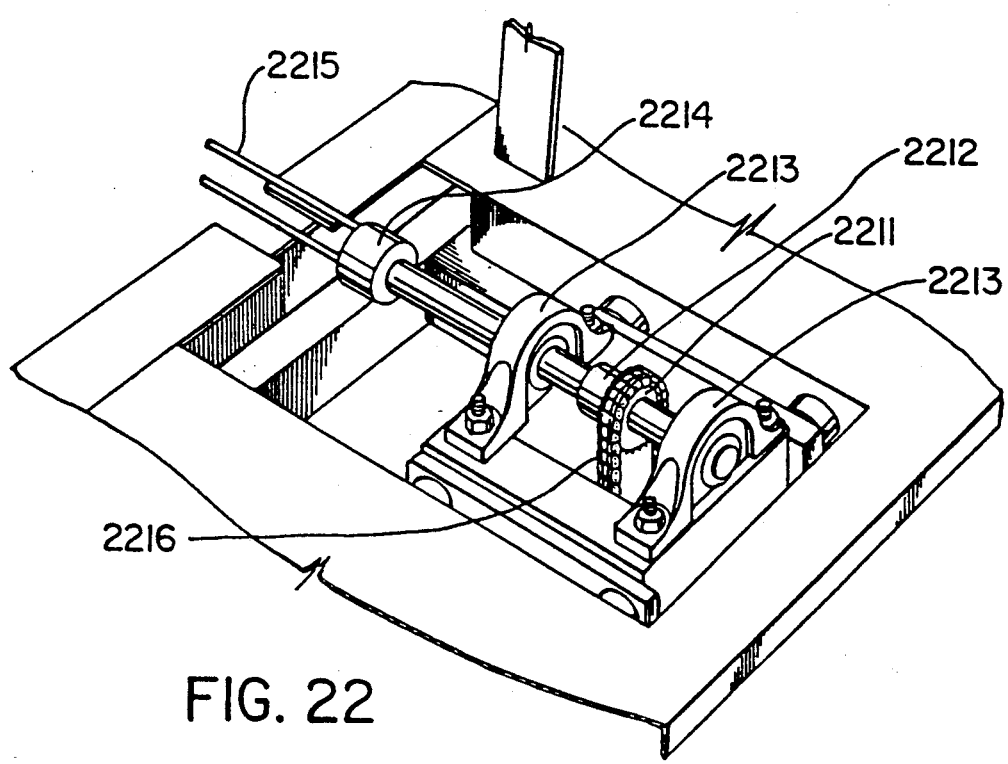
FIG. 22 is a perspective view of a roller carriage forming part of a second alternative rolling station of the food production apparatus of FIG. 1.
Figure 23:
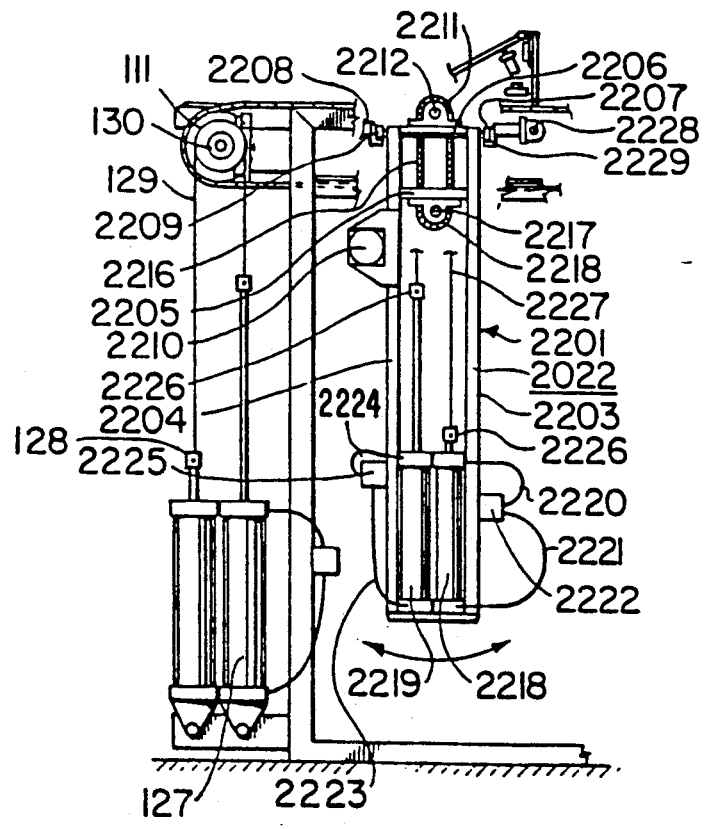
FIG. 23 is a side elevational longitudinal view of the end of the conveyor and of the carriage shown in FIG. 21.

(viii) Description of FIGS. 22 and 23

In a second alternative of the rolling station, F, shown in FIG. 22, and FIG. 23, FIG. 24 and FIG. 25, an inverted carriage 2201 is provided. The carriage 2201 includes a pair of lateral frameworks 2202, each including a fore 2203 and aft 2204 upright column, an intermediate upper longitudinal cross-piece 1205, and an upper longitudinal cross-piece 1206.

A fore and aft pair of longitudinally-spaced-apart rails 2207, 2208 extend transversely across the conveyor 109 thereof. This vertically-depending carriage 2201 is thus rollably mounted by means of wheels 2209 below the table 108 between the rails 2207, 2208 and is reciprocally movable transversely across the conveyor by means of a pneumatic cylinder 2210.

The rotation drive mechanism in this second embodiment includes an upper, drive sprocket 2211 keyed to a shaft 2212 extending transversely across the conveyor 109, the shaft 2212 being rotationally mounted between spaced-apart bearings 2213 and being provided with a mounting cylinder 2214 fitted with a pair of fingers 2215. The upper sprocket 2211 is entrained by a drive chain 2216 which also entrains a lower drive sprocket 2217, whose shaft 2218 is rotationally mounted on its associated bearing. The drive sprocket 2217 is driven by a drive mechanism operated by two tandemly operated pneumatic cylinders 2218, 2219 driven in tandem by being connected to air lines 2220, 2221 at box 2222 and air line 2223 and 2224 at box 2225. The free end of the rod 2226 of each cylinder 2218, 2219 is tied to a drive chain 2227 entraining a master drive sprocket (not shown) also keyed to the same shaft 2218 as the lower drive sprocket 2217. As stated, the cylinders 2218, 2219 are operated in tandem, with the power stroke of one cylinder being synchronized with the return stroke of the other cylinder.

This embodiment of a finger rolling station F is provided with the same finger-rolling assisting and discharging stations described above with respect to FIGS. 18 and 21.

Figure 24:
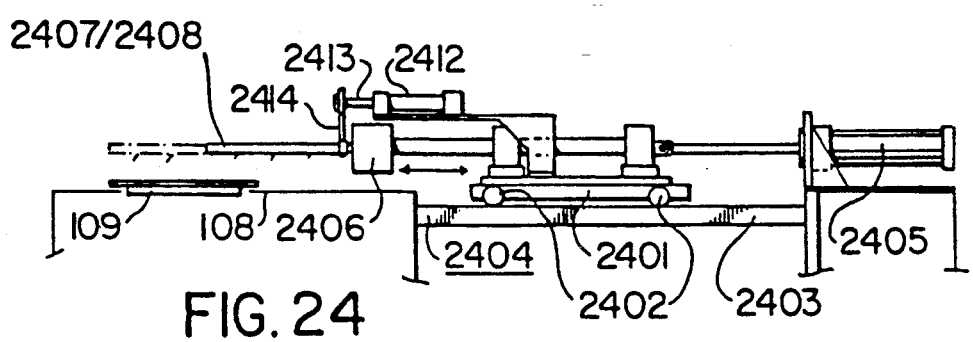
FIG. 24 is a side elevational transverse view of the second alternative rolling station shown in FIG. 21 and FIG. 22.
Figure 25:
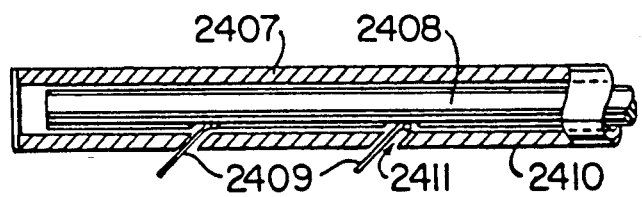
FIG. 25 is an enlarged view partially sectionalized of the single rolling finger of FIG. 23.

(ix) Description of FIGS. 24 and 25

A third embodiment of a finger rolling and product unloading station F is shown in FIG. 24 and FIG. 25. This station includes an upper carriage 2401 provided with wheels 2402 adapted to roll along a bed 2403 provided in a transverse extension 2404 of the table 105. The carriage 2401 is provided with an operating system namely pneumatic cylinder 2405 which is actuated to roll an extension of the carriage 2401 transversely across the conveyor 109. The carriage 2401 also includes an extension 2406 connected to an outer sleeve 2407/inner rod 2408 combination. The inner rod 2408 is provided with a plurality of high tension wire prongs 2409 which are adapted to lie flush with the outer surface 2410 of the outer sleeve 2407 at a like plurality of holes 2411 drilled at an angle through the outer sleeve 2407 when the outer sleeve 2407 is extended, and to project completely out through those holes 2411 (as shown) when the outer sleeve 2407 is retracted. A pneumatic cylinder 2412 is mounted in the carriage 2401, and the rod end thereof 2413 is provided with an operating mechanism 2414 to extend and retract the outer sleeve.

The finger-rolling assisting stations (not shown) used with this embodiment is the inverse of the one used with the first two embodiments and shown in FIGS. 18 and 20. The pressure plate assembly 1841 and the dough sheet lifter assembly 1831 are all the same. However, the unloading assembly 1845 shown in FIG. 21 differs in that, instead of a single unloading finger 1848, there are two spaced-apart unloading fingers, looking much like rolling fingers 1830 shown in FIG. 19 or unrolling fingers 2215 shown in FIG. 22.

If it is desired to produce a meat-filled, rolled-up, overlapped folded-over, dough product, e.g. a taco, or an egg roll, then the processing stations for loading tomato paste, pepperoni, and cheese are replaced by an egg mixture, leading edges-coating station and by a ground product, e.g. ground or minced meat loading station. The station B for applying the egg mixture to the leading edges of the diamond-shaped dough sheet is still required and operates as previously described.

Figure 26:
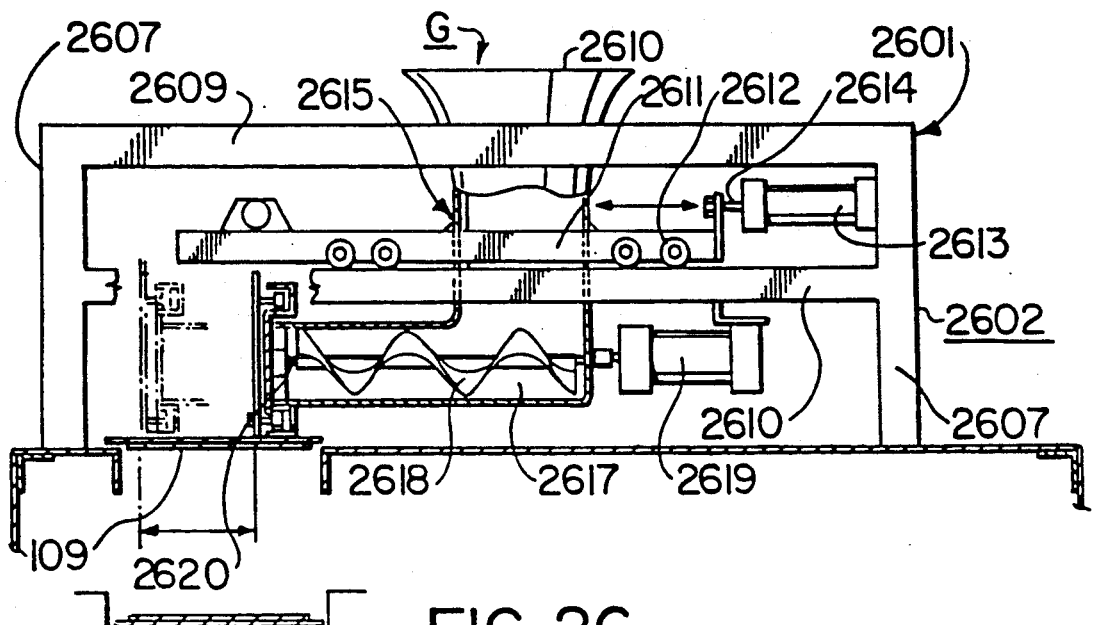
FIG. 26 is a transverse section showing a second alternative foodstuff loading station of a food production apparatus of another embodiment of this invention.
Figure 27:
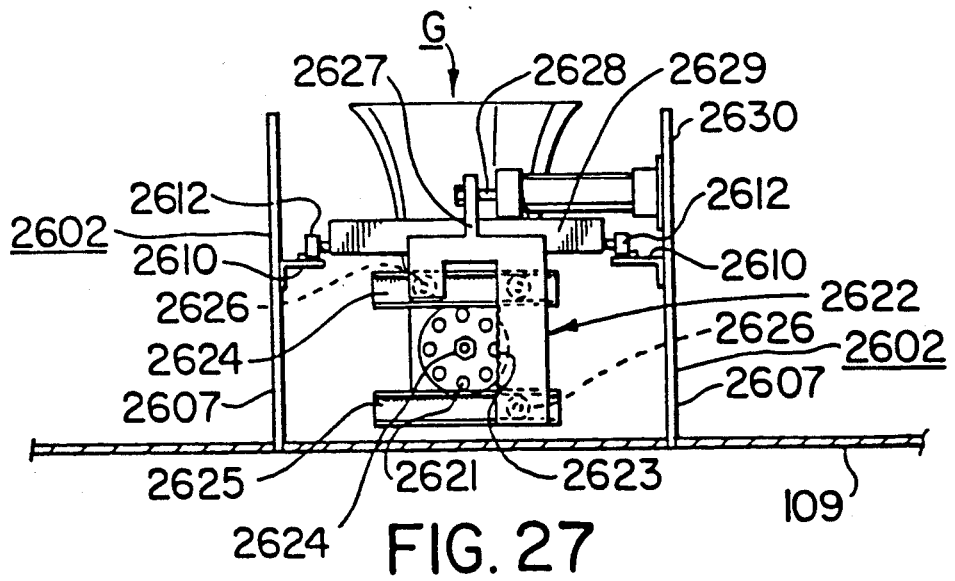
FIG. 27 is a longitudinal elevational view of the foodstuff loading station of FIG. 25.

(x) Description of FIGS. 26 and 27

The meat loading station G shown in FIG. 26 and FIG. 27 includes a main frame unit 2601 including a pair of lateral frames 2602 consisting of a pair of lateral upright legs 2607, an intermediate transverse cross member 2608 an upper transverse cross member 2609. The lateral frames 2602 are disposed astraddle the conveyor 109, with the legs 2607 secured to the table 108. A pair of mid, internal, longitudinal tracks 2610 are also provided.

Disposed within the framework is a transversely-rollable carriage 2611 provided with wheels 2612 rollable on the tracks 2610. A pneumatic cylinder 2613 is secured to one lateral side frame 2607, and the free end of the rod end 2614 thereof is secured to an end of the carriage 2611 to cause the carriage 2611 to oscillate transversely across the conveyor 109.

The carriage 2611 supports a meat grinder or mincer assembly 2615. The meat grinder assembly 2615 includes a vertical funnel 2616 leading to a horizontal, transverse cylindrical auger chamber 2617 provided with a rotatably driven auger 2618. The auger 2618 is driven by means of a pneumatic motor 2619. The downstream end of the auger chamber 2617 is provided with a discharge plate 2620 provided with a plurality of apertures 2621. The discharge plate 2620 is traversed by a cutting blade assembly 2622 including a blade edge 2623, the assembly being mounted within upper 2624 and lower tracks 2625 by means of rollers 2626 secured to the assembly 2622. The assembly 2622 includes a bracket 2227 to which is secured the free end of the rod end 2628 of a pneumatic cylinder 2629 secured to one of the longitudinally-extending lateral side frame members 2630.

The remaining stations for folding and rolling the filled product are part of the modified apparatus and constituted as previously described and are operated in the same fashion as previously described.

(xi) Description of FIGS. 28-46

As seen in FIGS. 28-46 which show two other embodiments of this invention, a rotary table 2809 replaces the linear endless conveyor 109 as a conveyor system. Disposed around the outer circumference of the rotary table 2809 are: a pair of tandemly-operated dough sheet feeders 2810 at STATION A; an egg mixture and tomato paste feeder 2811 at STATION B; a pepperoni slicer and loader 2812 at STATION C; a cheese slicer and loader 2813 at STATION D; a loaded dough sheet folder 2814 at STATION E; and a loaded folded dough sheet roller 2815 at STATION F.

Figure 28:
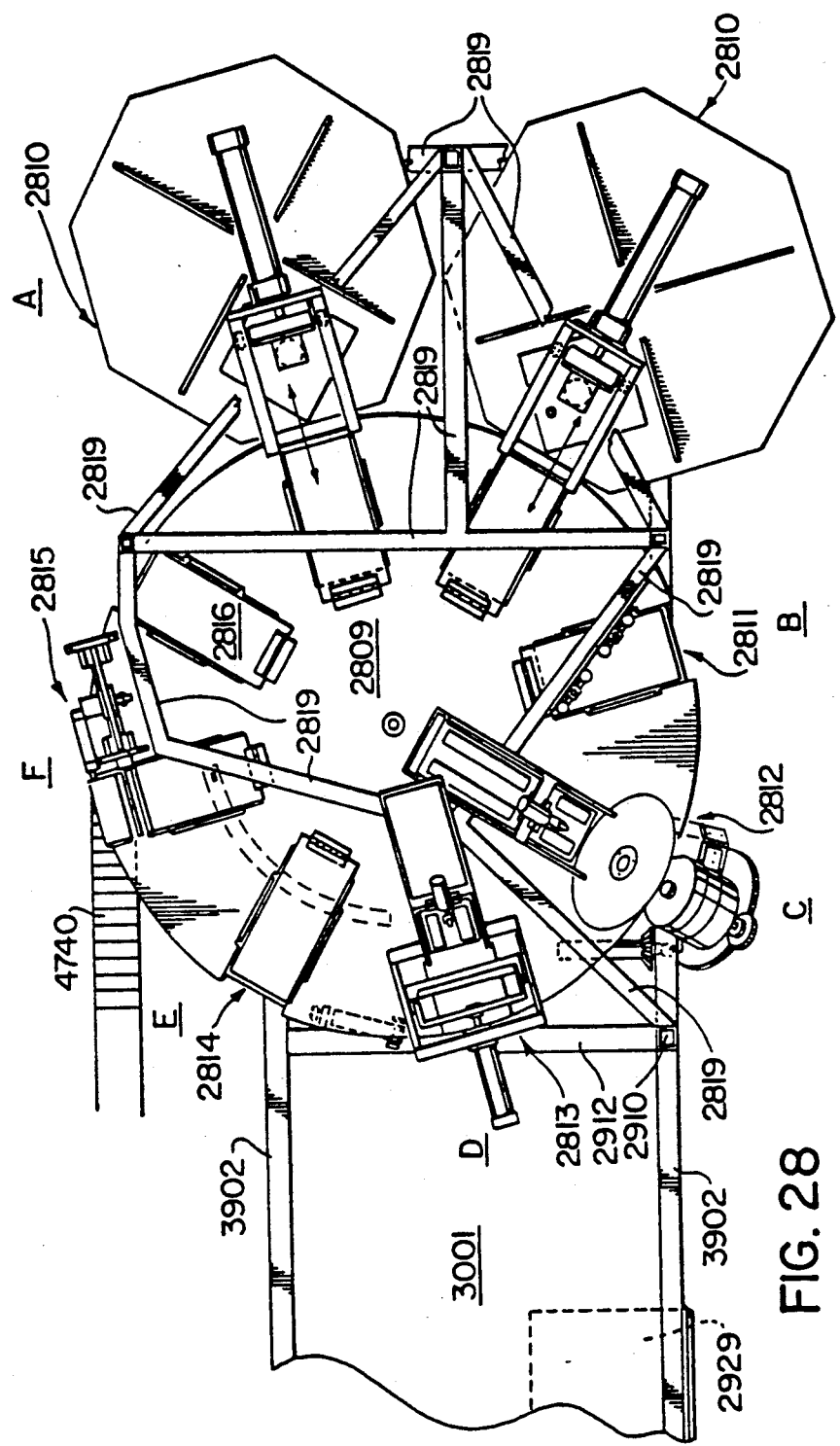
FIG. 28 is a top plan view of the food production apparatus of a second embodiment of the invention.
Figure 29:
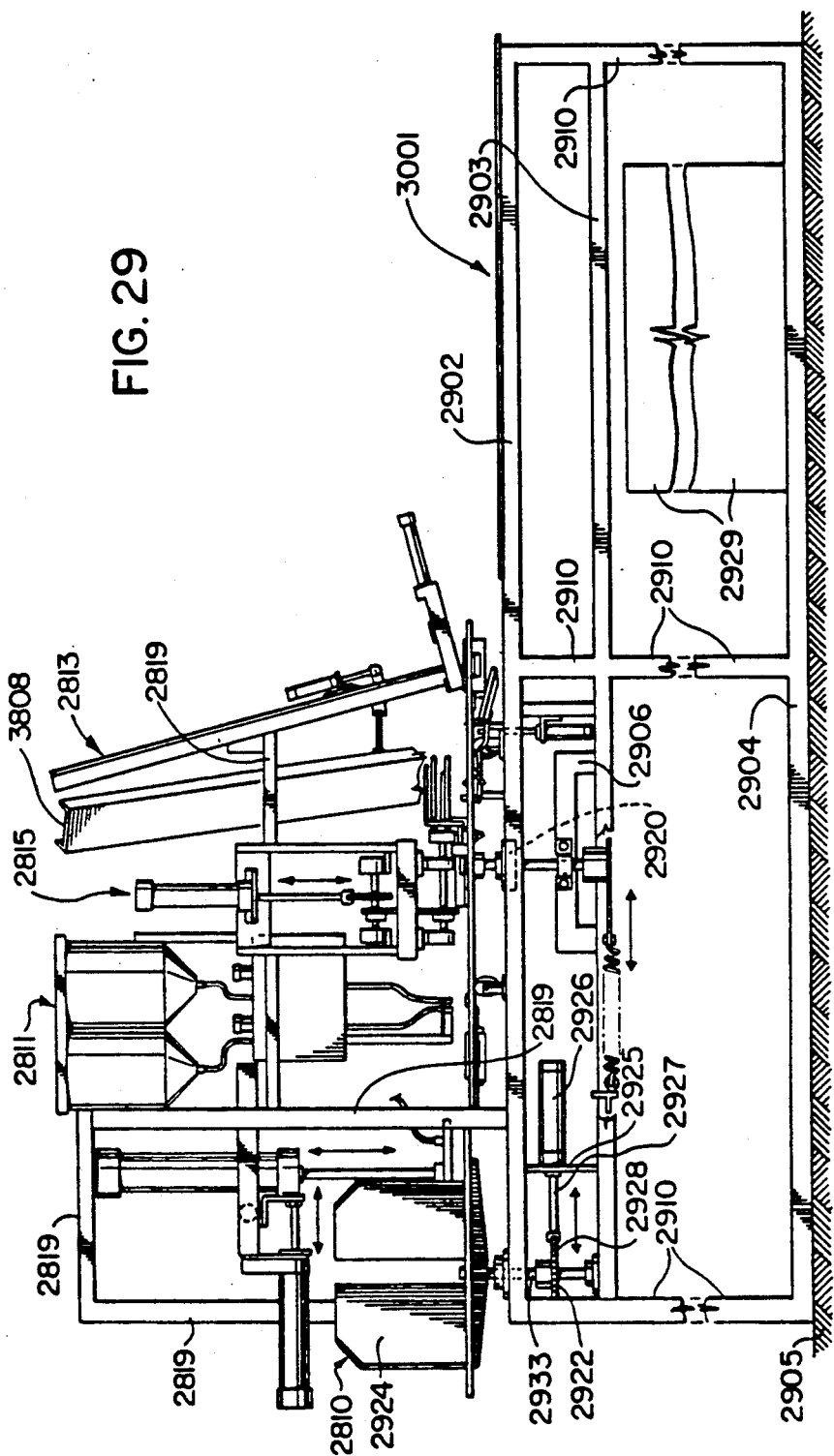
FIG. 29 is a side elevational view of the food production apparatus of this second embodiment of this invention shown in FIG. 28.

(xii) Description of FIGS. 28 and 29

As seen more clearly in FIGS. 28 and 29, the above-described second embodiment of the invention, is built around a main rectangular parallelepiped frame 3001. Such frame 3001 is provided by a side frame which includes an upper, longitudinal beam 2902, resting on a floor 2905, a lower longitudinal base beam 2904 and a mid-longitudinal beam 2903 which is midway between, and parallel to beam 2902 and base beam 2904. The side frames are connected together by transverse beams 2912, 2913 and leg 2910. Mounted atop main frame 3001 is an upper framework including plates, cross pieces, longitudinal pieces and bracing pieces, all numbered 2819. Mounted within a bore 2920 in a support table 2902 supported on framework 2903 of the main frame 3001 is an intermittently-rotationally-driven, rotary table 2809, driven as will be described hereinafter with reference to FIG. 30.

The main frame 3001 serves not only to support the rotary table 2809, and to provide a base to support the superposed processing stations (to be described in detail hereinafter), but also to provide a site for the operating mechanisms.

Thus, the main frame 3001 provides a site to accommodate a pair of over-ride clutch, chain-driven sprockets 2922, each driving a respective shaft 2933 for a respective dough tray 2924 to be described later. This drive shaft mechanism is supported between beams 2902 and 2903 and vertical cross piece 2925. The main frame 3001 provides a site for a cylinder for indexing the dough trays 2924, which, while not shown in FIG. 30, has been described in detail with respect to FIGS. 1 and 2. The drive for the dough trays is provided by two tandemly-operated, longitudinally-oriented pneumatic cylinders 2926 (only one of which is seen), the rod ends 2927 of which are tied to a drive chain 2928, so that operation of the cylinders 2926 results in rotation of the pair of sprockets 2922, one sprocket in a clockwise direction, the other sprocket in a counter-clockwise direction, to result in corresponding rotations of the respective dough trays 2924. While not seen in FIGS. 28 and 29, the main frame 3001 also provides the site for vacuum cylinders, driven by pneumatic cylinders, to supply the vacuum to the vacuum pick-up heads (to be described later) of the dough pick-up cylinders (to be described later).

While not seen in FIGS. 28 and 29, the main frame 3001 provides the site for an air supply manifold for the pneumatic cylinders (to be described later) which operate the various processing stations, as well as the vacuum cylinders to supply vacuum to operate the vacuum pick-up pads (to be described later). The main frame 3001 also provides a site for a computer and valve enclosure 2929 for the microprocessor, which is the preferred mechanism to control the synchronized operation of the apparatus. For aesthetic appearance, the main frame 3001 is also enclosed by a skirt (not seen) at the two lateral sides and at the fore and aft ends.

Figure 30:
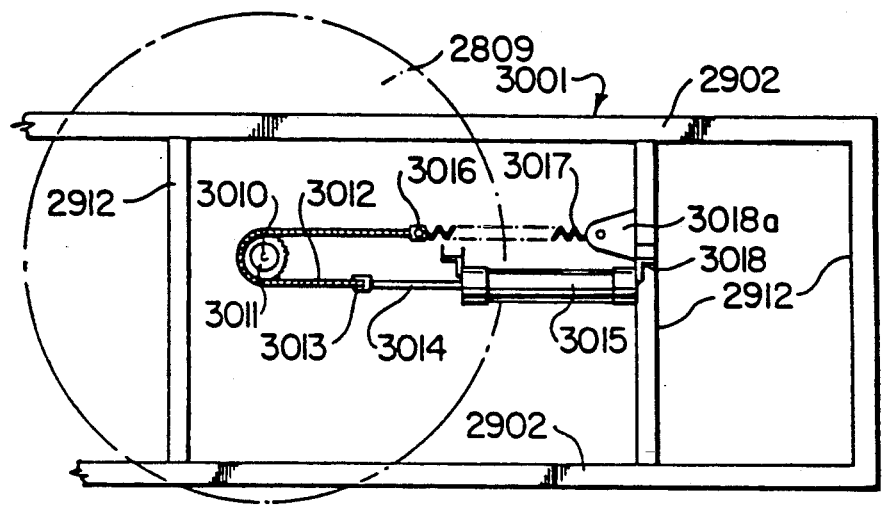
FIG. 30 is a bottom plan view (looking up) of a spring drive for the rotary table of this second embodiment of this invention, with the rotary table shown in phantom.
Figure 44:
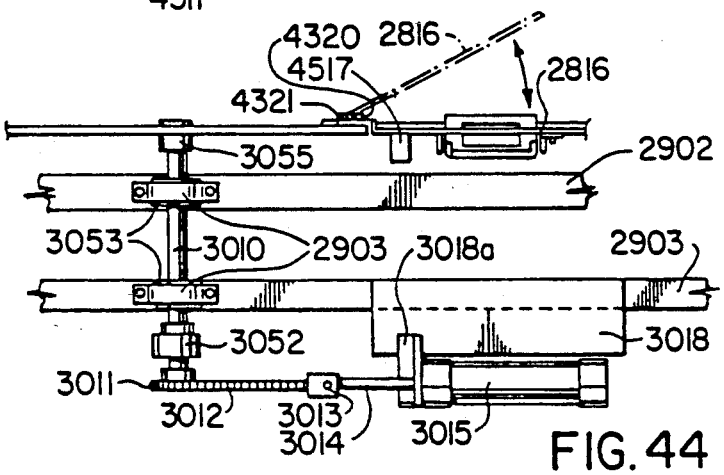
FIG. 44 is a transverse section of the operating mechanism for the drive of the rotary table.

(xiii) Description of FIGS. 30 and 44

The drive mechanism for the rotary table 2809 is shown in FIGS. 30 and 44, and includes a vertically-oriented axle 3010 which is secured to the rotary table 2809 at connecting bushing 3055, and which is secured at its lower end to an override clutch 3052 and thence to a drive sprocket 3011. Axle 3010 is rotationally mounted to the frame members 2808 and 2809 by bearings 3053. Drive sprocket 3011 is partially entrained by a drive chain 3012, which is secured at one end 3013 to the rod end 3014 of a pneumatic cylinder 3015, connected by bracket 3018 to the frame member 2808, and at the other end 3016 to a coil spring 3017 which is secured to an ear 3018a attached to the main frame 3001. Thus, the power stroke of the pneumatic cylinder 3015 causes the drive sprocket 3011 to be partially rotated and the coil spring 3017 to be expanded. The return stroke of the pneumatic cylinder 3015, which completes the revolution of the drive sprocket 3011, is assisted by the contraction of the coil spring 3017.

Figure 31:
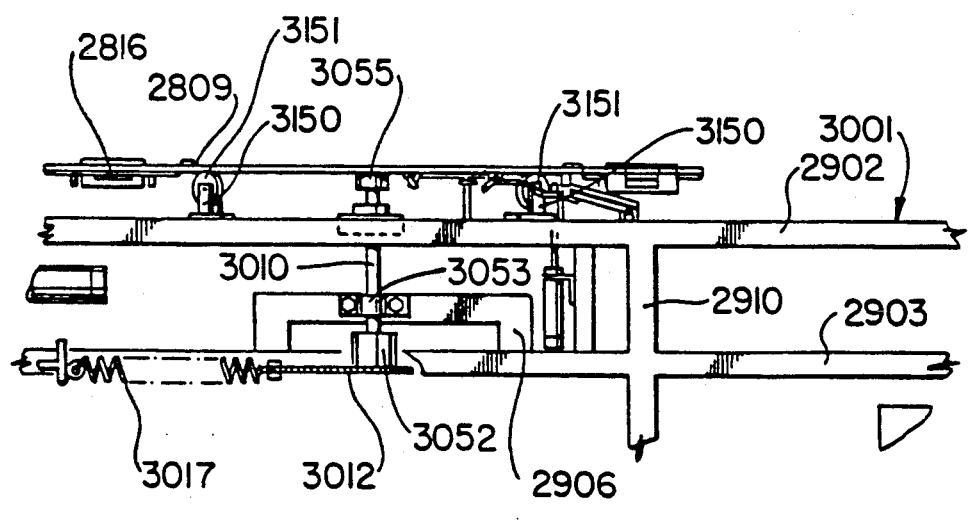
FIG. 31 is a transverse section of the spring drive for the rotary table shown in FIG. 30.

(xiv) Description of FIG. 31

As seen in FIG. 31, the rotary table 2902 is supported by the main frame 3001, the longitudinal beam 2902 of which is provided with a plurality (only two of which being seen) of upstanding ears 3150 within each of which is rotatably mounted a guide wheel 3151. The location of the ears 3150 and guide wheels 3151 is such that the guide wheels 3151 are inboard of the eight hinged receiving and lifting trays 2816 which, in their "at rest" position are just slightly below, but parallel to, the upper surface of the rotary table 2809. These guide wheels 3151 thus provide a suitable support for the rotary table 2809. It is seen, moreover from FIG. 31, that the support shaft 3010 of the rotary table 2809 is supported on bushing block 3052, and then passes through supporting bearings 3053 fixed within support frame 3054 secured to framework 2903 mounted on longitudinal beams 2903. The upper end of shaft 3010 is secured to the underface of the rotary table 2809 at securing bushing 3055.

Figure 32:
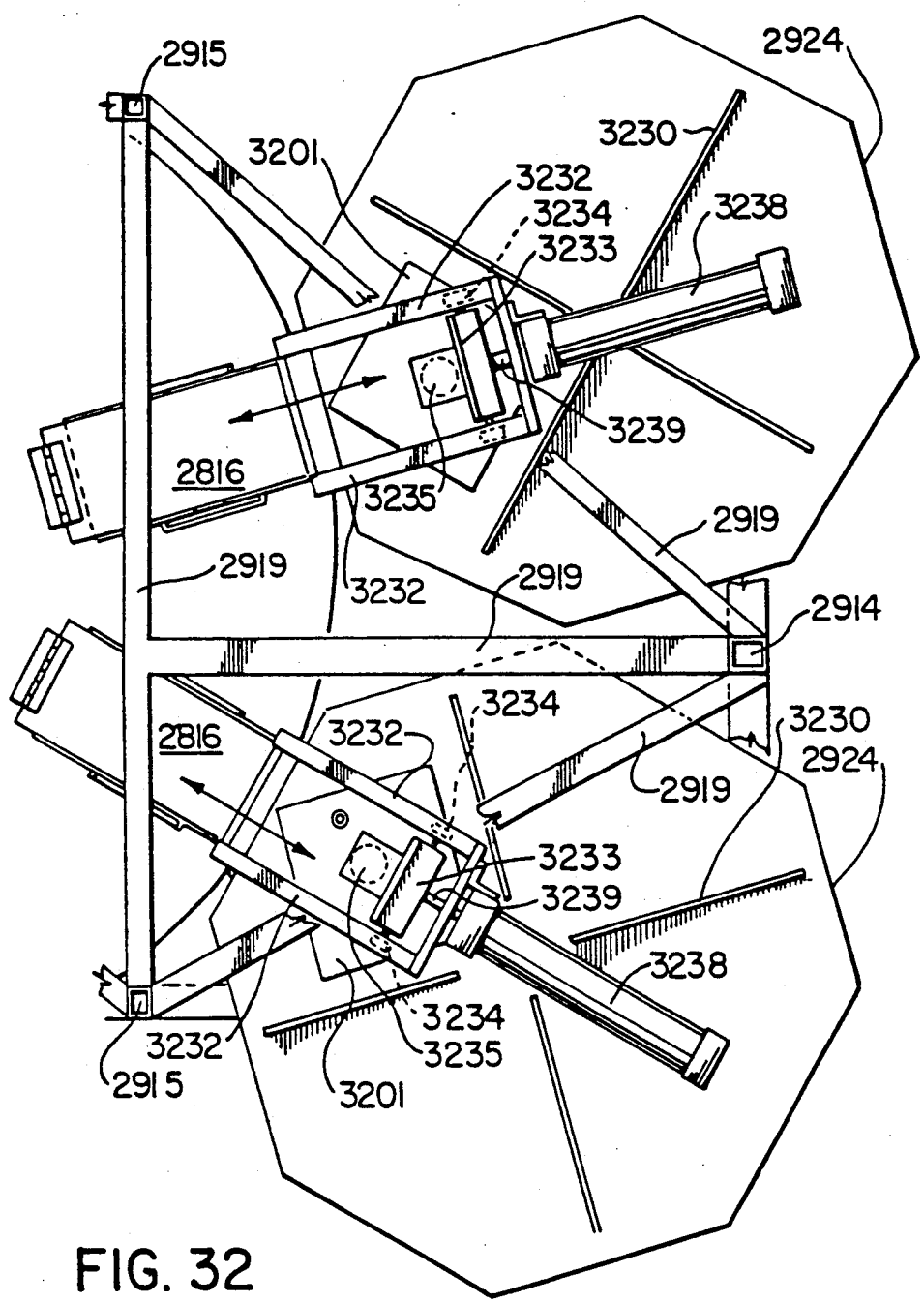
FIG. 32 is a plan view of one embodiment of the dough sheet loading and unloading mechanism of the second embodiment of the invention.
Figure 33:
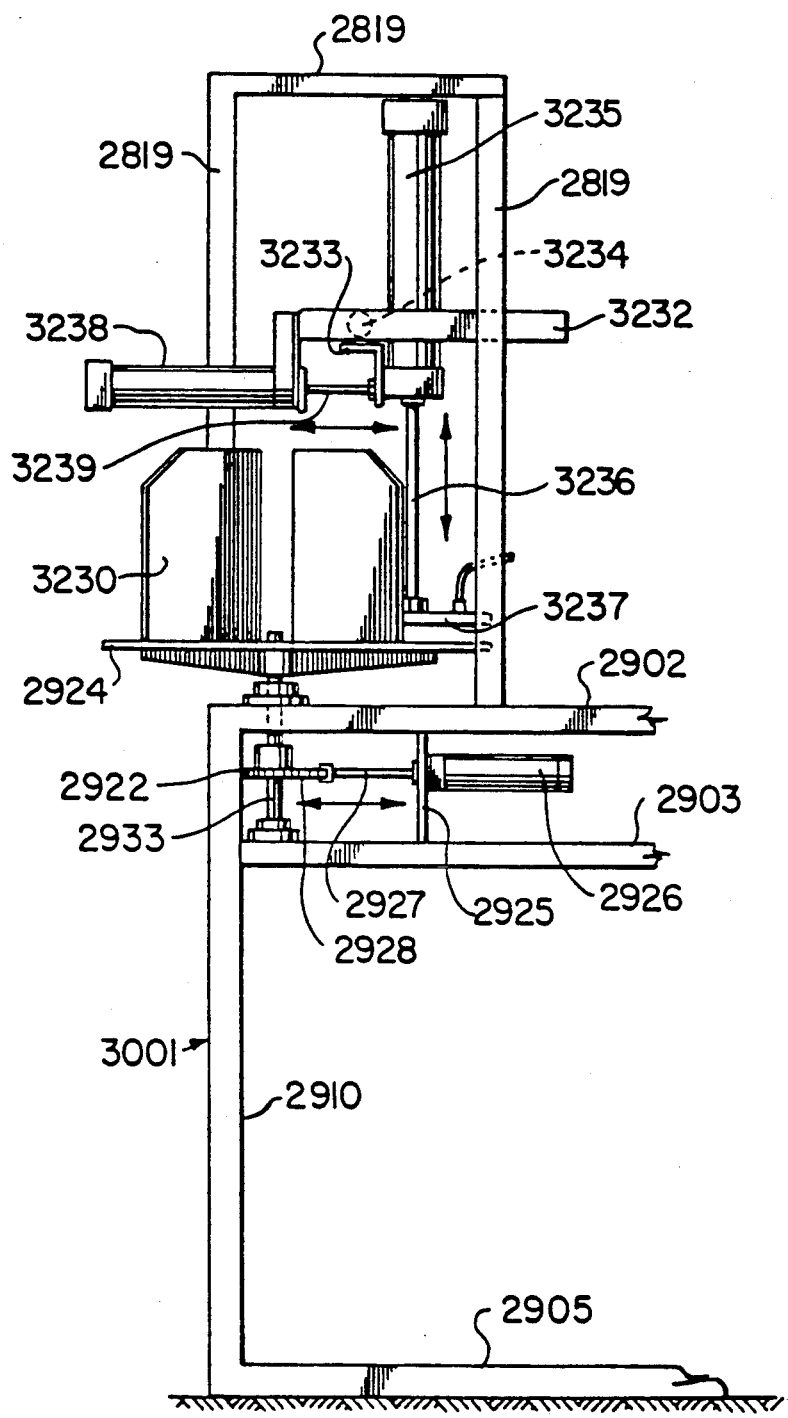
FIG. 33 is a side elevational view of one embodiment of the dough sheet loading and unloading mechanism of the second embodiment of the invention.

(xv) Description of FIGS. 32 and 33

The dough sheet feeders at STATION A are of the same general construction as the dough sheet feeders specifically described previously with respect to FIGS. 1-5.

The dough sheet loading, unloading and feeding station A includes a pair of identical, rotatable dough trays 2924, which are each divided into a plurality of equal sections, e.g. in quarters, by dividers 3230. Each dough tray 2924 is supported on a shaft 2923 which extends upwardly from the main frame 3001. The shaft 2923 is rotatably mounted between conventional bearings and is driven by an over-ride clutch, intermittently-rotated, chain-driven sprocket, chain drive 2922, which is operated by a pneumatic cylinder drive arrangement, which includes a drive chain 2928 tied to the rod end 2927 of the pneumatic cylinder 2926. These have all been described previously with reference to FIG. 29. Each dough tray 2924 is controlled by means of an indexing means as described with reference to FIG. 4 and a pneumatic cylinder 309, controlled by control box 310, the rod end 311 of which is adapted to about an associated lug 312 (of four equally-spaced lugs on the bottom of the dough tray 2924), so as to stop the rotation of the dough tray 2924 at an exact predetermined position. To continue the rotation of the dough tray 2924, the rotation drive arrangement is actuated at the same time the rod end 311 is withdrawn from abutment with the lug 312 during the return stroke of the cylinder 309. As soon as the rotation of the dough tray 2924 begins again, the cylinder 309 is actuated to its power stroke to raise the rod end 311 upwardly into contact with the bottom of the dough tray 2924. When the rod end 311 abuts the next lug 312, the rotation of the dough tray 2924 is brake to a stop as the rotation drive arrangement is deactivated.

Each quarter of each dough tray 2923 is loaded, e.g. manually by an operator, with square-shaped sheets of dough, 3201, in quantities of, e.g., eighty.

A support frame 2819 is disposed completely above each of the pair of dough trays 2924. (See FIG. 29) Each support frame 2819 supports a respective transverse guide provided by parallel tracks track 3232, which extend radially inwardly from the centre of the dough tray 2924 to the periphery of the rotary table 2809. A respective carriage 3233 is rollably mounted between associated parallel tracks 3232 of the respective transverse guides on rollers 3234, to enable extending the carriage to the periphery of the rotary table 2809. Each respective carriage 3233 supports a respective vertically-mounted pneumatic cylinder 3235, operated as previously described, the rod ends 3236 of which are fitted with a vacuum pick-up head 3237, operated as previously described. Each pneumatic cylinder 3235 is actuatable to reciprocate its associated rod end 3236 between an upper, at rest, position and a lower, dough sheet pick-up and discharge position. Each respective carriage 3233 is actuatable by means of the rod end 3239 of a pneumatic cylinder 3238 which is fixed to the support frame 2819 to reciprocate the carriage 3233 intermittently in a radial direction.

(xvi) Description of FIGS. 34 and 35

The square-shaped sheets of dough 3201 which are placed on hinged receiving and lift trays 2816 of the rotary table 2809, are so placed in a particular orientation, e.g. they look like a diamond when viewed from above.

The rotary table 2809 is now partially rotated to the next pre-set position and stopped there, with the sheet of dough 3201 at the egg mixture and tomato paste dispenser 2801 at STATION B.

The egg mixture and tomato paste dispenser 2801 at STATION B is the same as the similar apparatus described heretofore with respect to FIGS. 6, 7 and 8.

Main frame 3001 supports a main framework 2819 which supports an upper sub-station 3401, an intermediate sub-station 3402 and a lower sub-station 3403. The upper sub-station 3401 includes a tank 3410 for tomato paste or tomato sauce, and a tank 3411 for a beaten egg mixture. Each tank leads to an associated pre-measuring unit 3412 within intermediate sub-station 3402, the pre-measuring unit 3412 including an entry chamber connected to the respective tank 3410, 3411 above by lines 3413, 3414 respectively. Each entry chamber is connected by its associated T-union to an outlet chamber connected to a dispensing plunger mechanism in a dispensing chamber which is operated by a pneumatic cylinder (all seen in FIGS. 6, 7 and 8). The power stroke of the plunger mechanism is pre-set to dispense the exact amount of the tomato paste sauce or the egg mixture, respectively, through its associated dispensing chamber. Each of the entry chambers and the outlet chambers is provided with a valve, operated in synchronism by respective valve cylinders. When the dispensing mechanism is operating to dispense tomato paste or egg mixture, respectively, through the dispensing chamber, the entry valve to the entry chamber operated by the entry cylinders is closed, while the dispensing valve from the outlet chamber operated by the dispensing cylinders is open; and vice versa.

As seen in FIGS. 34 and 35, the tomato paste premeasuring station has a feed line 3415 from its associated dispensing chamber to a tomato paste spreader 3416 which is secured to the rod end of a transversely-mounted pneumatic cylinder 3427. The power stroke of the rod end 3428 thereof transversely along a chord of the rotary table 2809 is sufficient to spread the tomato paste from near the lower corner to near the upper corner of the diamond-shaped sheet of dough 3201, i.e. across a long diagonal dimension of the sheet of dough 3201, while the rotary table 2809 is stationary.

The egg mixture premeasuring station has an associated feed line 3417 from its associated dispensing chamber to each of two egg mixture spreaders 3418. Each spreader 3418 is secured at the rod end 3419 of a respective one of two mutually perpendicularly-oriented pneumatic cylinders 3420. The cylinders 3420 are oriented along the two leading edges of the diamond-shaped sheet of dough 3201. The power stroke of each of the two egg mixture spreading cylinders 3420 is sufficient to spread the egg mixture across both the entire front or leading edges of the diamond-shaped sheet of dough 3201.

Figure 37:
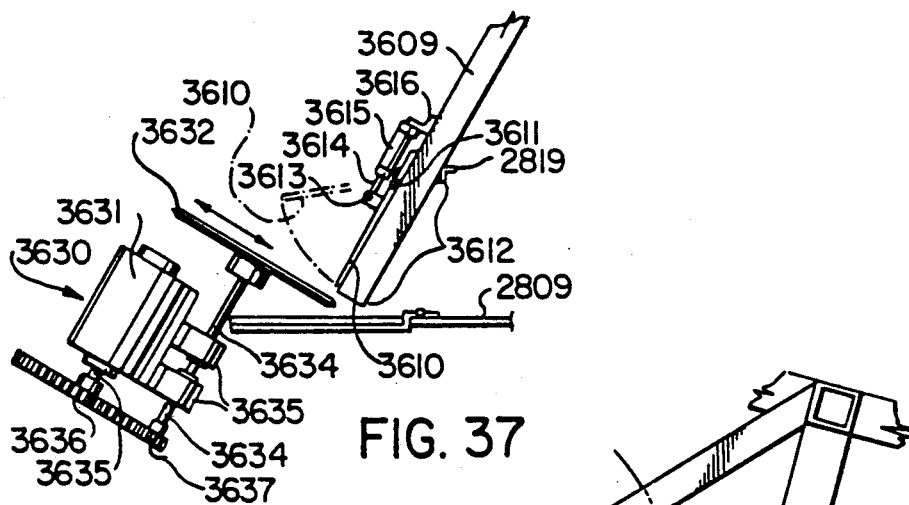
FIG. 37 is a side elevational view of the pepperoni slicing and loading station shown in FIG. 36.

(xvii) Description of FIGS. 36 and 37

The diamond-shaped sheet of dough 3201 now has a rectangular area of tomato paste spread across a long diagonal dimension thereof, and also has a band of egg mixture spread along its two front or leading edges.

The rotary table 2809 is now partially rotated to the next pre-set position, and stopped there, with the loaded sheet of dough 3201 at the pepperoni slicing and loading apparatus 2812 at Station C. The above described viscous food product loading procedure is then repeated when the next sheet of dough 3201 on the next hinged receiving and lift tray 2816 arrives at Station B.

The pepperoni slicing and loading apparatus 2812 at STATION C will now be described in the following terms:

The pepperoni slicing and loading apparatus 2812 includes a supporting framework 2819 to which an elongated holding tray 3609 is secured, the holding tray 3609 being for the purpose of supporting a plurality, e.g. three, pepperoni sticks side by side. A power-operated brake flap 3610 is hingedly secured by transverse pivot 3611 to a mid-portion 3612 of the holding tray 3609 and is actuated to open (to allow entry of the pepperoni sticks) and to close (to allow gripping of the pepperoni sticks in an upright position) by means of a bar 3613 secured to the rod end 3614 of a pneumatically-operated cylinder 3115, which is secured to a support member 3613 mounted on the holding tray 3609. The cylinder 3615 is operated by air lines as previously described.

A swingable carriage 3621 is mounted on the machine frame 3001. Such swingable carriage 3621 is secured to a pivot rod 3622, which is secured to a plate 3623 mounted on the main frame 3001. The carriage 3621 is adapted to be intermittently swivelled by means of its connection to the rod end 3625 of a pneumatic cylinder 3626.

A slicing arrangement 3630 is secured to the swingable carriage 3621, the slicing arrangement 3630 including a pneumatic motor 3631 which is operable to rotate a cutter blade 3632. The cutting blade 3632 is secured to a rotatable shaft 3634 which is mounted within spaced-apart bushings 3635 secured to the swingable carriage 3621. The cutting blade 3632 is indirectly driven by drive gear 3637 through gearing mechanism gear 3636 which is secured to motor drive shaft 3635, gear 3637 thereby rotating cutter blade shaft 3134. The thickness of the pepperoni sliced by the cutter blade 3632 is controlled by a blade depth gauge plate as previously described with reference to FIGS. 9, 10 and 11.

Figure 38:
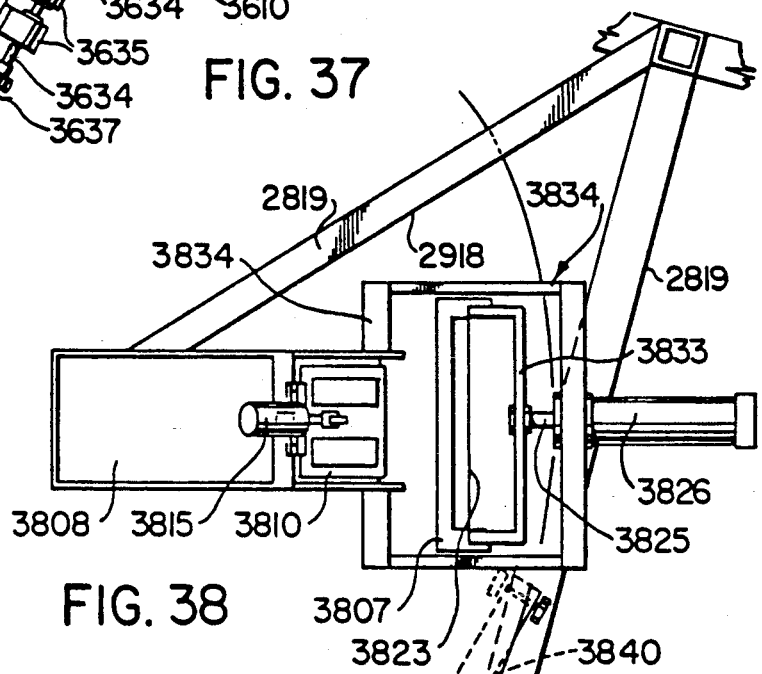
FIG. 38 is a top plan view of one embodiment of the cheese slicing and loading station of the second embodiment of the invention.
Figure 39:
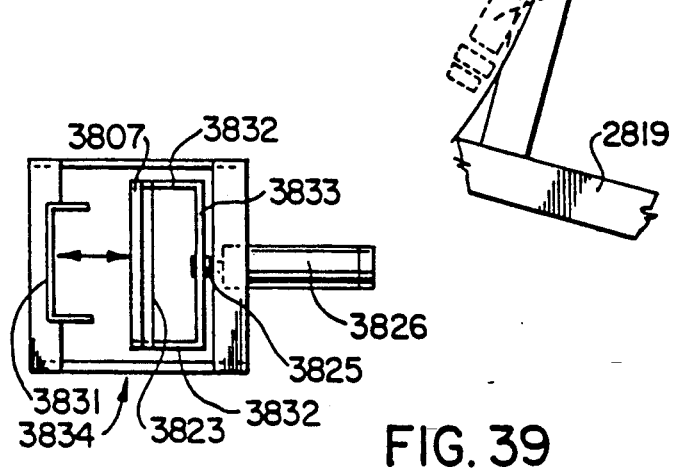
FIG. 39 is a top plan view of a portion of the cheese slicing and loading station shown in FIG. 38.
Figure 40:
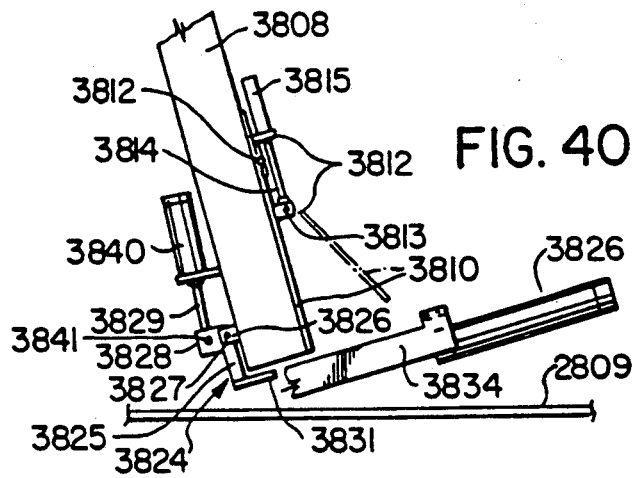
FIG. 40 is a side elevational view of the cheese slicing and loading station shown in FIG. 38.

(xviii) Description of FIGS. 38, 39 and 40

The rotary table 2809 is now partially rotated to its next pre-set position, and stopped there, and above-described pepperoni slicing and loading procedure is then repeated when the next sheet of dough 3201 on the next hinged receiving and lift tray 2816 arrives at Station C.

The rotary table 2809 is now stopped at the cheese slicing and loading apparatus 2813 at STATION D.

The cheese slicing and loading apparatus 2813 at STATION D will now be described in the following terms:

Such cheese slicing and loading apparatus 2813 is supported on framework 2819 which supports an elongated holding tray 3808, the holding tray 3808 being for the purpose of supporting a rectangular-cross section bar of cheese (not seen). A power operated brake flap 3810 is hingedly secured at transverse pivot 3211 to a mid-portion 3812 of the holding tray 3808 and is actuatable to open (to allow entry of the cheese) and to close (to allow gripping of the cheese in an upright position) by means of a bar 3812 secured to the rod end 3814 of a pneumatically-operated flap cylinder 3815 which is, in turn, secured to the holding tray 3808. Cylinder 3815 is operated by air lines in the manner previously described.

The actual cheese slicer mechanism is provided by a wire cheese cutter 3823. The wire cheese cutter 3823 is stretched across a cutter assembly 3832, the frame 3833 at its inboard end being attached to the rod end 3825 of a pneumatic cylinder 3826. The cutter assembly 3832 is longitudinally actuatable within an assembly holding frame generally indicated by reference numeral 3834 provided by fore and aft cross pieces and parallel side pieces. The thickness of sliced cheese is set by an adjustable gauge bar 3807.

Figure 41:
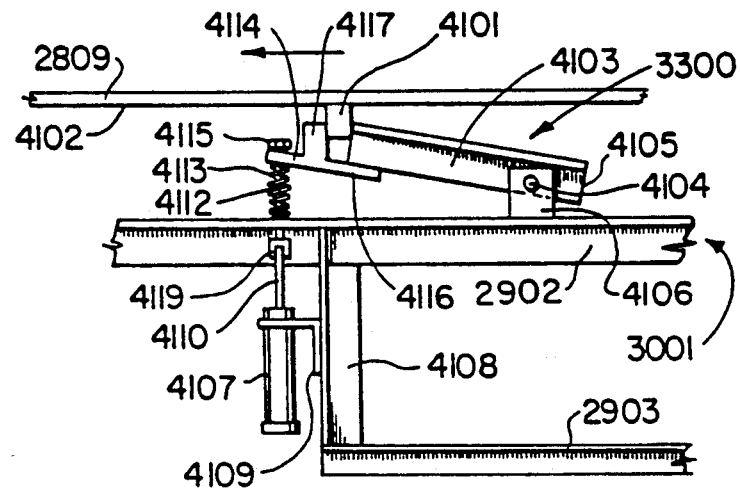
FIG. 41 is a side elevational view of a lock and indexing device of the second embodiment of the invention.

(xix) Description of FIG. 41

The rotary table 2809 now rotates to its pre-set position where the now loaded sheets of dough 3201 are to be overlapped-folded by the folding mechanism 2815 at STATION E. The above described cheese slicing and loading procedure is then repeated when the next sheet of dough 3201 on the next hinged receiving and lift tray 2810 arrives at STATION D.

The pre-set position is assured by means of a lock and indexing device 3300. Disposed between the STATION D and STATION E, and situated beneath the rotary table 2809, is the lock and indexing device 3300 shown in FIG. 41. This device 3300 includes an indexing lug 4101 below the rotary table 2809 at each of stations A–F. Each such indexing lug 4101 depends from the bottom 4102 of the rotary table 2809. Lug 4101 is adapted to be locked at its upstream face by the upstream end of arm 4103, which is pivoted at 4101 near its downstream end at 4105 to an ear 4106 upstanding from longitudinal beam 2902 of main frame 3001. A pneumatic cylinder 4107 is vertically mounted to an upright 4108 between longitudinal beams 2902 and 2903 of main frame 3001 by means of bracket 4109. The rod end 4110 of pneumatic cylinder 4107 is connected at 4111 to a rod 4112, which is itself encircled by a coil spring 4113 and which pierces a "T"-shaped cam 4114. One end of rod 4112 is secured to cam 4114 by nut 4115. The other end 4116 of the "T"-shaped cam 4114 abuts the bottom of the upstream end of arm 4103. The upright portion 4116 of the "T"-shaped cam 4114 is adapted to lock, by abutment, the other face of the lug 4101.

Figure 42:
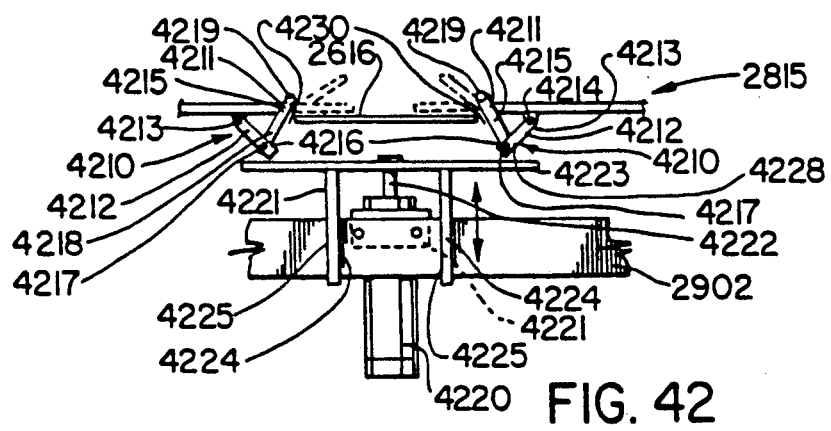
FIG. 42 is a transverse section through a portion of the rotary table showing one embodiment of the dough folding mechanism of the second embodiment of the invention.

(xx) Description of FIG. 42

The rotary table 2809 is now partially rotated to its preset position where the loaded sheet of dough 3201 is at the loaded dough sheet folding station 2815 at STATION E.

The loaded dough folding apparatus 2815 at STATION E will now be described in the following terms:

As shown in FIG. 42, the loaded dough folding apparatus 2815 in this embodiment includes a set of radially-oriented, hinged folding arms 4210, each set comprising a pair of parallel such arms 4210 secured below each radial edge 4211 of each of the eight wells 2817 in the rotary table 2809, each well supporting each a respective hinged receiving and lift tray 2816. The hinged receiving and lift tray 2816, to be further described later, is disposed below, and spaced radially from, radial edges 4211 of well 2817, to provide radial entry slots 4230, for the hinged folding arm 4210. The hinged folding arms 3610 each include an inner arm 4212 hingedly connected at its shoulder end 4213 to an ear 4214 depending from the rotary table 2809 and a folding forearm 4215, hingedly connected at its elbow end 4216 by transverse pivot 4217 to the elbow end 4218 of the inner arm 4212. The outer free ends 4218 of the pair of forearms 4215 are each interconnected by a respective cross rod 4219.

Figure 43:
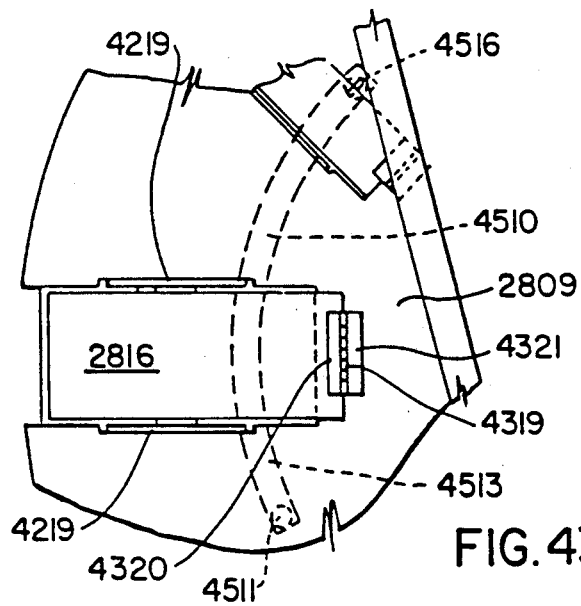
FIG. 43 is a top plan view of one hinged receiving and lift tray with a scroll plate used in its operation shown in phantom.
Figure 45:
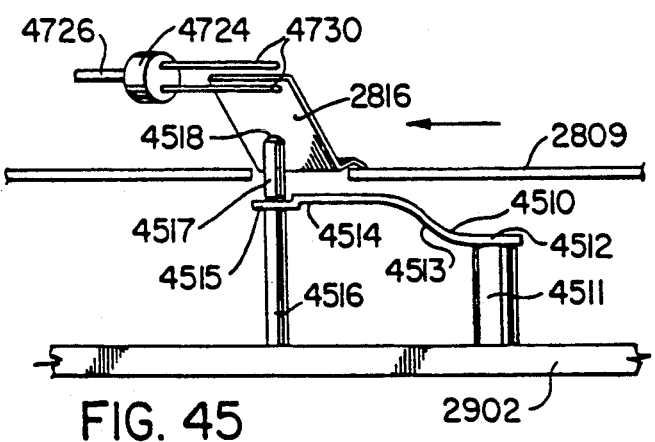
FIG. 45 is a transverse section through the rotary table showing the scroll plate mechanism for raising the hinged receiving and lift tray, and a portion of one embodiment of a rolling apparatus of the second embodiment of the invention.

(xxi) Description of FIGS. 43, 44 and 45

The rotary table 2809 is now partially rotated to its preset position where the loaded folded sheet of dough 3201 is to be rolled by rolling mechanism 2815 at STATION F. The above described loaded dough sheet folding operation is then repeated when the next loaded sheet of dough 3201 on the next hinged receiving and lift tray 2816 is at STATION E.

Preparatory to the rolling operation, the hinged receiving and lift tray 2816 must be lifted, as follows: As shown in FIGS. 43 and 45, a scroll plate 4510 is disposed under STATIONS E and F to raise each hinged receiving and lift tray 2816 to a position (as shown in FIGS. 44 and 45) where the overlapped-folded dough sheet 3201 may be rolled. The scroll plate 4510 is arcuate in plan view, (See FIG. 43) and in elevation (See FIG. 45) includes an upstream post 4511 supporting the upstream end 4512, a gently-upwardly curved mid-portion 4513 and a downstream portion 4514 terminating in a flange 4515. The flange 4515 is supported by an outboard post 4516. Posts 4511 and 4516 are upstanding from longitudinal beam 2902 of main frame 3001.

Figure 46:
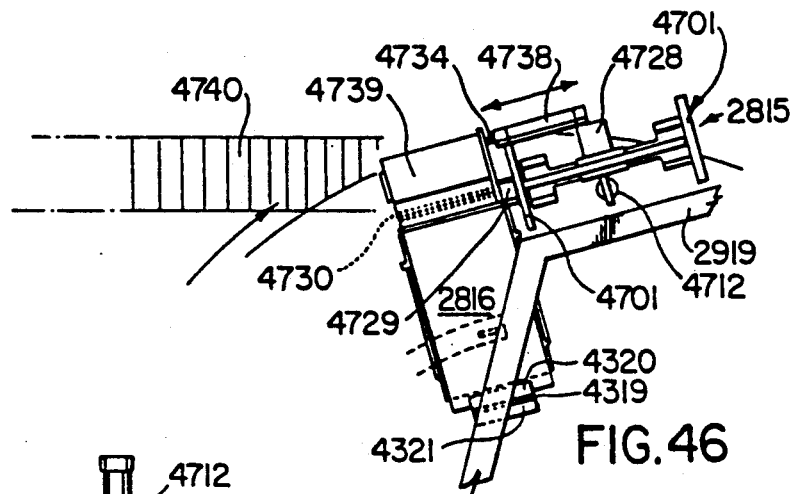
FIG. 46 is a plan view of one embodiment of the rolling apparatus of the second embodiment of the invention.
Figure 47:
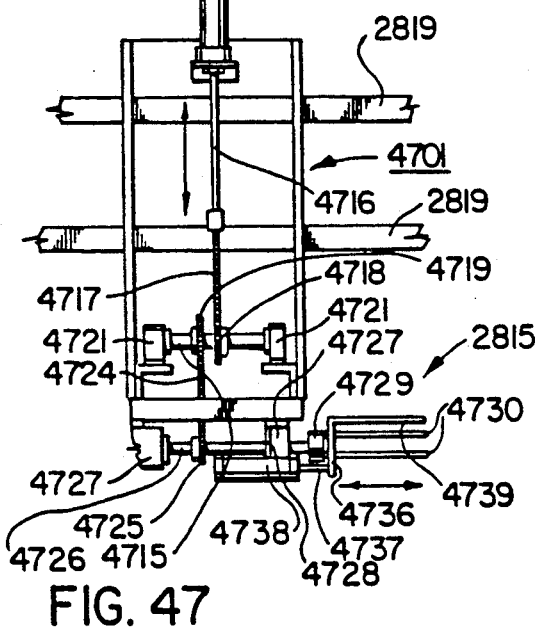
FIG. 47 is a front elevational view of the drive mechanism of one embodiment of the rolling apparatus of the second embodiment of this invention.
Figure 48:
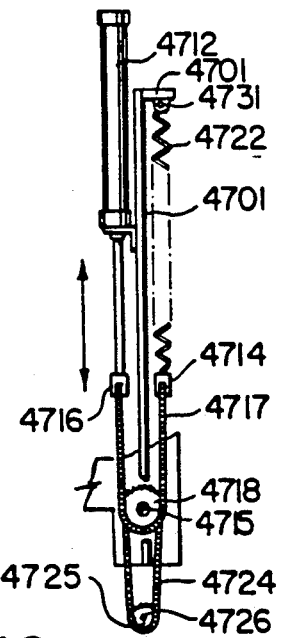
FIG. 48 is a side elevational view of the drive mechanism shown in FIG. 47.
Figure 49:
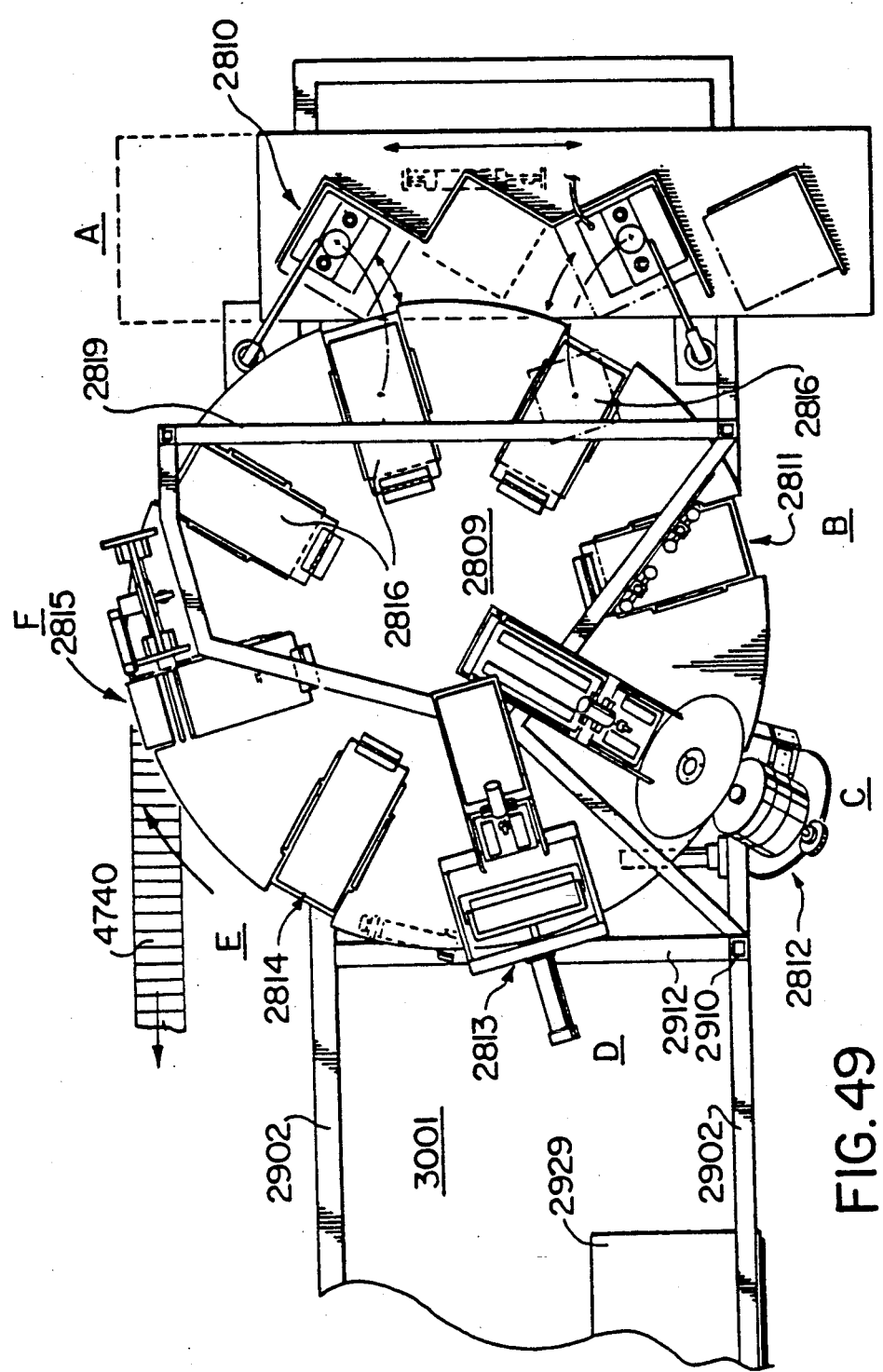
FIG. 49 is a top plan view of the food production apparatus of the third embodiment of this invention, showing a variation of the dough sheet feeder.
Figure 50:
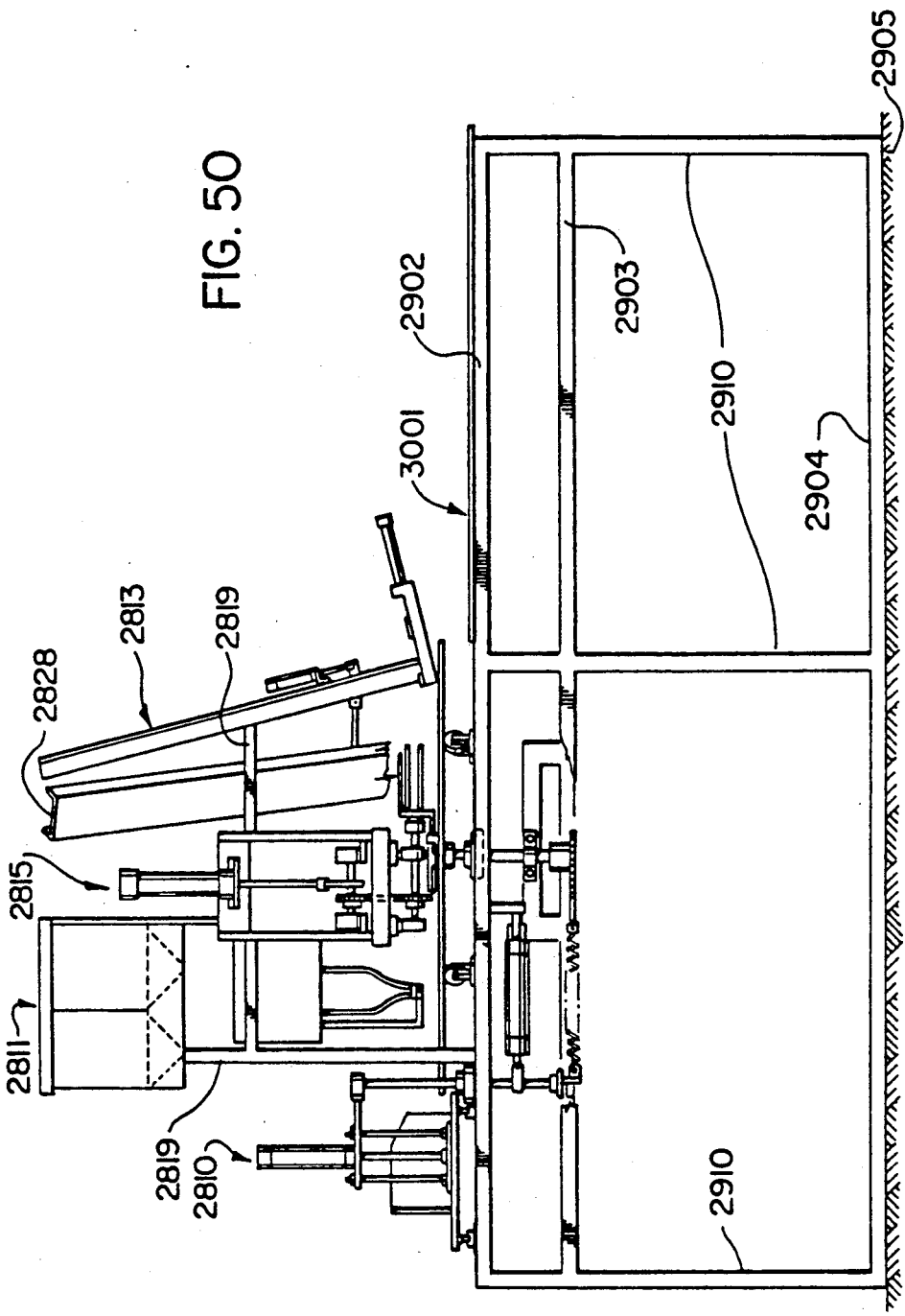
FIG. 50 is a side elevational view of the food production apparatus of the third embodiment of this invention shown in FIG. 49.

(xxii) Description of FIGS. 46, 47 and 48

The rotary table 2809 is now stopped at STATION F, so that the rolling mechanism 2815 may be operated. The loaded, folded dough sheet rolling apparatus 2810 at STATION F is similar to the loaded folded dough sheet rolling apparatus previously described and shown in FIGS. 18–21.

Such dough rolling apparatus 2815 includes an upwardly-standing, three-dimensional frame 4701, secured to upstanding framework 2819. Mounted within frame 4701 is a drive mechanism comprising a pair of tandemly-operated, vertically-oriented, pneumatic cylinders 4712, the rod ends 4716 of which each being tied to a chain 4717 which entrains a sprocket 4718. The other end 4714 of chain 4717 is tied to a coil spring 4722 whose other end is secured to ear 4731 mounted on frame 4701. The power stroke of cylinder 4712 causes sprocket 4718 to rotate one half turn and to extend spring 4722. The return stroke of cylinder 4712 is assisted by the return of spring 4722 and this completes the rotation of sprocket 4718. Sprocket 4718 is splined to shaft 4715 to which a speed-reduction sprocket 4719 is also splined. Shaft 4715 is freely rotatably mounted between a pair of spaced-apart bearings 4721. Sprocket 4719 is itself entrained by a second drive chain 4724 which entrains a finger-drive sprocket 4725. Finger drive sprocket 4725 is splined to a shaft 4726 which is freely rotatably mounted between a pair of spaced-apart bearings 4727. The inboard end of the shaft 4726 is provided with a mounting cylinder 4729 fitted with a pair of rolling fingers 4730. A finger unloading cylinder 4738 is mounted by its cylinder end to basket 4736, the rod end 4737 the cylinder 4738 being secured to a rolling guide plate and product discharge 4739.

The rotary table 2809 is now partially rotated to its preset position where the empty receiving and lift trays 2816 may be later moved into position to be loaded with a sheet of dough 3201. The above described loaded, folded dough sheet lifting and rolling operations are then repeated when the next loaded, folded sheet of dough 3201 arrives at the next rolling mechanism 2815 at STATION F.

If it is desired to produce a meat-filled, rolled-up, overlapped folded-over, dough product, e.g. a taco, or an egg roll, then the processing stations for loading tomato paste, pepperoni, and cheese are replaced by an egg mixture, leading edges-coating station and by a ground product, e.g. ground or minced meat loading station (not shown here) disposed around the rotary table 2809. STATION B for applying the egg mixture to the leading edges of the diamond-shaped dough sheet is still required and operates as previously described.

The remaining stations for folding and rolling the filled product are part of the apparatus of the present Supplementary Disclosure as previously described, and are operated in the same fashion as previously described.

(xxiii) Description of FIGS. 49-55

A third embodiment of dough sheet feeder of the apparatus of the present invention is shown in FIGS. 49-55. The rotary table 2809 and STATIONS B-F are the same in this third embodiment of the apparatus of the present invention as in the second embodiment of the apparatus of the present invention previously described.

Figure 54:
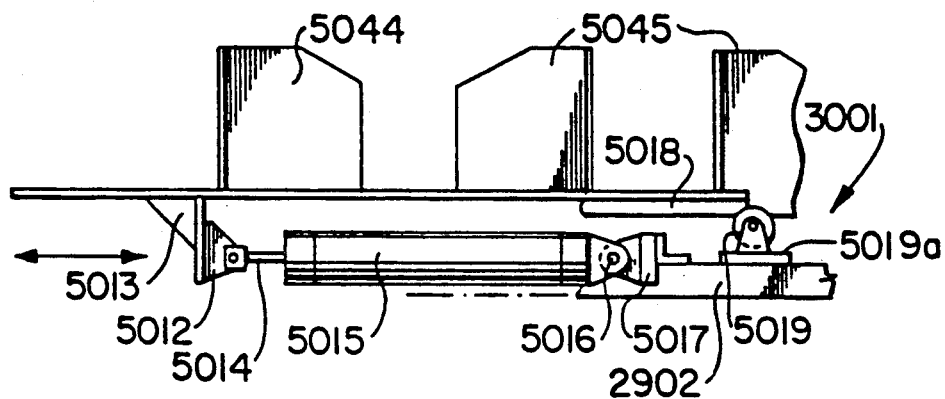
FIG. 54 is a transverse section showing the drive mechanism for the shiftable table of the dough sheet feeder of the third embodiment of the invention.
Figure 55:
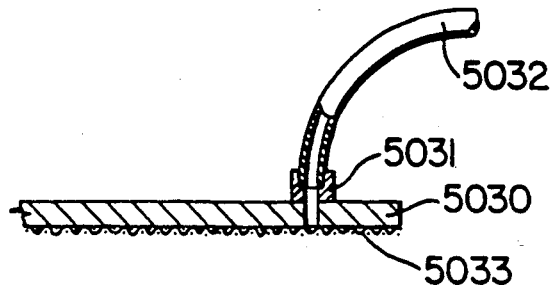
FIG. 55 is a detail of the vacuum shoe of the dough sheet feeder of the third embodiment of the invention.

In this third embodiment, the dough sheet feeder apparatus 2810 comprises two identical dough sheet feeder mechanisms 5010 mounted above a transversely-shiftable dough tray table 5011. Dough tray table 5011 is reciprocally mounted (see FIG. 54) by having a depending ear 5012 secured at the mid-point of table 5011 by bracket 5013 to the rod end 5014 of a pneumatic cylinder 5015, whose cylinder end 5016 is secured to an ear 5017 fixed to transverse beam 2902 of the main frame 3001. As shown in FIG. 54, the dough tray table 5011 is provided with a depending track 5018 which is supported to roll on rollers 5019 secured by brackets 5020 mounted on transverse beam 2902 of main frame 3001, to enable more smooth and facile transverse reciprocation thereof.

Figure 51:
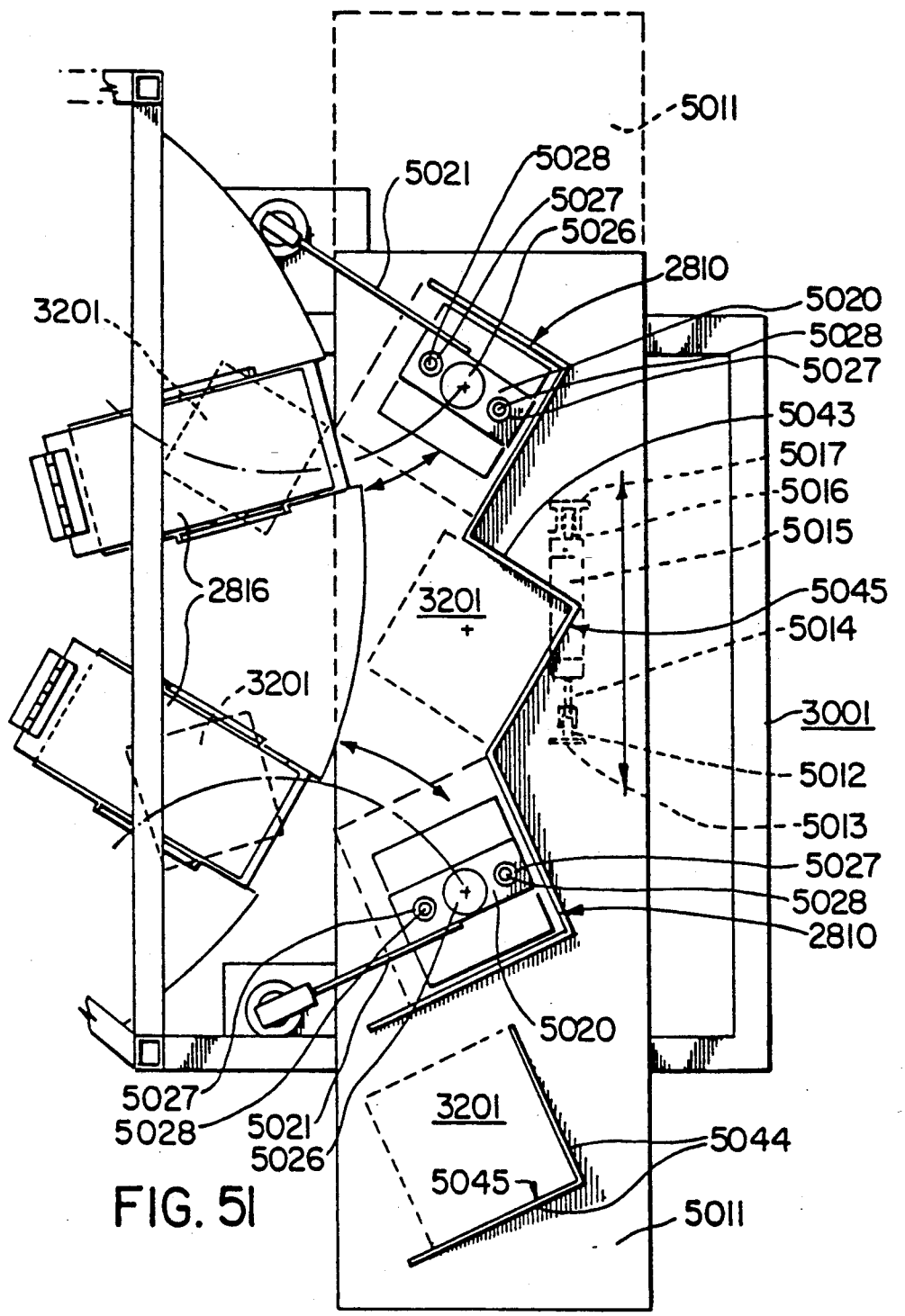
FIG. 51 is a plan view of another embodiment of the dough sheet feeder of the third embodiment of the invention.
Figure 52:
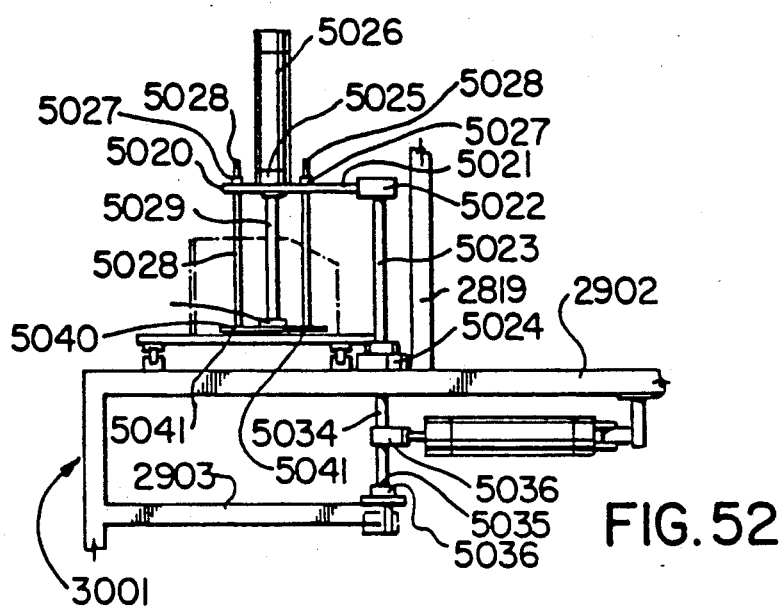
FIG. 52 is a transverse view of the dough sheet feeder shown in FIG. 51.

(xxiv) Description of FIGS. 51 and 52

As seen in FIGS. 51 and 52, each dough sheet feeder 2810 includes a horizontal plate 5020 connected to a horizontally-cantilevered swing arm 5021 which is swingably and drivably mounted at 5022 within a hollow vertical post 5023, which itself is secured to the transverse beam 2902 of the main frame 3001 at bushing mount 5024. The horizontal plate 5020 supports the cylinder end 5025 of a pneumatic cylinder 5026, as well as the bushings 5027, which are guided by a pair of vertical guide rods 5028. The end 5040 of the rod end 5029 of the pneumatic cylinder 5026 and the ends 5041 of the guide rods 5028 are each fitted with a common vacuum shoe 5030, shown in greater detail in FIG. 54. Vacuum shoe 5030 is connected by fitting 5031 to a vacuum hose 5032. Below the vacuum shoe plate 5030 is a screen 5033 to provide a full surface pick up.

Figure 56:
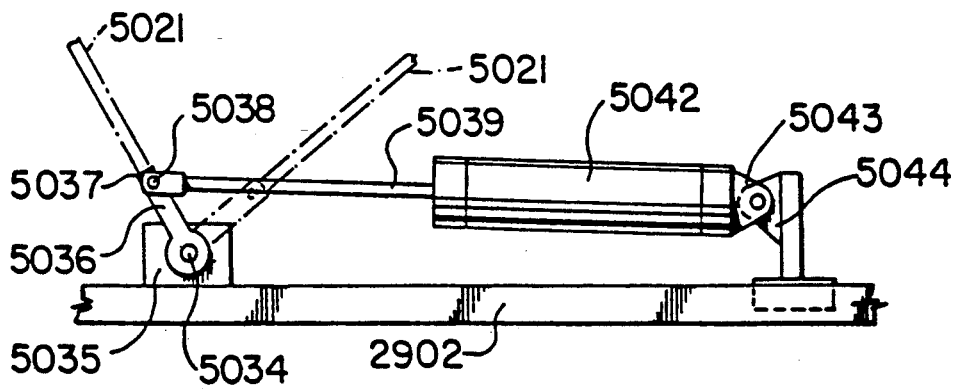
FIG. 56 is a transverse section showing the swing arm drive of the dough sheet feeder of the third embodiment of the invention.
Figure 57:
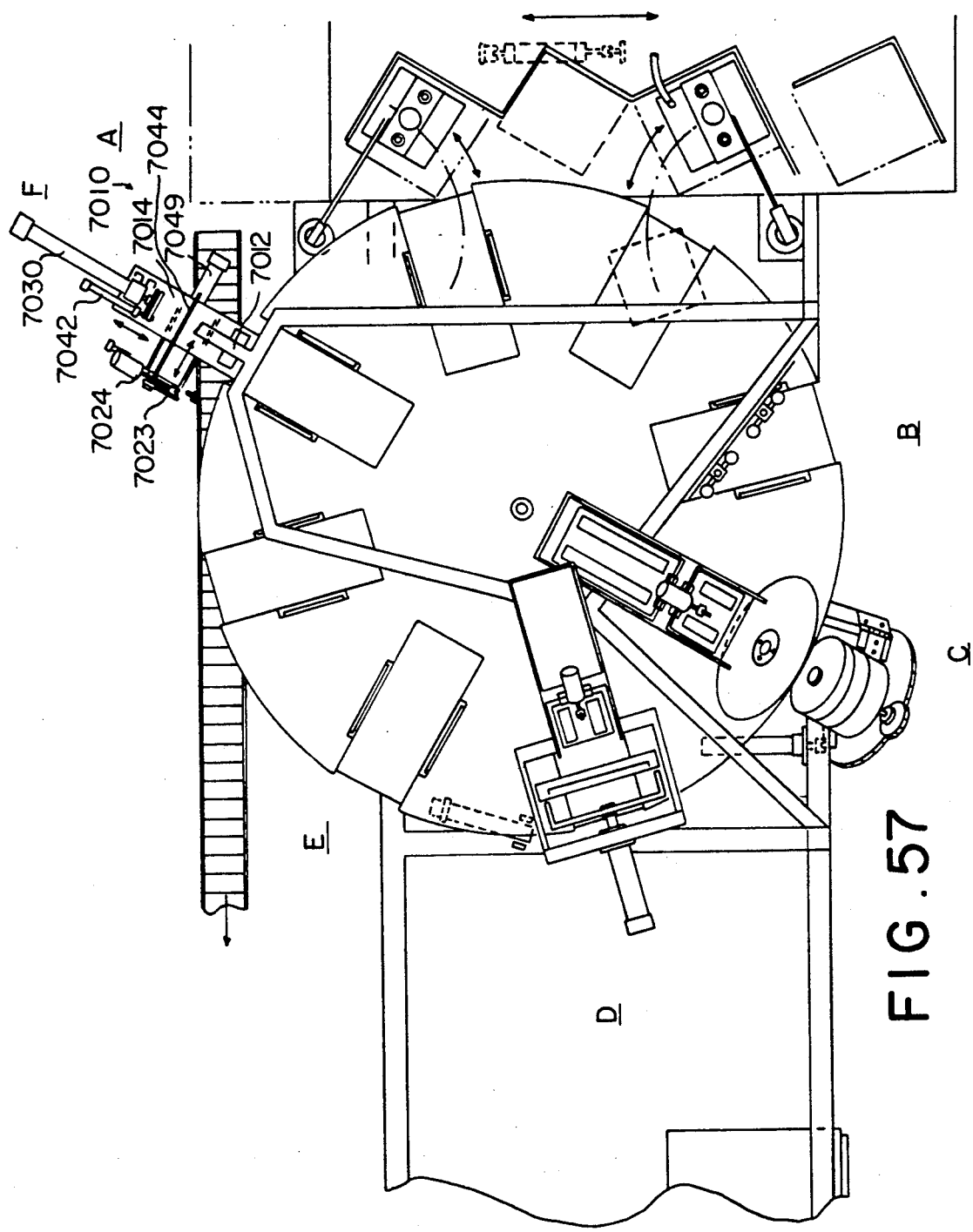
FIG. 57 is a top plan view of the food production apparatus of a fourth embodiment of this invention showing another embodiment of a rolling apparatus.
Figure 58:
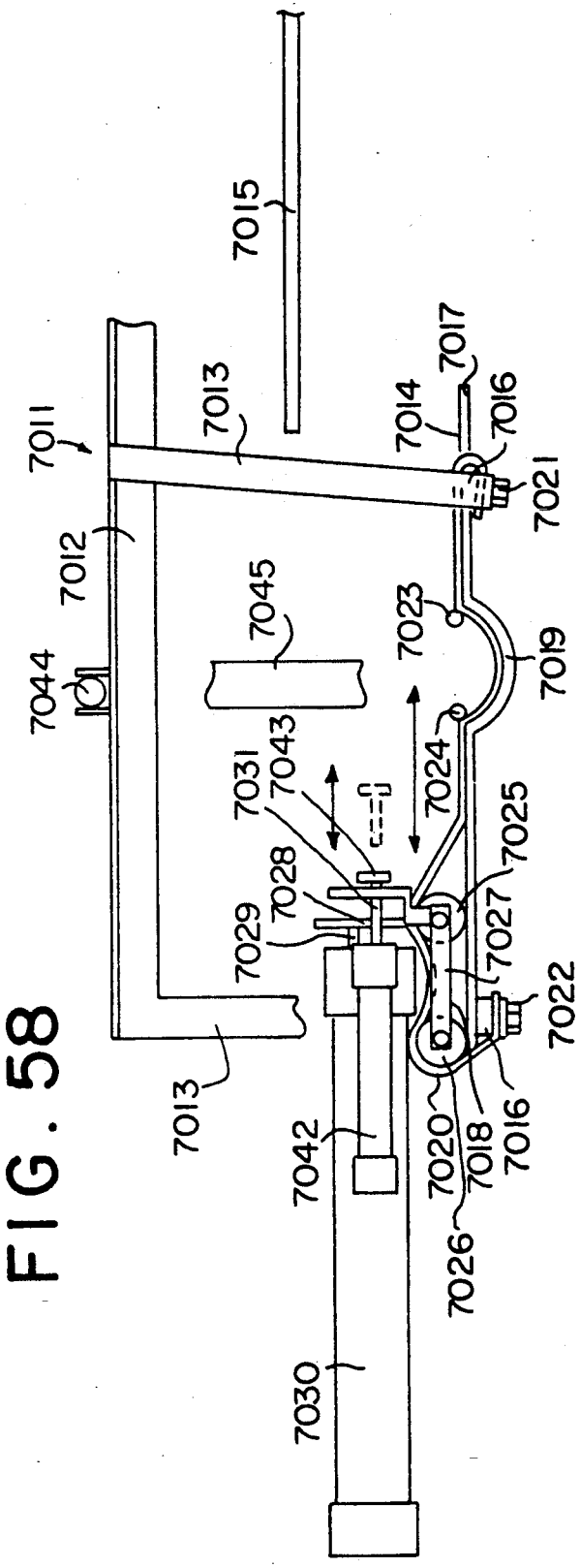
FIG. 58 is a side elevational view of the rolling apparatus of FIG. 57 at the rolling station of a fourth embodiment of the present invention.

(xxv) Description of FIG. 56

The structure of the swing drive mechanism is more fully shown in FIGS. 51, 52 and 56. The swing arm 5021 is secured to a shaft 5034 whose end 5035 is mounted in bushing 5036 which is fixed to main frame 3001. Below main frame 3001 is a drive mechanism for the swing arm 5021. (shown in FIG. 52), which is secured to shaft 5034 is a drive arm 5036. The end 5037 of drive arm 5036 is secured at 5038 to the rod end 5039 of a pneumatic cylinder 5042. The cylinder end 5043 of pneumatic cylinder 5042 is mounted to a bracket 5044 upstanding from transverse beam 2902 of the main frame 3001.

The dough tray table 5011 is provided with a pair of spaced-apart trays 5043, bounded by mutually perpendicular walls 5044, 5045 where a stacked supply of sheets of dough 3201, (see FIG. 53) is stored.

(xxvi) Description of FIGS. 57-61

Before describing FIGS. 57-61, it is desired to reiterate that such embodiment is directed specifically to a rolling device to roll an overlapped-folded, filled dough sheet product into rolled form. The rolling device may be provided on a food processing machine which includes a conveyor, and the following processing stations which are mounted above the conveyor:

| | |
|---|---|
| Station A | Dough Sheet Loading, Unloading and Feeding Station; |
| Station B | First (Egg Mixture & Tomato Paste) Foodstuff Ingredient Station; |
| Station C | Second (Pepperoni Loading) Foodstuff Ingredient Station; |
| Station D | Third (Cheese Loading) Foodstuff Ingredient Station; |
| Station E | Filled Dough Sheet Folding Station; |
| and Station F | Filled, Folded Dough Sheet Rolling Station. |

The conveyor and processing stations may be those previously shown and described hereinbefore. The particular conveyor and processing stations selected are not critical to the rolling device of this embodiment of this invention.

(xxvii) Description of FIGS. 57, 58, 59 and 60

As shown in FIGS. 57-60, disposed around the outer circumference of the rotary table are a pair of tandemly-operated dough sheet feeders at STATION A, an egg and tomato paste feeder at STATION B, a pepperoni slicer and loader at STATION C, a cheese slicer and loader at STATION D and a loaded dough folding apparatus at STATION E, whose structures are the same as those of the same named stations previously described. The eight hinged receiving and lifting trays are altered to be fixed receiving trays, instead of hinged, and are depressed a predetermined level below the main surface of the rotary table. Moreover, the loaded folded dough sheet roller at STATION F, previously described, has been replaced by a loaded dough tucker and roller at STATION F, which will now be described.

As seen in FIGS. 57-60, the combined tucking and rolling apparatus 7010 at STATION F includes a support frame 7011 connected to the upper frame of the rotary table provided by an upper longitudinal, i.e., radially-extending beam 7012, from which two supporting legs 7013 depend, the legs 7013 serving to support a radially-outwardly extending rolling tray 7014 which is disposed longitudinally, i.e., radially, to the rotary conveyor. The frame 7011 is disposed adjacent the main turntable 7015 of the apparatus, previously described, although it may be associated with a longitudinal conveyor train, also as previously described. Secured to the top of beam 7012 is a guide rod 7044 from which a carriage support arm 7045 is suspended and guided. Support arm 7045 supports a transversely oscillatable carriage 7046 (see FIGS. 59 and 60) on which are mounted a front crimp finger assembly 7047 (see FIG. 59) and a rear crimp finger assembly 7048 (see FIG. 60). Transverse travel of carriage 7046 is provided by a pneumatic cylinder 7049, the rod end of which is secured to the carriage 7046.

The lower ends 7016 of arms 7013 support both the inboard, i.e., front, end 7017 and the outboard, i.e., rear, end 7018 of rolling tray 7014. Rolling tray 7014 is provided with a transverse, semi-circular trough 7019. Rolling tray 7014 is also covered with a rolling fabric 7020, secured at the inboard end 7017 of the rolling tray 7014 at securement 7021 and at the outboard end 7018 of the rolling tray 7014 at securement 7022. Fabric 7020 follows the contour of rolling tray 7014, and is urged into the trough 7019 by front crimp finger 7023 and rear crimp finger 7024. It then passes over the front roller 7025 and the rear roller 7026 of a carriage 7027, which is secured by bracket 7028 to the rod end 7029 of a main rolling actuation cylinder 7030, whose construction will be described hereinafter with reference to FIG. 61. Also secured to the rod end 7031 of a pneumatic cylinder 7042 is a pinch bar 7043. Cylinders 7030 and 7042 are parallel to the longitudinal axis of rolling tray 7014, and so the respective rods 7029,7031 oscillate between inboard 7017 and outboard 7018 ends of rolling tray 7014.

Figure 59:
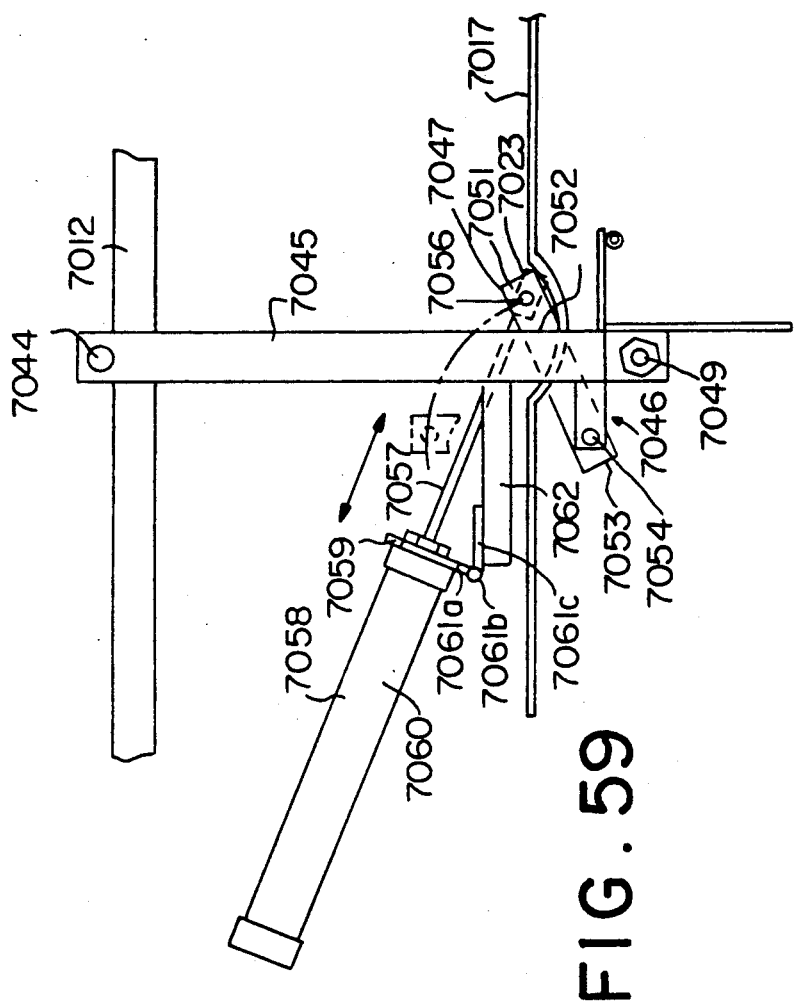
FIG. 59 is a side elevational view of the front crimp finger assembly of the rolling apparatus of a fourth embodiment of the present invention shown in FIG. 57.

(xxviii) Description of FIG. 59

FIG. 59 specifically shows the front crimp finger assembly 7047. The front crimp finger 7023 is secured to one end 7051 of a front pivot arm 7052, the other end 7053 of front pivot arm 7052 being pivotably secured at pivot point 7054 to a carriage 7046. The front crimp finger 7023 is also secured to a yoke 7056 at the rod end 7057 of a pneumatic cylinder 7058. The front end 7059 of the cylinder end 7060 of cylinder 7058 is secured to upper hinge plate 7061a, pivotably connected at pivot point 7061b to lower hinge plate 7061c, which itself is secured to a support arm 7062.

Figure 60:
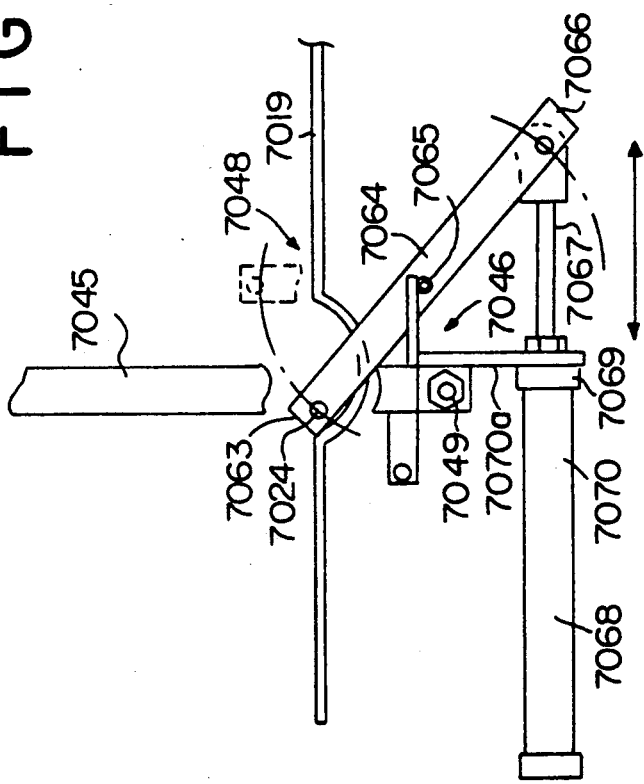
FIG. 60 is a side elevational view of the rear crimp finger assembly of the rolling apparatus of a fourth embodiment of the present invention shown in FIG. 57.

(xxix) Description of FIG. 60

The rear crimp finger assembly 7048 is specifically shown in FIG. 60. The rear crimp finger 7024 is secured to the upper end 7063 of a pivot arm 7064 which is pivotably secured at pivot point 7065 to carriage 7046. The lower end 7066 of pivot arm 7064 is secured to the rod end 7067 of a pneumatic cylinder 7068. The front end 7069 of the cylinder end 7070 of cylinder 7068 is rigidly secured to bracket 7070a secured to carriage 7046.

Figure 61:
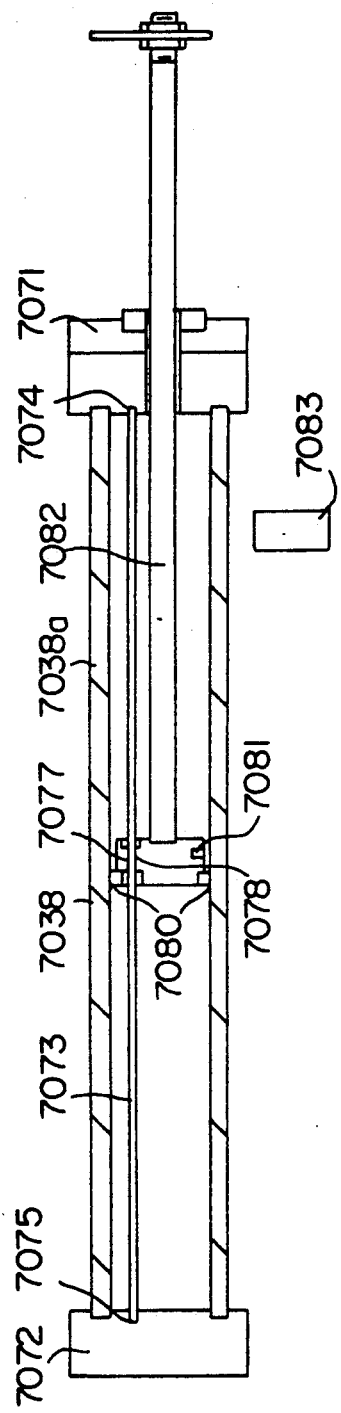
FIG. 61 is a longitudinal section through the main rolling cylinder of a fourth embodiment of the present invention shown in FIG. 57.

(xxx) Description of FIG. 61

The structure of the main rolling actuating cylinder 7038 is shown in FIG. 61. The cylinder 7038 includes an originally open-ended hollow tube 7038a, preferably formed of aluminum, and capped by a front end cap 7071 and a rear end cap 7072. A guide rod 7073, preferably formed of stainless steel, extends the longitudinal length of the tube 7070 and is anchored at each of its ends, i.e., to cap 7071 at 7074 and to cap 7072 at 7075. The cylinder 7038 is provided with a plunger 7077 having a clearance hole 7078 therethrough through which guide rod 7079 passes. Leakage of gas is prevented by seals 7080. The plunger 7077 is secured to a piston rod 7082. The plunger 7077 is also provided with a magnetizable metal plug 7081. An adjustable magnetic "pick-up" limit switch 7083 is provided to limit the movement of plunger 7077. By this construction, cylinder 7038 becomes a non-rotating cylinder.

OPERATION OF PREFERRED EMBODIMENTS (i) Operation of First Embodiment of Dough Sheet Unloader of FIGS. 3, 4 and 5

Each cylinder 328 is actuatable to reciprocate its associated rod end 318 between an upper position (as shown) and a lower, dough sheet pick-up and discharge position. The carriage 315 is actuatable by means of a pneumatic cylinder 321 fixed to the support frame to reciprocate intermittently (as shown by arrow 322) in the following sequence: firstly, over the first dough tray with the first pick up head over the first dough tray while the second pick-up head, to which a sheet of dough is gripped, is over the conveyor with the respective cylinders in their return stroke; then the first pick-up head can be activated to pick-up a sheet of dough, while the second pick-up head can be deactivated to release the dough sheet onto the conveyor; then both pick-up heads are raised, by the associated cylinder in the return stroke, and the pick-up heads are moved transversely (by transverse movement of carriage 315) so that the first pick-up head is now over the conveyor, while the second pick-up head is now over the dough tray; then, the pick-up heads are dropped, by the respective cylinders in their power stroke, so that the first pick-up head is deactivated to release the dough sheet onto the conveyor, while the second pick-up head is activated to pick up a dough sheet; and the procedure is then repeated. The cylinders are synchronized to the same power stroke for the downward movement, and to the same return stroke for upward movement.

(ii) Operation of Tomato Paste Dispenser of FIGS. 6, 7 and 8

The power stroke of the rod end 615 transversely across the conveyor 109 is sufficient to spread the tomato paste from the lower corner to the upper corner of the diamond-shaped sheet of dough, i.e. across the longest dimension of the sheet of dough, while the conveyor 109 is stationary.

(iii) Operation of Egg-Mixture Dispenser of FIGS. 6, 7 and 8

The power stroke of each of the two egg mixture spreading cylinders 620 is sufficient to spread the egg mixture across the entire front or leading edges of the diamond-shaped sheet of dough.

(iv) Operation of First Embodiment of Pepperoni Slicer of FIGS. 9, 10 and 11

The carriage 921/cutter blade 932 are synchronized in the following manner: The three pepperoni sticks rest on the blade depth gauge plate 933 and are gripped by the brake flap 910 to maintain such pepperoni sticks in position. The cutter blade 932 and carriage 921 are then swung on the pivot axis of the rod 922 while the cutter blade is rotating to move the cutter blade 932 across the bottom of the holding tray 909 to slice the three pepperoni sticks at the pre-set thickness. Since the blade depth gauge plate 933 is attached to the carriage 921, the blade depth gauge plate 933 is also moved forwardly along with the cutter blade 932. This allows the three slices of pepperoni to be dropped onto different, discrete areas of the sheet of dough as the swinging travel proceeds. At this time, the sheet of dough is now loaded both with the tomato paste and with the pepperoni slices along its longest transverse axis. The carriage 921 is now swung back to its original position by means of actuating the return stroke of the pneumatic cylinder 926, the brake flap 910 is opened, and the pepperoni sticks then drop down again to rest on the blade depth gauge plate 933. The above-described slicing procedure is then repeated.

(v) Operation of First Embodiment of Cheese Slicer of FIGS. 12, 13 and 14

The carriage 1222/cutter blade 1223 are synchronized in operation so that as a slice of cheese is sliced by the blade 1223, it is placed atop the pepperoni on the sheet of dough. The brake flap 1280 is then released, and the cheese block falls down to rest on the thickness-blade adjusting plate 1230. The carriage 1222 is reciprocated back to its "at rest" position. The pneumatic cylinder 1226 operating the blade 1223 is actuated and the carriage 1222 is again reciprocated across the conveyor 109 to allow the sliced piece of cheese to be deposited atop another portion of the pepperoni on the dough.

(vi) Operation of First Embodiment of Dough Folder of FIGS. 15, 16 and 17

The hold down cylinders 1505, 1506 are actuated to engage the diamond-shaped sheet of dough 1525 inboard of the upstream and downstream, longitudinal corners but near such diametrically-opposed longitudinal corners and to hold the diamond-shaped sheet of dough 1525 in a stationary position on the conveyor 109. A designated identifying marking stamp (not seen) is also placed thereon by the aft plate. Actuation of the pneumatic cylinders 1511, 1512 now causes the fingers, 1517, 1518 which are disposed under the triangular, transverse outboard ends of the foodstuff-covered diamond-shaped sheet of dough to be raised and folded over so that their apices meet and overlap slightly at the centre of the sheet of dough. The sheet of dough is now generally hexagonally-shaped.

(vii) Operation of First Embodiment of Dough Roller of FIGS. 18, 19, 20 and 21

In operation, the carriage 1810 is actuated to move laterally over the conveyor 109 by means of pneumatic cylinder 1811. The two fingers 1830 then straddle the lifted-up edge of the dough sheet 1825. The vacuum pad cylinder rod 1832 then releases the vacuum lift-up pad 1833 and retracts. The shaft 1826 is actuated to rotate the fingers 1830 by 2½ turns.

(viii) Operation of Second Embodiment of Dough Roller of FIGS. 22 and 23

In its operation, a more positive gripping by the fingers is provided by the tilting carriage. The carriage 2201 is tilted out of vertically by swivelling at the swivel bearing 2228 actuated by the rod end of a pneumatic cylinder 2210 in order to have the fingers 2215 tilt downwardly. The rolling operation is the same as previously described. However, to unload the product the carriage is tilted to its vertical orientation.

(ix) Operation of Third Embodiment of Dough Roller of FIGS. 24 and 25

To roll the overlapped-folded dough sheet, using the rolling finger of FIG. 24, the carriage 2401 is placed with the finger roller 2407, 2408 over the conveyor 109. The outer sleeve 2407 is retracted to expose the wire prongs 2409. Actuation of the rotation mechanism causes the single finger 2407/2408 to rotate and thus to roll the dough sheet by five turns. Now the two-spaced-apart fingers (previously described) constituting an unloading means extend transversely across and over and below the single rolling finger 2407/2408. The outer sleeve 2407 is then retracted, allowing the wire prongs 2409 to release the rolled-up dough sheet. This permits the finger roll to drop onto the conveyor 109. The carriage 2410 is then withdrawn transversely of the conveyor 109. The conveyor 109 then dumps the rolled-up product to another station (not shown) for further processing.

(x) Operation of Meat Filler of FIGS. 26 and 27

In operation, when the dough sheet is at the meat loading station, the auger 2618 is actuated to grind the meat. The carriage 2611 is actuated to move in discrete steps across the conveyor 109. At each step, the cutting blade 2623 is actuated to discharge ground meat at a discrete different location on the dough sheet.

(xi) Operation of Second Embodiment of Dough Sheet Unloader of FIGS. 32 and 33

The loading and unloading of the sheets of dough is as follows: Cylinders 3235 are operated in synchronism. Sheets of dough 3201 are stacked-up on the dough trays 2924. Each of cylinders 3235 is actuated to place its respective pick-up head 3237 in contact with one sheet of dough 3201 when the carriage 3233 is in the position as shown in FIG. 32, and the vacuum is actuated, thereby picking up a sheet of dough 3201. The respective pick-up heads 3237 are then moved upwardly by means of the respective cylinder 3235. Then the respective pick-up heads 3237 are moved by movement of respective carriages 3233 through operation of the power stroke of respective cylinders 3238, to a radially-inwardly position over two empty, adjacent, hinged receiving and lift trays 2816. The respective sheets of dough 3801 are then unloaded onto the respective trays 2816 by releasing the vacuum in vacuum pick-up heads 2837. The vacuum pick-up heads 2837 are then returned to their respective upper orientation by the return stroke of respective cylinders 2835, to a position where the sequence is started again. Thus, two sheets of dough 3201 are loaded onto the trays 2816 at the same time.

(xii) Operation of Second Embodiment of Pepperoni Slicer of FIGS. 36 and 37

The operation of carriage 3621/cutter blade 3632 is synchronized in the following manner: Three pepperoni sticks rest on the blade depth gauge plate and are gripped by the brake flap 3610 to maintain such pepperoni sticks in such pre-set position. The cutter blade 3632 and carriage 3621 are then swung on the pivot axis of the pivot rod 3622 by actuation of the power stroke of pneumatic cylinder 3626 while the cutter blade 3632 is rotating, thereby to move the rotating cutter blade 3632 across the bottom of the holding tray 3609 to slice the three pepperoni sticks at the thickness which has been pre-set by the depth gauge plate. This allows the three slices of pepperoni to be dropped onto different, discrete areas of the sheet of dough 3201 as the swinging travel proceeds, while the sheet of dough 3201 rests on the receiving and lift tray 2816 which is hingedly secured to the now-stationary rotary table 2809. At this time, the sheet of dough 3201 is now loaded both with the tomato paste and with the pepperoni slices along a long diagonal dimension. The carriage 3621 is now swung back to its original position by means of actuating the return stroke of the pneumatic cylinder 3626, the brake flap 3610 is opened, and the pepperoni sticks then drop down again to rest on the blade depth gauge plate at which time the pepperoni sticks are secured in place by the brake flap 3610.

(xiii) Operation of Second Embodiment of Cheese Slicer of FIGS. 38, 39 and 40

The wire cheese cutter 3823 is reciprocated across the block of cheese to slice the cheese. As each slice of cheese is sliced by the wire cutter 3823 it is placed on a storage tray 3231. Pneumatic cylinder 3826 is operated from an air line as previously described.

When a desired number of slices of cheese have been deposited on the storage tray 3831, the storage tray 3831 is dumped as follows: storage tray 3831 is supported on the vertical arm 3825 of an inverted "L"-shaped control arm 3624, the mid-point of which is pivotally mounted at 3827 to a bracket 3826 secured to the holding tray 3808. The horizontal arm 3828 of the control arm 3824 is connected to the rod end 3839 of a pneumatic cylinder 3840 at pivot 3841. The return stroke of cylinder 3840 pivots the storage tray 3231 in a clockwise direction, thereby dumping the cheese slices.

(xiv) Operation of Indexing Device of FIG. 41

In the operation of the indexing device, the power stroke and return strokes of the pneumatic cylinder 4107 are coordinated with the rotation of the rotary table 2809 by the pneumatic drive cylinder 3015 as previously described, so that the power stroke of pneumatic cylinder 4107 is accomplished at the precise time when the respective hinged receiving and lift trays 2816 are disposed at the respective STATION when no rotation of the rotary table 2809 is to take place as food processing operations at the respective STATION take place. Then, when the rotary table 2809 is to be rotated, the return stroke of the pneumatic cylinder 4107 takes place, thereby allowing the rotary table 2809 to rotate. The power stroke of the pneumatic cylinder 4107 may then take place at any time prior to when the respective hinged receiving and lift tray 2816 is to be at the next STATION, so as to stop the rotary table 2809 at that STATION.

(xv) Operation of Second Embodiment of Dough Folder of FIG. 42

An operating mechanism for such folding apparatus 2819 is disposed only at STATION F. The operating mechanism includes a pneumatic cylinder 4220, the cylinder end 4221 of which is secured to the longitudinal beam 2902 of the main frame 3001, and whose rod end 4222 is secured to an operating plate 4223. Operating plate 4223 is guided by rods 4224 sliding in bores 4225 in beam 2902. The power stroke of the pneumatic cylinder 4220 urges the operating plate 4223 into engagement with the cam elbow surface 4218 at the hingedly-connected elbow pivot end 4217 of each of the set of folding arms 4210. This causes a two-part motion of the folding forearm arm 4215: firstly to cause the transverse rod 4230 and the folding forearm 4205 to engage the side edges of the loaded dough sheet and to begin to fold the diametrically-opposed ends over towards each other; and secondly, to complete the folding of those edges, i.e. to cause the transverse rod 4230 and the folding forearm 4205 to reverse fold the edges which are beginning to fold to place them atop and overlapping at the central portion of the dough sheet 3201. This action is shown in broken lines.

(xvi) Operation of Scroll Plate of FIGS. 43, 44 and 45

As the rotary table 2809 rotates, a lifting arm 4517 hingedly-connected at 4321 to the lower face of each hinged receiving and lift tray 2816 (which is hinged by pin 4319 to hinge plate 4320, one plate 4320 of the hinge being secured to tray 2816, the other plate 4321 of the hinge being secured to rotary table 2809) contacts the upstream portion 4512 of the scroll plate 4510. Lifting arm 4517 rides along the mid-portion 4513 of the scroll plate 4510 and, as it does so, it raises the lift tray 2816 until, when the lifting arm 4517 arrives at the flange 4515, the hinged receiving and lift tray 2816 is raised to a precise correct height (as shown). At such height, the sheet of dough 3201 is so oriented that the rolling fingers 4730 can roll the loaded, overlapped-folded, sheet of dough 3201, previously described.

(xvii) Operation of Third Embodiment of Dough Roller of FIGS. 46, 47 and 48

In operation, as the rotary table 2809 rotates the lifting mechanism previously described attached to the underface of the rotary table 2809 is acted upon by the scroll plate 4510 as previously described to raise the hinged receiving and lift tray 2816 also as previously described which also raises the overlapped-folded sheet of dough 3201 resting thereon to the correct pre-determined height. The two rolling fingers 4730 then straddle the lifted-up sheet of dough 3201. To roll the sheet of dough 3201, the finger roller drive mechanism previously described is actuated and the fingers 4730 are caused to rotate 2½ turns. The rolling guide plate 4739 prevents upward movement of the dough sheet. Then the finger unloading cylinder 4738 is actuated to urge the rolling guide plate bracket 4736 against the proximal edges of the rolled dough sheet. This discharges the rolled dough sheet, i.e. the "finger roll" product and deposits it onto the conveyor 4740. The roller guide plate 4739 and the bracket 4736 are then retracted to their initial position, by means of cylinder 4738. Conveyor 4740 feeds the finger roll product to loading trays (not shown) and then to another processing station, e.g., a deep fryer (not shown).

(xviii) Operation of Third Embodiment of Dough Feeder of FIGS. 51 and 52

Figure 53:
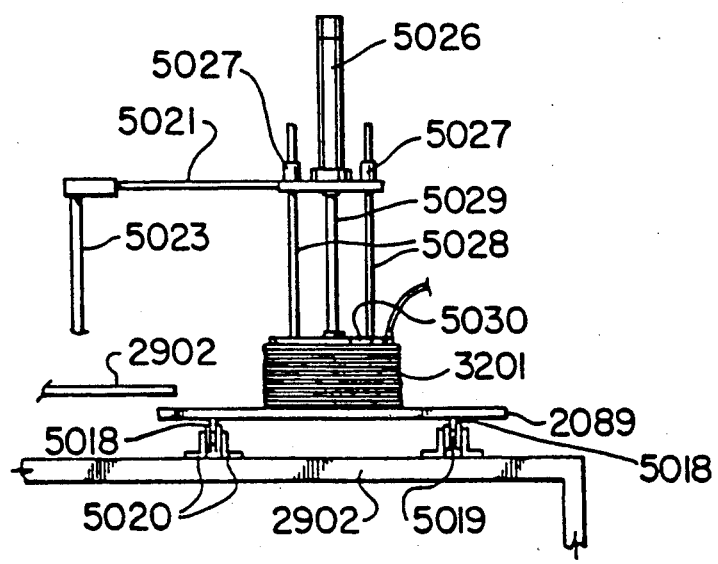
FIG. 53 is a partial side elevational view of the dough sheet feeder shown in FIG. 51.

In operation, the dough tray table 5011 is reciprocable to a first position (shown by broken lines) where the vacuum shoes 5030 are disposed over the dough sheet supply trays where sheets of dough 3201 are stacked (as seen in FIG. 53). The pneumatic cylinders 5026 are activated to urge the vacuum shoes 5030 downwardly towards, and to be in contact with, the uppermost dough sheet 3201. When the vacuum is applied, a sheet of dough 3201 is picked up and held by the vacuum shoe 5030. The pneumatic cylinders are then activated to raise the vacuum shoes 5030 upwardly.

The dough tray table 5011 is then reciprocated to a second position (as shown in solid lines in FIG. 51), at the precise time when two empty hinged receiving and lift trays 2816 are at the position shown, with the rotary table 2809 stationary. Then each of the swing arms 5021, which are situated in abutting relation to the horizontal plate 5020, is activated to strike the transfer cylinder mechanism 5010 in an arcuate motion until the vacuum shoe 5030 of the dough sheet transfer cylinder mechanism 5010 is over the associated empty hinged receiving and lift tray 2816. The vacuum is disconnected, allowing the previously-held sheet of dough 3201 to fall onto the respective hinged receiving and lift tray 2816. Then the swing arms 5021 are actuated in a reverse arcuate manner to return the respective dough sheet transfer cylinder mechanism 5010 to a position over the shiftable table 5010.

The rotary table 2809 is then rotated and the dough tray table 5011 is also reciprocated to the first position (shown in broken lines), where the dough sheet transfer cylinder mechanism 5010 is actuated to be reloaded, and the operation described above is repeated. Thus, when the two empty hinged receiving and lift trays 2816 are in the position as shown in the drawings, the rotary table 2809 loading cycle can be repeated, to load two hinged receiving lift trays 2816 simultaneously.

(xix) Operation of Tucker-Roller of FIGS. 57 to 60

In operation, the folded loaded sheet of dough provided at STATION E is brought to STATION F. The pinch bar cylinder is actuated to its power stroke to cause the pinch bar to be urged radially-inwardly to release a rolled final product (if it exists within the trough) and to continue radially inwardly to grip a folded, loaded sheet of dough situated on the depressed receiving tray. The pinch bar cylinder is then actuated to its partial return stroke to draw the gripped folded, loaded sheet of dough from the depressed receiving tray to the rolling tray. The folded, loaded sheet of dough is deposited within the trough on the rolling fabric. The front crimp finger cylinder is then actuated to cause the first crimp finger to rotate about an end point pivoted lever from its rear, "at rest" position to a position where it engages the folded, loaded sheet of dough. The thus deposited folded, loaded sheet of dough is thereby arranged to be fully within the trough and situated properly for the next step in the procedure.

The rear crimp finger cylinder is then actuated and simultaneously the pinch bar cylinder is actuated to its complete return stroke to bring the pinch bar to its "at rest" position, thereby releasing its grip on the folded, loaded sheet of dough. The actuation of the crimp finger cylinder causes the rear crimp finger to rotate about a mid-point pivoted lever from its "at rest" position to a position where it engages the folded, loaded sheet dough. This achieves a tucking-in of the folded, loaded sheet of dough which had been correctly arranged by the front crimp finger.

Then the carriage actuation cylinder is actuated its power stroke to cause the front and rear crimp fingers to release the thus-folded sheet of dough. The carriage actuation cylinder is then actuated to its complete return stroke to cause the front and rear crimp fingers to return to their original "at rest" position.

The main rolling actuating cylinder is then actuated to its power stroke which causes the rolling carriage to traverse the longitudinal length of the rolling tray, bringing the rolling fabric up and urging the rolling fabric to effect a rolling up of the sheet of dough which had been "tucked-in" as described above. Because the cylinder is a non-rotating cylinder, the rolling is accomplished accurately.

The above-described sequence of steps is then repeated, which simultaneously discharges one previously-folded product and rolls the next folded, loaded sheet of dough.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be within the full range of equivalence of the following claims.

We claim:

1. A method for production of a generally-cylindrical, overlapped-folded, loaded, rolled dough food product comprising:
   (a) providing first and second stacks of substantially square-shaped sheets of dough upon a stacking surface, said stacks being spaced apart by a predetermined distance;
   (b) reciprocating a pair of lifting members so that one lifting member is above one of said stacks and the other lifting member is above a movable conveying surface;
   (c) drawing a sheet of dough from a stack beneath said one lifting member against said one lifting member and simultaneously releasing a sheet of dough drawn against said other lifting member;
   (d) repeating steps (b) and (c) to deliver sheets of dough alternately from the pair of lifting members to the movable conveying surface to arrange the sheet of dough in a diamond orientation at a first discrete stationary zone;
   (e) moving said surface to advance said sheet of dough in its diamond orientation from said first discrete stationary zone to at least one foodstuff dispensing second discrete zone downstream thereof;
   (f) stopping said surface to place the dough sheet at said foodstuff dispensing second discrete zone;
   (g) loading at least one foodstuff onto a discrete region of said upper surface of said sheet of dough while said sheet of dough is stationary, said foodstuff forming a pile atop said upper surface of said sheet of dough while said lower surface of said sheet of dough remains on said surface;
   (h) advancing said surface to move said sheet of dough loaded with at least one foodstuff to a loaded dough sheet third discrete folding zone;
   (i) stopping said surface at said third discrete folding zone;
   (j) folding opposed transverse corners of said diamond-shaped loaded sheet of dough inwardly to cover said pile of foodstuff and to meet and overlap one another slightly near the central portion of the dough sheet, thereby providing a substantially-hexagonally-shaped, overlapped-folded, loaded sheet of dough, while said sheet of dough is stationary, whereby said foodstuff appears covered while said lower surface of said sheet of dough rests upon said movable surface;
   (k) advancing the movable surface to move said substantially-hexagonally-shaped, overlapped-folded, loaded sheet of dough to a fourth discrete rolling zone;
   (l) stopping said movable surface to bring the folded dough sheet to said fourth discrete rolling zone;
   (m) rolling said overlapped-folded, loaded sheet of dough, by gripping and raising one angular point of said substantially-hexagonally-shaped sheet of dough and rolling said gripped and raised angular point over said top of said covered pile of foodstuff so that said gripped and raised angular point is rolled at least two and one-half revolutions, thereby providing a generally-cylindrical, overlapped-folded, loaded, rolled dough product, while said sheet of dough is stationary; and
   (n) discharging said generally-cylindrical, overlapped-folded, loaded, rolled dough product to a discharge zone.

2. The method of claim 1 further including the step of deep drying the discharged product.

3. The method of claim 1 wherein the step of providing stacks of dough sheets further comprises the steps of:
   providing a plurality of stacks of dough sheets arranged at spaced intervals upon first and second rotatable surfaces; and
   indexing each surface to place a new stack beneath an associated one of the lifting members upon depletion of the stack previously positioned beneath the lifting member.

4. The method of claim 1 wherein the step of providing a plurality of stacks of dough sheets further comprises:
   providing a reciprocating surface; and
   placing at least first and second pairs of dough sheet stacks upon said reciprocating surface and moving said surface to a first position to locate a first one of each of said pairs of stacks beneath said lifting members and thereafter moving the reciprocating surface to a second position to place the remaining ones of said stacks of dough sheets beneath said lifting members when the first stack of each pair of stacks is exhausted.

5. The method of claim 4 wherein the step of moving said lifting members further comprises the steps of:
swingably moving said lifting members from a position above said reciprocating surface to a position above said movable surface, said lifting members being moved in an alternating fashion.

6. The method of claim 4 wherein the step of moving said lifting members further comprises the steps of:
swingably moving said lifting members from a position above said reciprocating surface to a position above said movable surface, said lifting members being moved simultaneously.

7. The method of claim 1 wherein the step of placing a foodstuff upon a dough sheet further comprises the step of:
providing a container for a foodstuff which is in a fluid state;
providing a dosage container having an inlet coupled to said main container and an outlet for delivering the foodstuff to a dough sheet positioned therebeneath;
closing said outlet and opening said inlet to deliver a predetermined quantity of foodstuff to said dosage container; and
closing said inlet container and opening said outlet container for delivering said measured dosage to a dough sheet positioned therebeneath.

8. The method of claim 1 wherein the step of depositing a foodstuff upon a dough sheet further comprises the steps of:
providing a carrier having a surface for engaging a foodstuff in solid form, said foodstuff being an elongated body, said carrier holding said body in a diagonal orientation relative to said movable surface;
providing a movable releasing member;
providing a movable cutting member;
providing a guide member;
moving said releasable member from a first position holding the foodstuff against the carrier surface to a second position displaced from said foodstuff and carrier surface to enable the bottom end of the foodstuff to abut said guide member and thereafter returning said releasable member to said first position for gripping said foodstuff between said releasable member and said carrier surface;
swingably moving said cutting surface to slice a measured bottom portion of said foodstuff away from the main body of the foodstuff and for depositing the sliced portion upon a dough sheet positioned therebeneath.

9. The method of claim 1 wherein the step of folding said dough sheet further comprises:
providing a pair of pivotally mounted L-shaped angle arms;
holding down two opposing corners of a dough sheet;
simultaneously swinging said angle arms about their pivot points to lift the remaining two opposing corners of the dough sheet upwardly causing the last-mentioned corners to overlie the foodstuff deposited on the dough sheet and to overlap one another.

10. The method of claim 1 wherein the step of rolling the foodstuff further comprises the steps of:
lifting one unfolded corner of the foodstuff upwardly a spaced distance above the movable surface;
providing a pair of spaced parallel fingers;
moving said fingers from a position displaced from the foodstuff to a position for receiving the upwardly lifted corner of the foodstuff between said pair of arms; and
rotating said arms to roll said foodstuff through said predetermined number of turns.

11. The method of claim 1 wherein the step of rolling the foodstuff further comprises the steps of:
lifting one unfolded corner of the foodstuff upwardly a spaced distance above the movable surface;
providing a gripping finger having a plurality of slender prongs;
extending said prongs to a position transverse to the longitudinal axis of said gripping finger for gripping the lifted corner of said foodstuff; and
rotating said gripping finger to roll said foodstuff.

12. The method of claim 1 wherein the step of depositing a foodstuff upon a dough sheet further comprises the steps of:
providing a grinder for grinding a substantially solid foodstuff;
simultaneously grinding said foodstuff and moving the outlet end of the grinding device over a dough sheet whereupon the foodstuff is dispensed upon the dough sheet as it is being ground; and
moving a cutting blade across the outlet end of said grinder to separate the ground foodstuff passing through the outlet end from the foodstuff yet to pass through the outlet end.

13. The method of claim 1 wherein the step of rolling the foodstuff further comprises the steps of:
providing a trough for receiving the folded dough sheet foodstuff;
positioning a fabric sheet over said trough;
sliding said trough beneath the folded dough sheet to position said dough sheet upon said fabric and in said trough;
moving one unfolded corner of said dough sheet over said dough sheet; and
lifting the fabric sheet to cause a rolling up of the dough sheet.

14. A method for the production of a generally-cylindrical overlapped-folded, loaded, rolled dough food product comprising:
(a) providing first and second stacks of substantially square-shaped sheets of dough upon a stacking surface, said stacks being spaced apart by a predetermined distance;
(b) reciprocating a pair of lifting members so that one lifting member is above one of said stacks and the other lifting member is above a rotatable conveying surface;
(c) drawing a sheet of dough from a stack beneath said one lifting member against said one lifting member and simultaneously releasing a sheet of dough drawn against said other lifting member;
(d) repeating steps (b) and (c) to deliver sheets alternately from the pair of lifting members to the rotatable conveying surface the sheet of dough being arranged in a diamond orientation at a first discrete zone along an endless circular path;

(e) rotating said surface to move said sheet of dough at its diamond orientation from said first discrete zone to at least one foodstuff dispensing zone at a second discrete zone on said endless circular path;

(f) stopping said rotatable surface to place said foodstuff at a dispensing second discrete zone;

(g) actuating a selected mechanism at said foodstuff dispensing second discrete zone, thereby to load at least one foodstuff onto a discrete region of said upper surface of the sheet of dough while said sheet of dough is stationary, whereby the foodstuff appears as a pile atop said upper surface of said sheet of dough while said lower surface of said sheet of dough is substantially supported by said rotatable surface;

(h) advancing said sheet of dough which is loaded with at least one foodstuff to a folding zone at a third discrete folding zone on said endless circular path;

(i) stopping said rotatable surface to position the dough sheet at said third discrete folding zone;

(j) actuating a selected folding mechanism at said third discrete folding zone, thereby to fold opposed transverse corners of said diamond-shaped, loaded sheet of dough inwardly to cover said pile of foodstuff atop said upper surface of said sheet of dough so that the folded corners meet and partially overlap one another at the central portion of the dough sheet, thereby providing a substantially-hexagonally-shaped, overlapped-folded, loaded sheet of dough, while said sheet of dough held is stationary;

(k) moving said rotatable surface to advance said substantially-hexagonally-shaped, overlapped-folded, loaded sheet of dough to a rolling station at a fourth discrete rolling zone on said endless circular path;

(l) stopping rotatable surface to place said filled dough sheet at said fourth discrete rolling zone;

(m) rolling said substantially-hexagonally-shaped, overlapped-folded, loaded sheet of dough, by gripping and raising one angular point of said substantially-hexagonally-shaped sheet of dough and rolling said gripped and raised angular point over said top of said covered pile of foodstuff as far as said opposed angular point of said substantially-hexagonally-shaped sheet of dough, so that said gripped and raised angular point is rolled at least two and one-half revolutions, thereby providing a generally-cylindrical, overlapped-folded, loaded, rolled dough product, while said substantially-hexagonally-shaped overlapped-folded, loaded, sheet of dough is stationary; and (n) discharging said generally-cylindrical, overlapped-folded, loaded, rolled dough product to a discharge zone.

15. The method of claim 14 further including the step of deep frying the discharged product.

16. A method for the production of an overlapped-folded, filled, rolled food product comprising:

(a) providing first and second stacks of substantially square-shaped sheets of dough upon a stacking surface, said stacks being spaced apart by a predetermined distance;

(b) reciprocating a pair of lifting members so that one lifting member is above one of said stacks and the other lifting member is above a movable conveying surface;

(c) drawing a sheet of dough from a stack beneath said one lifting member against said one lifting member and simultaneously releasing a sheet of dough drawn against said other lifting member;

(d) repeating steps (b) and (c) to deliver sheets alternately from the pair of lifting members to the movable conveying surface so that the sheet of dough is arranged in a diamond-shaped orientation at a first discrete zone along a longitudinal path;

(e) advancing said movable surface to move said square-shaped sheet of dough in its diamond-shaped orientation along said longitudinal path from said first discrete zone to at least one foodstuff dispensing second discrete zone;

(f) halting said movable surface to place said dough sheet at said foodstuff dispensing zone;

(g) loading at least one foodstuff onto a discrete region of the upper surface onto a discrete region of the upper surface of said diamond-shaped sheet of dough, while said sheet of dough is stationary, whereby said foodstuff appears as a pile atop said upper surface of said sheet of dough while the lower surface of said sheet of dough is supported substantially by said movable surface, thereby providing a loaded, diamond-shaped, sheet of dough;

(h) advancing said movable surface to move said loaded diamond-shaped sheet of dough along said longitudinal path to a folding third discrete zone downstream thereof;

(i) stopping said advancing at said folding third discrete zone;

(j) folding opposed lateral corners of said loaded, diamond-shaped sheet of dough inwardly until their apices overlap one another and cover said pile of foodstuff atop said upper surface of said sheet of dough and to meet and partially overlap, thereby providing a substantially-hexagonally-shaped, overlapped-folded, loaded sheet of dough, while said sheet of dough is stationary, whereby said foodstuff appears as a covered pile;

(k) advancing said moving surface to move said substantially-hexagonally-shaped, overlapped-folded, loaded sheet of dough along said longitudinal path to a loaded, folded dough sheet fourth discrete rolling zone downstream thereof;

(l) stopping said advancing at said fourth discrete rolling zone;

(m) rolling said substantially-hexagonally-shaped, overlapped-folded, loaded sheet of dough, by gripping and raising one angular point of said substantially-hexagonally-shaped sheet of dough and rolling said gripped and raised angular point over the top of said covered pile of foodstuff and toward the opposed angular point of said substantially-hexagonally-shaped sheet of dough so that said gripped and raised angular point is rolled at least two and one-half revolutions, thereby providing a generally-cylindrical, overlapped-folded, loaded, rolled dough product, while said substantially-hexagonally-shaped, overlapped-folded, loaded sheet of dough is stationary; and (n) discharging said generally-cylindrical, overlapped-folded, loaded, rolled dough product to a discharge zone.

17. The method of claim 16 further including the step of deep frying the discharged product.

* * * * *